United States Patent [19]
Butcher

[11] Patent Number: 5,819,586
[45] Date of Patent: Oct. 13, 1998

[54] LINEAR MOTION TO ROTARY MOTION CONVERTER

[76] Inventor: James A. Butcher, 6771 Caledon Cove, Memphis, Tenn. 38119

[21] Appl. No.: 872,243

[22] Filed: Jun. 10, 1997

[51] Int. Cl.$^6$ ................................................. F16H 27/02
[52] U.S. Cl. .................... 74/129; 74/813 R; 74/813 L
[58] Field of Search ................................ 74/129, 813 R, 74/813 L

[56] References Cited

U.S. PATENT DOCUMENTS

| | | | |
|---|---|---|---|
| 2,021,030 | 11/1935 | Swahnberg | 29/50 |
| 3,085,452 | 4/1963 | Thompson | 74/822 |
| 3,120,134 | 2/1964 | Sweeney | 74/823 |
| 3,161,070 | 12/1964 | Venables, III | 74/129 |
| 3,924,527 | 12/1975 | Shenoha et al. | 74/129 X |
| 4,377,953 | 3/1983 | Hagen . | |
| 4,428,256 | 1/1984 | Ida et al. | 3/157 |
| 4,771,646 | 9/1988 | Ruggier et al. | 74/129 |

*Primary Examiner*—Allan D. Herrmann
*Attorney, Agent, or Firm*—Walker, McKenzie & Walker, P.C.

[57] ABSTRACT

A linear motion to rotary motion converter. A moving cam carrier reciprocates with respect to a rotating turntable having a plurality of fingers, preferably roller bearings, secured to and extending from the turntable parallel to the axis of rotation of the turntable and radially spaced from the axis. The number of rollers extending from the turntable determine the number of indexed stop positions of the turntable. The cam carrier has two movable cams and also has two retaining members that are attached to the cam carrier and respectively spaced from the movable cams so as to define channels, between the respective pairs of movable cams and retaining members, through which the roller bearing fingers of the turntable are constrained to move. The curvature and shape of the channels determines the velocity profile of the turntable as the cam carrier reciprocates. The invention also has lock positions at either end of the reciprocating cam carrier's movement in which the turntable is locked from rotation in either direction.

9 Claims, 45 Drawing Sheets

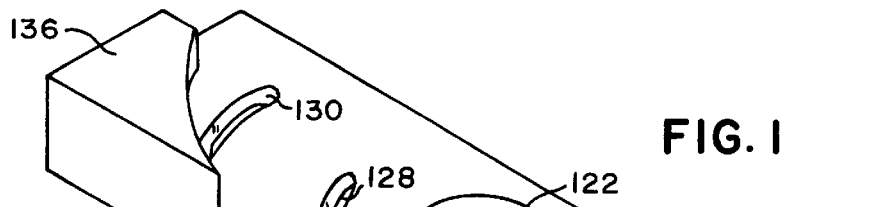
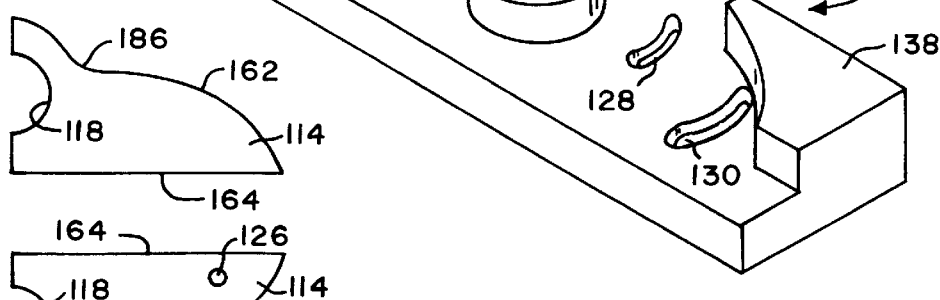
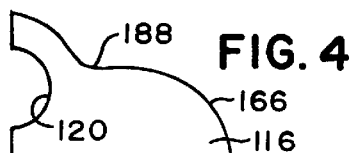
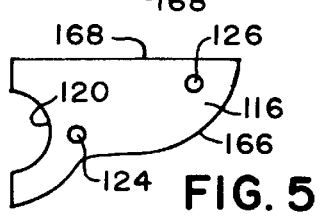
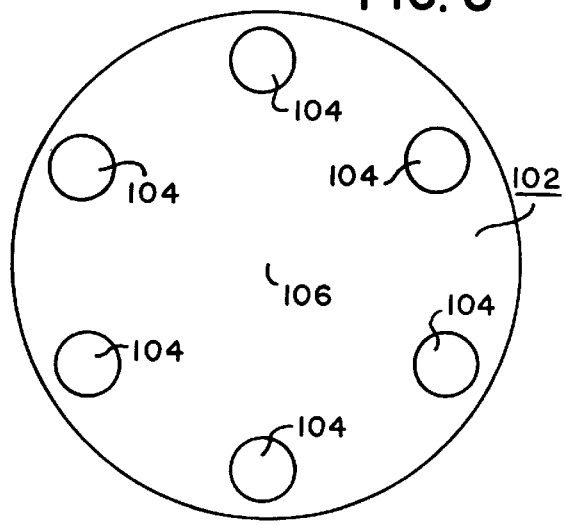
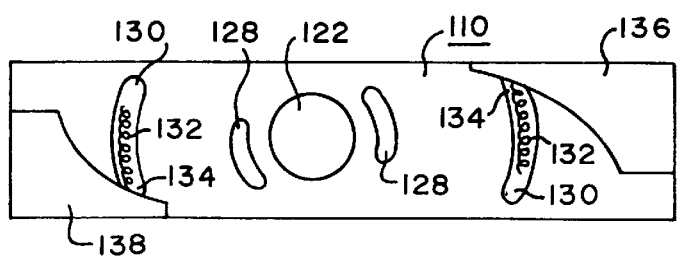

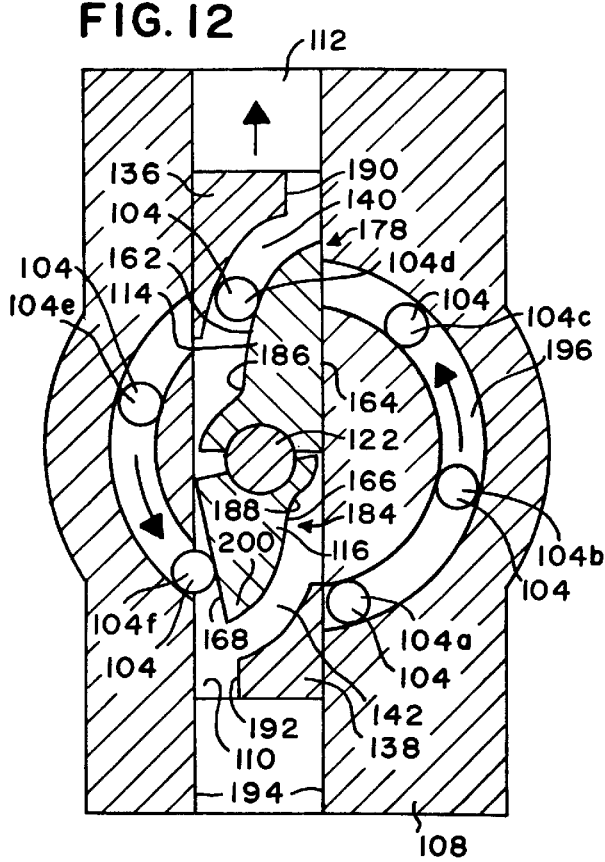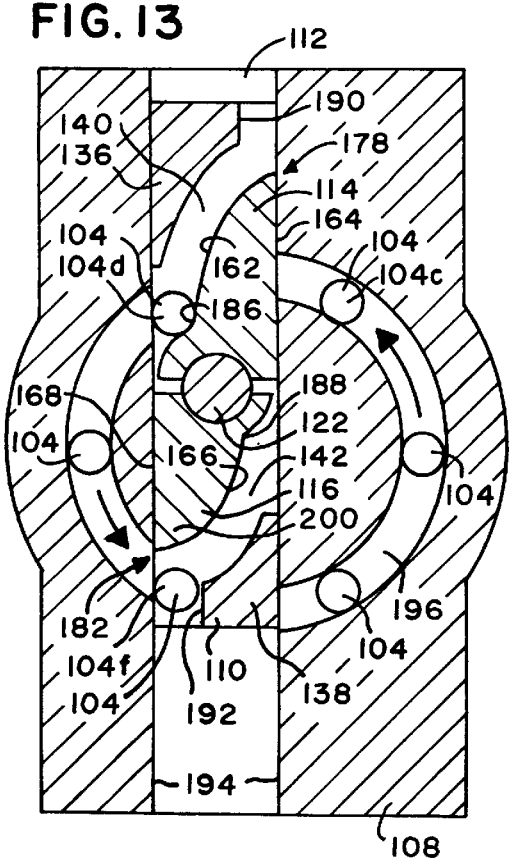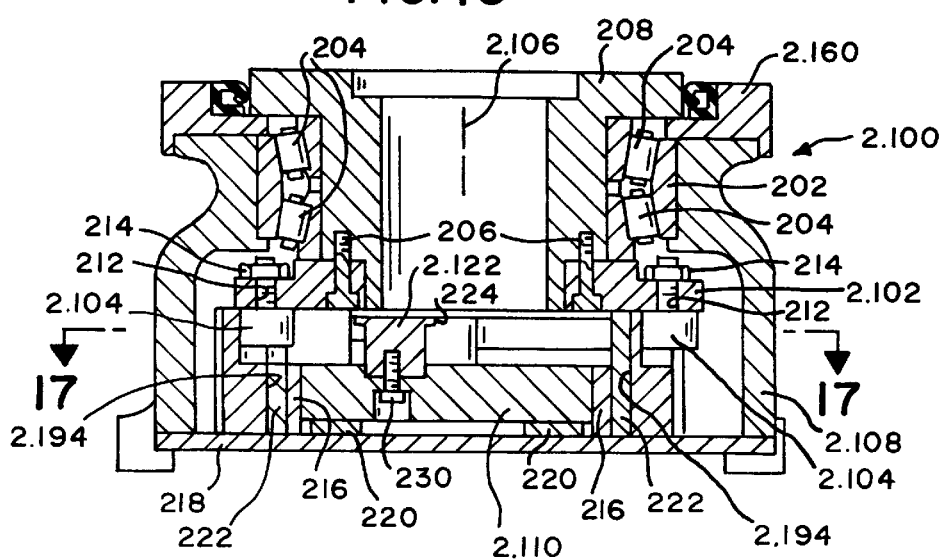

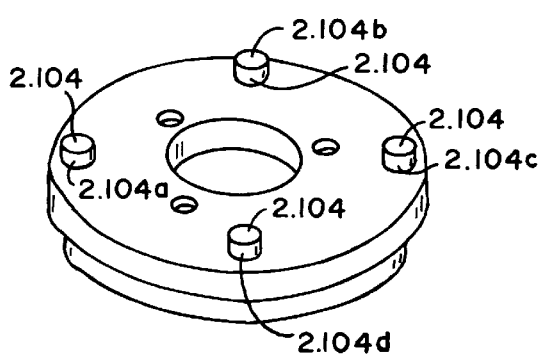
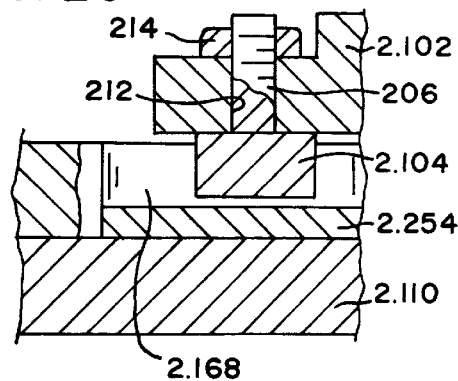
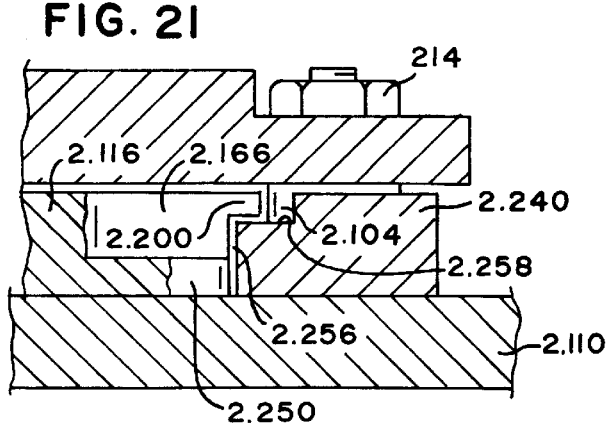
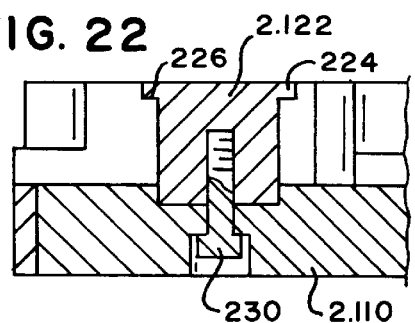
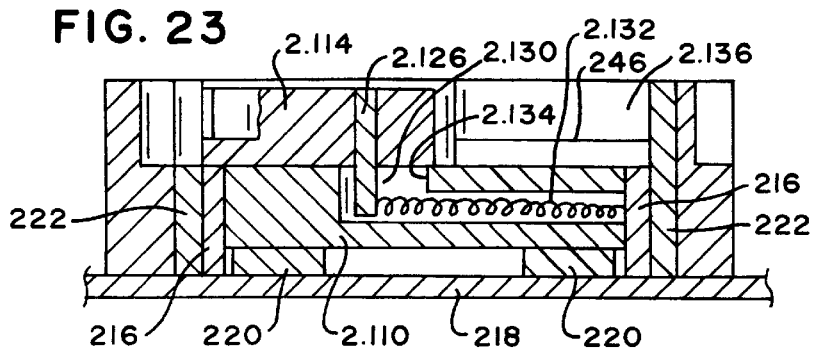

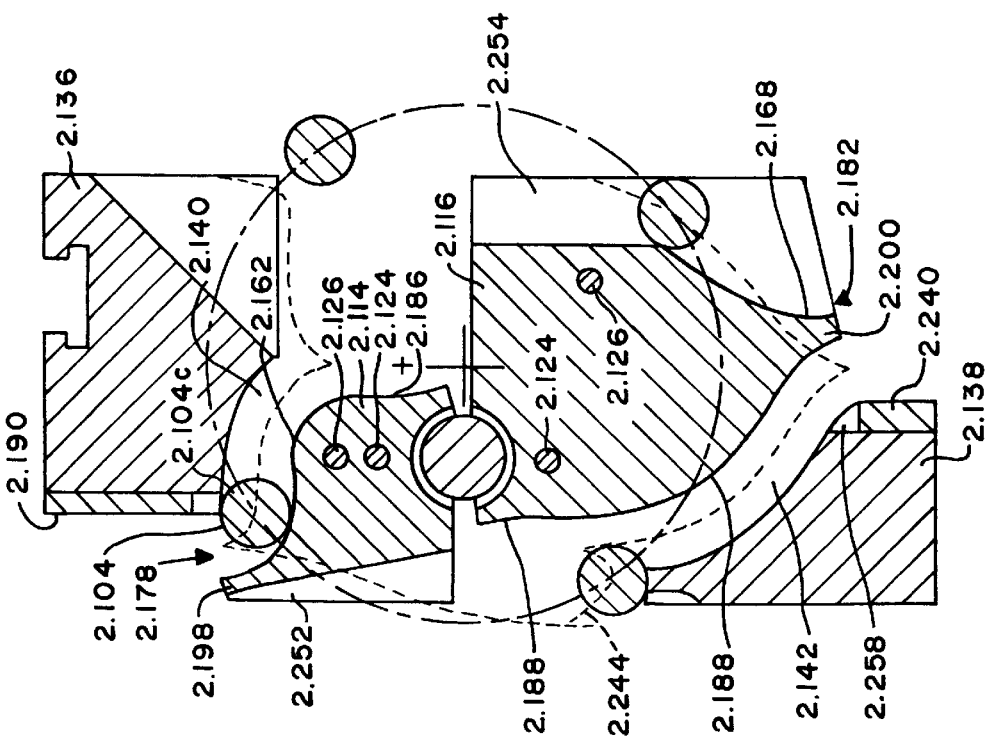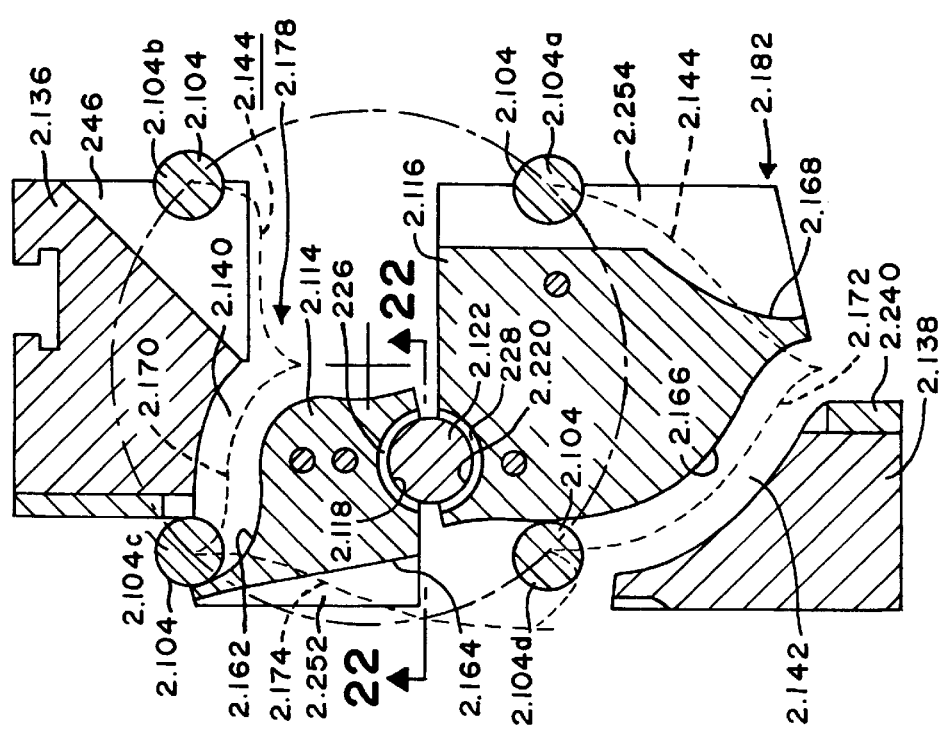

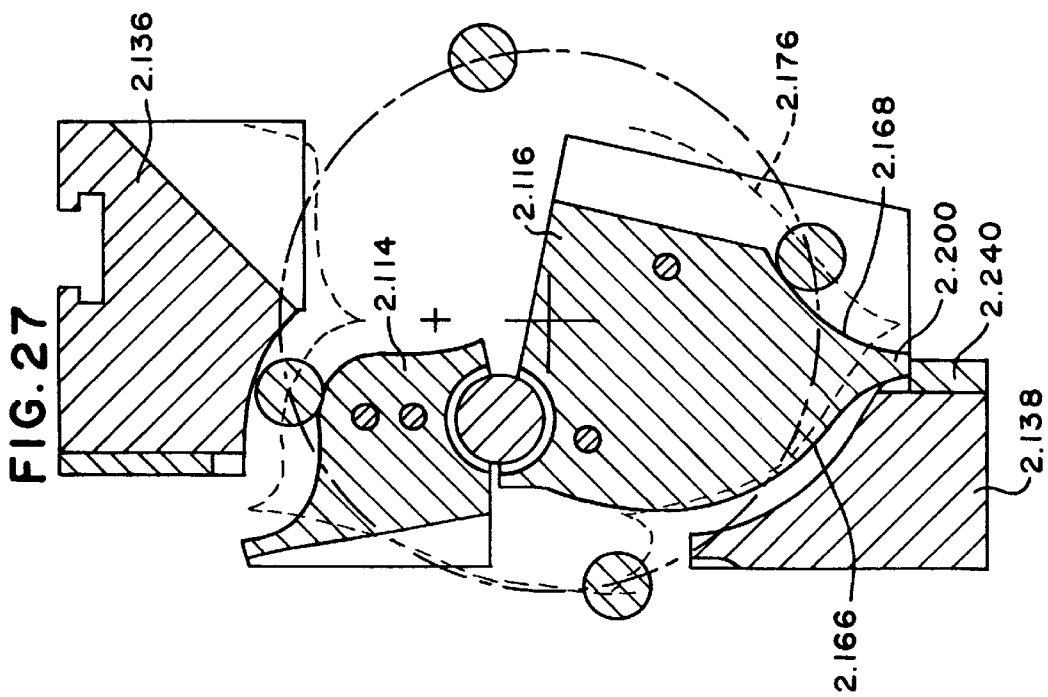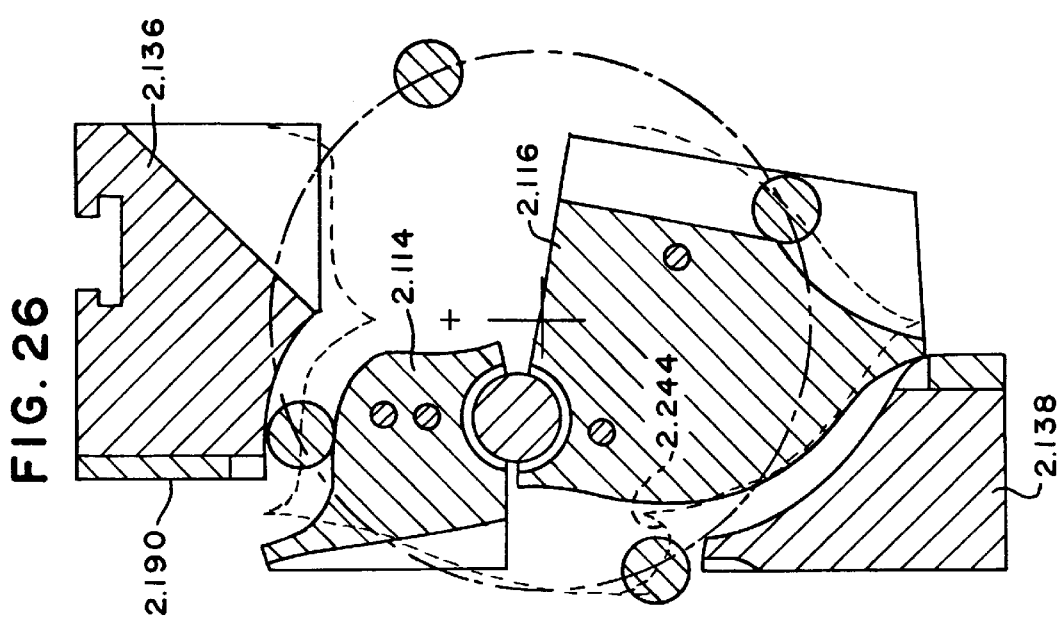

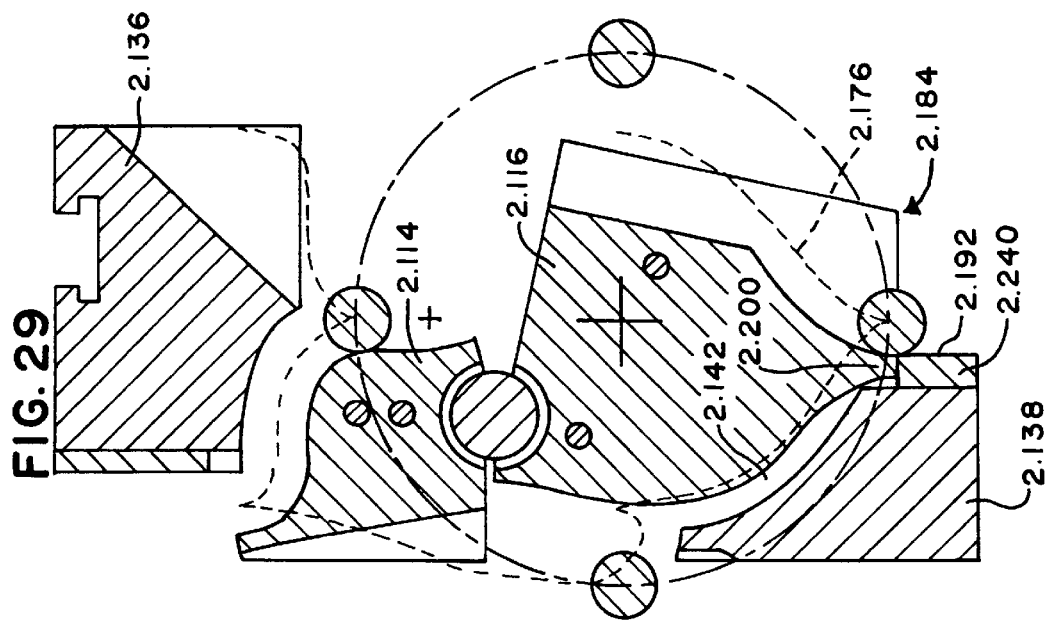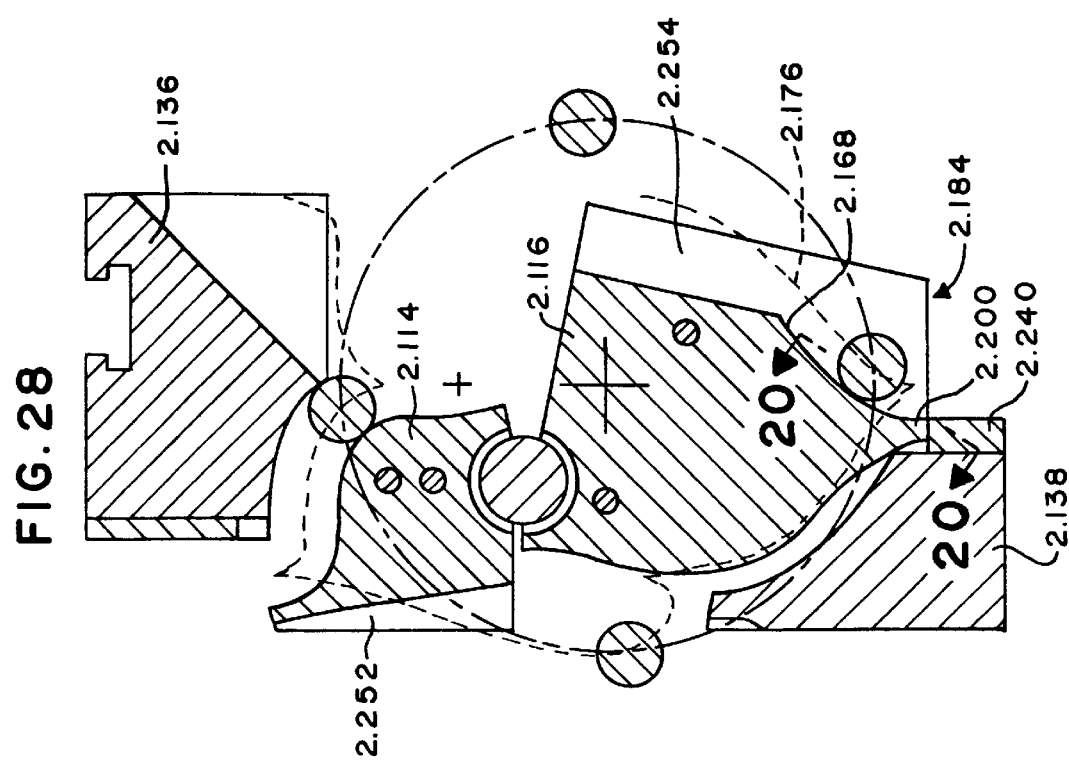

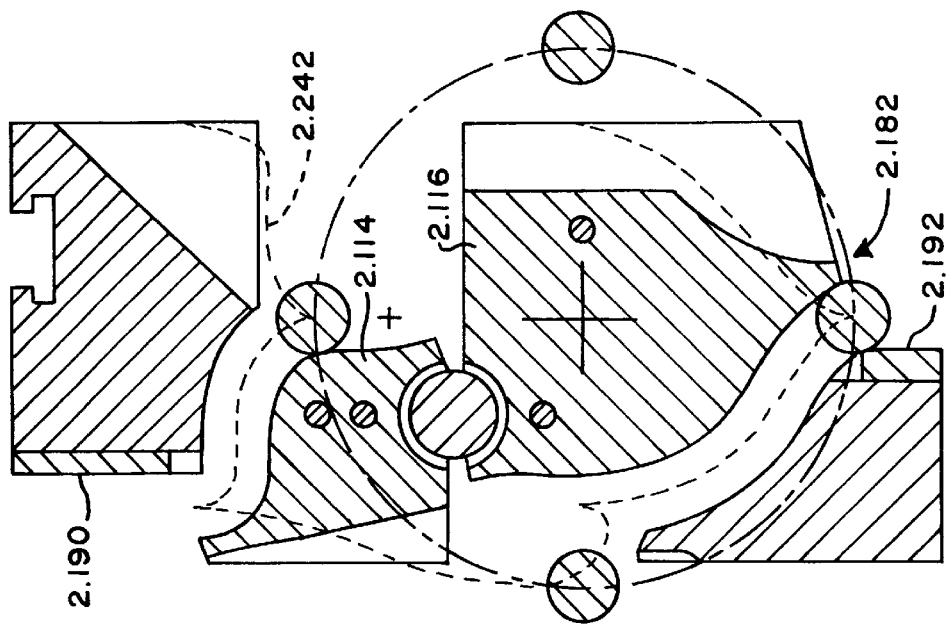
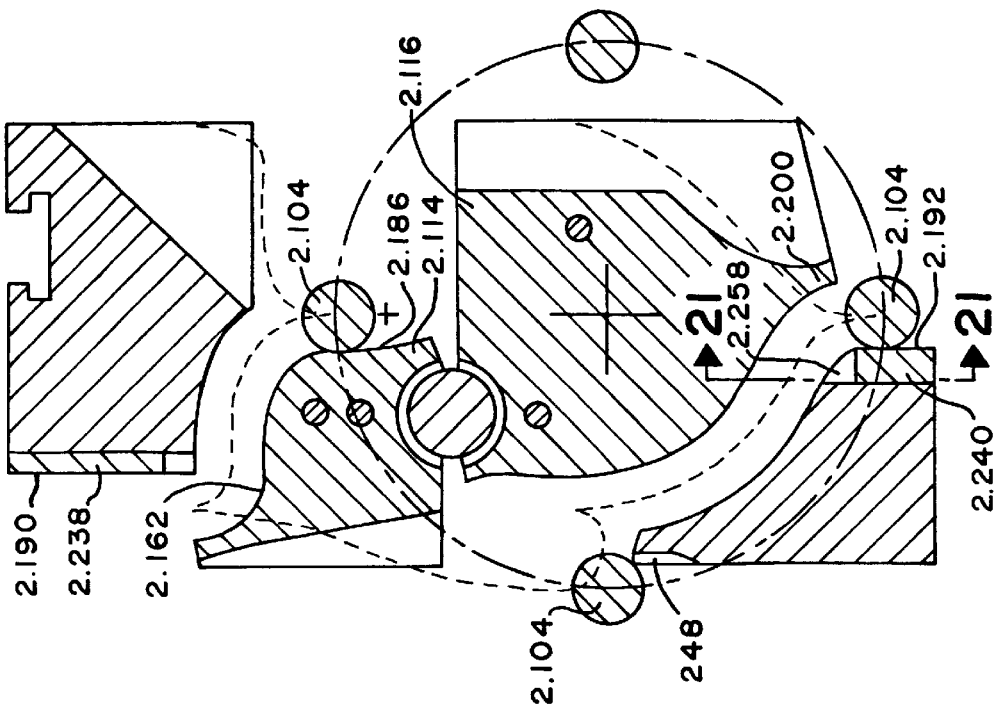

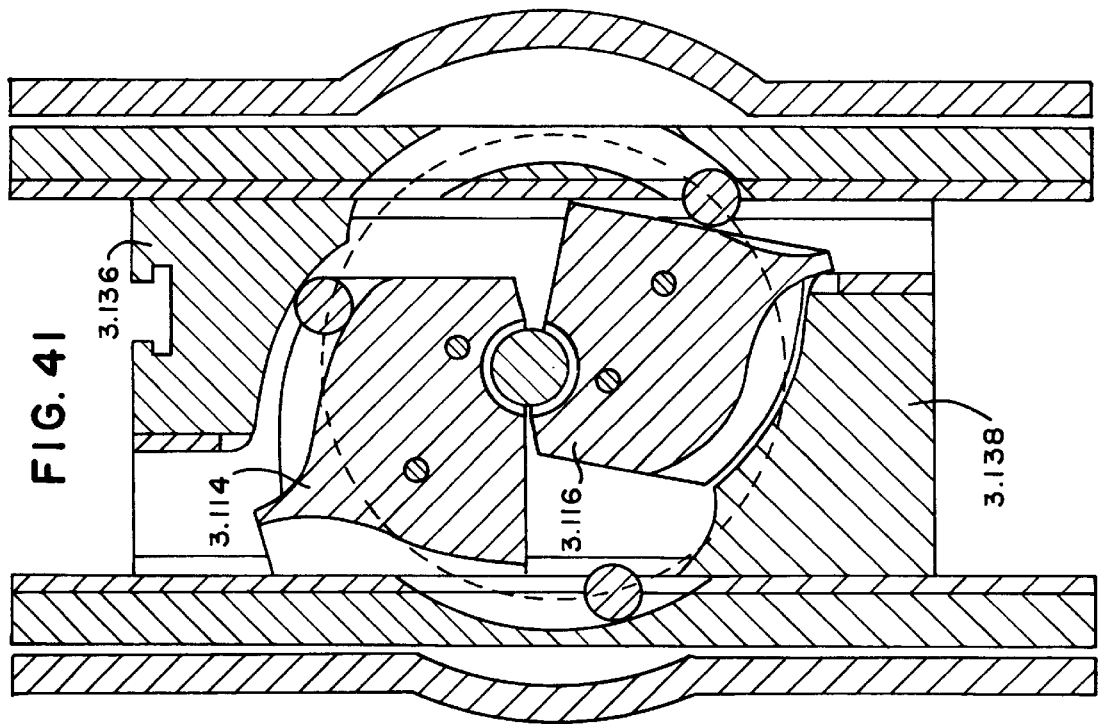
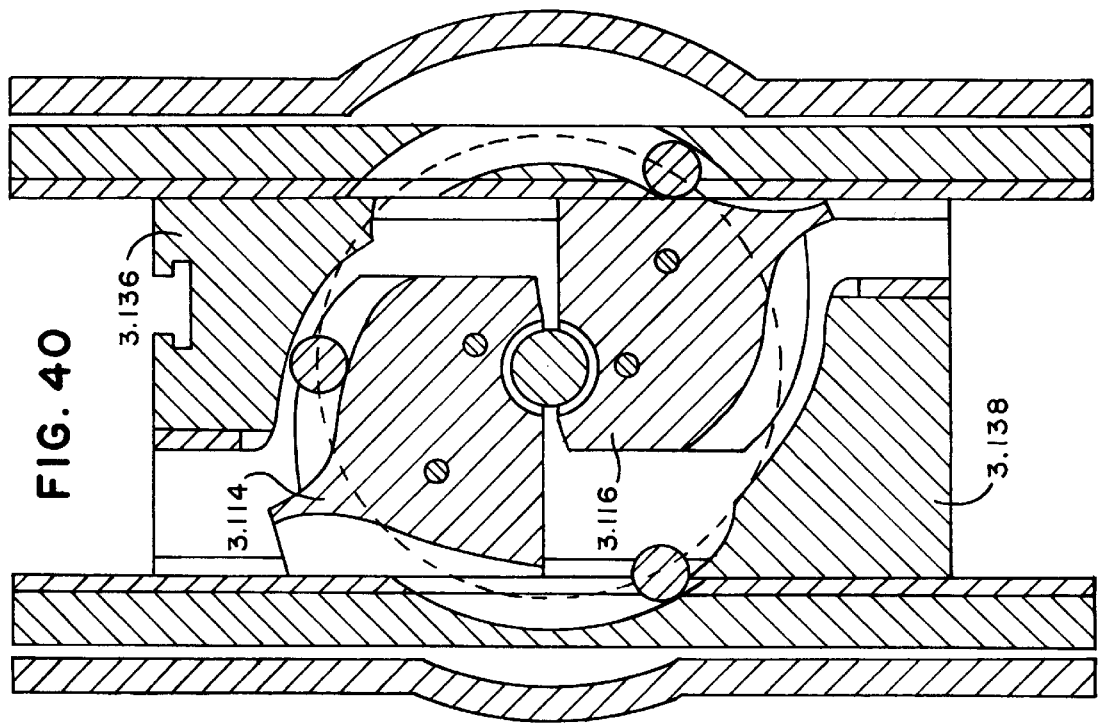

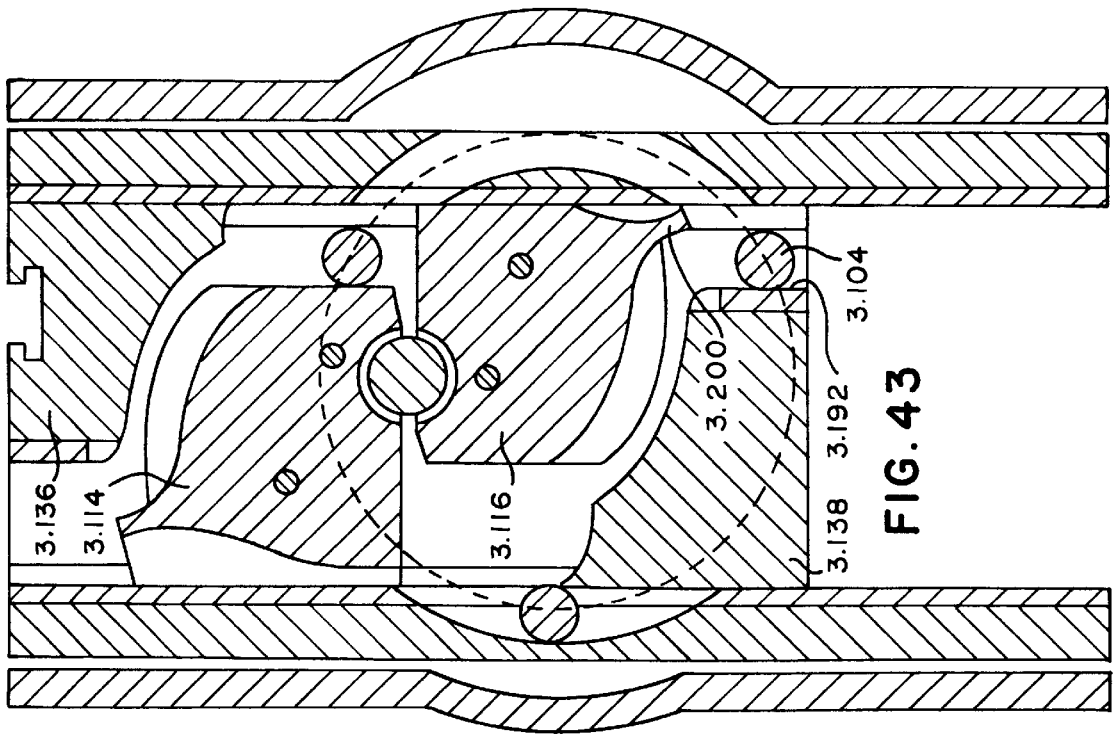
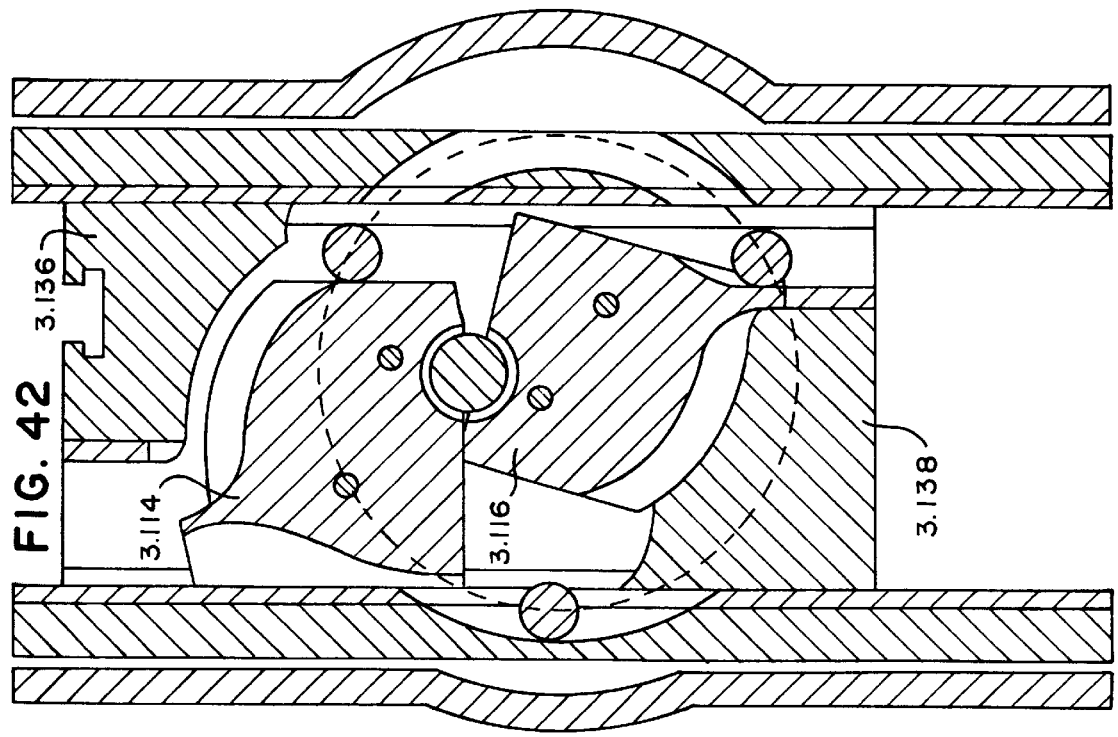

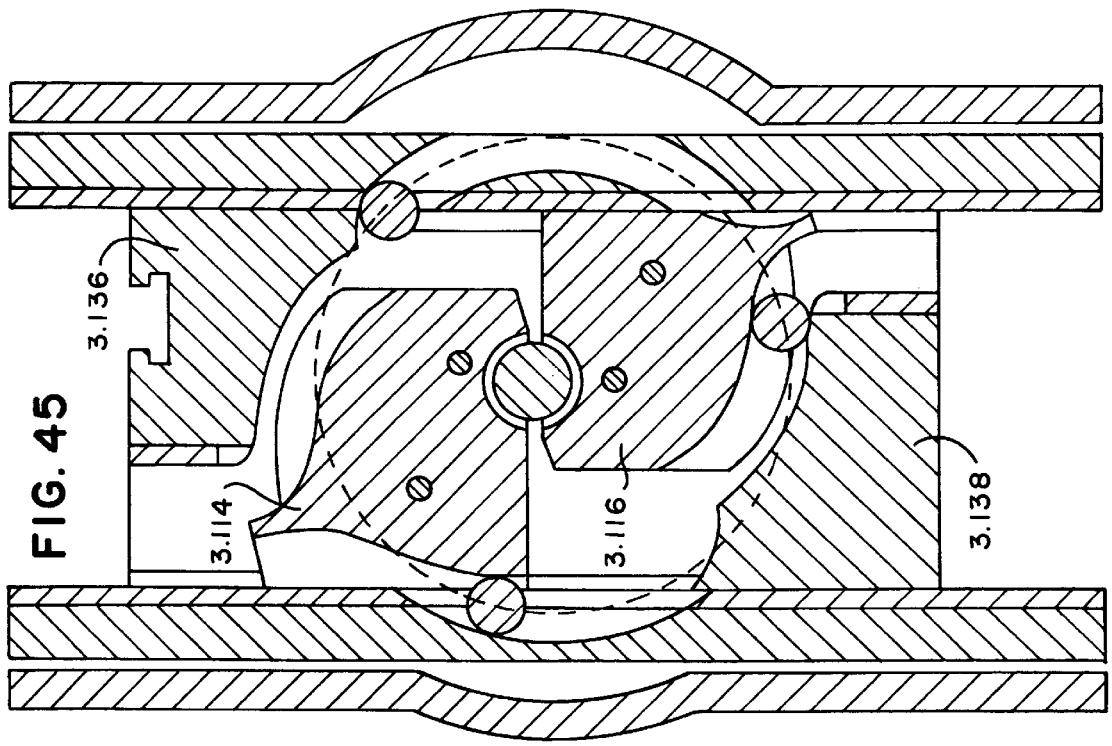
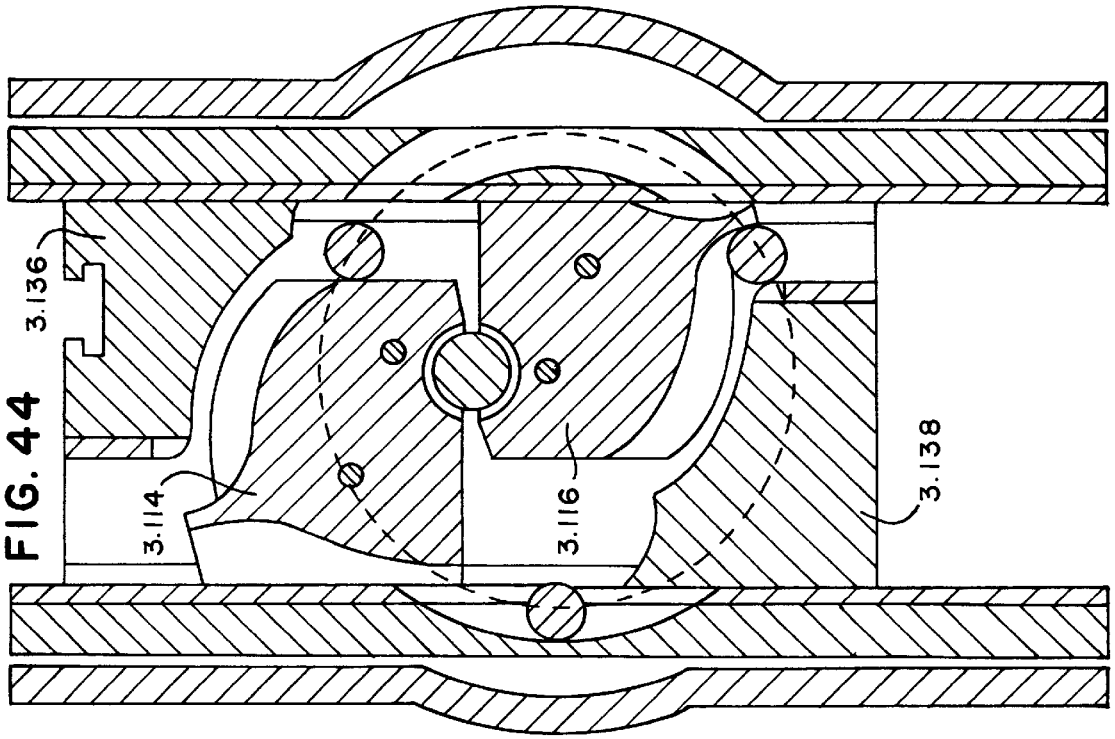

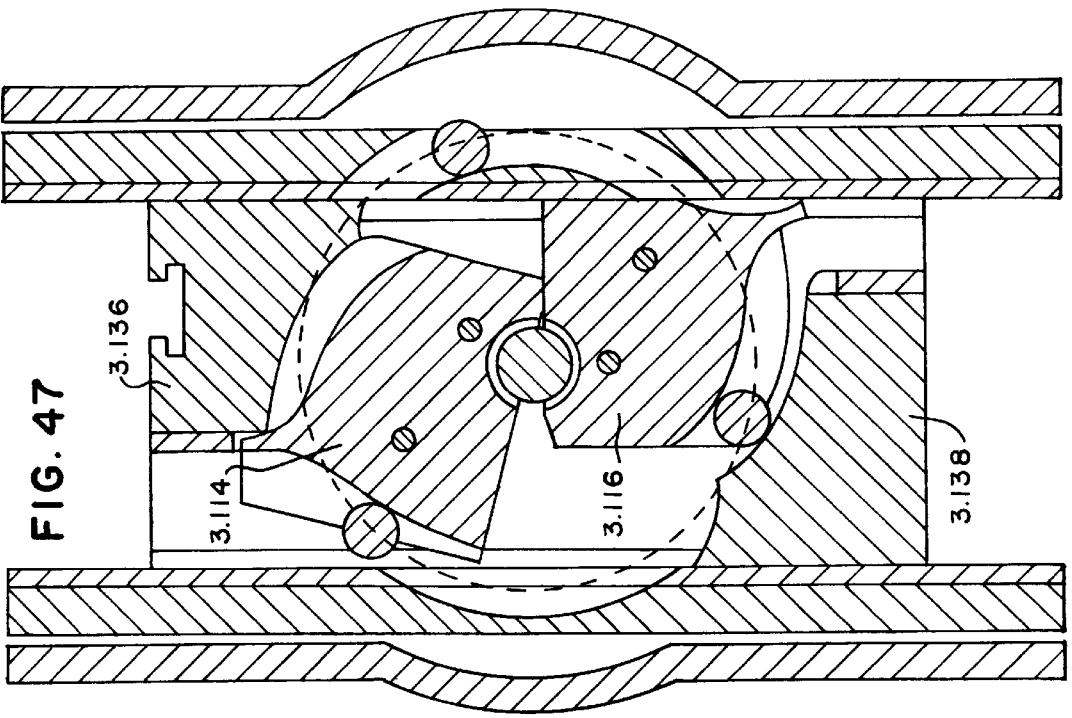
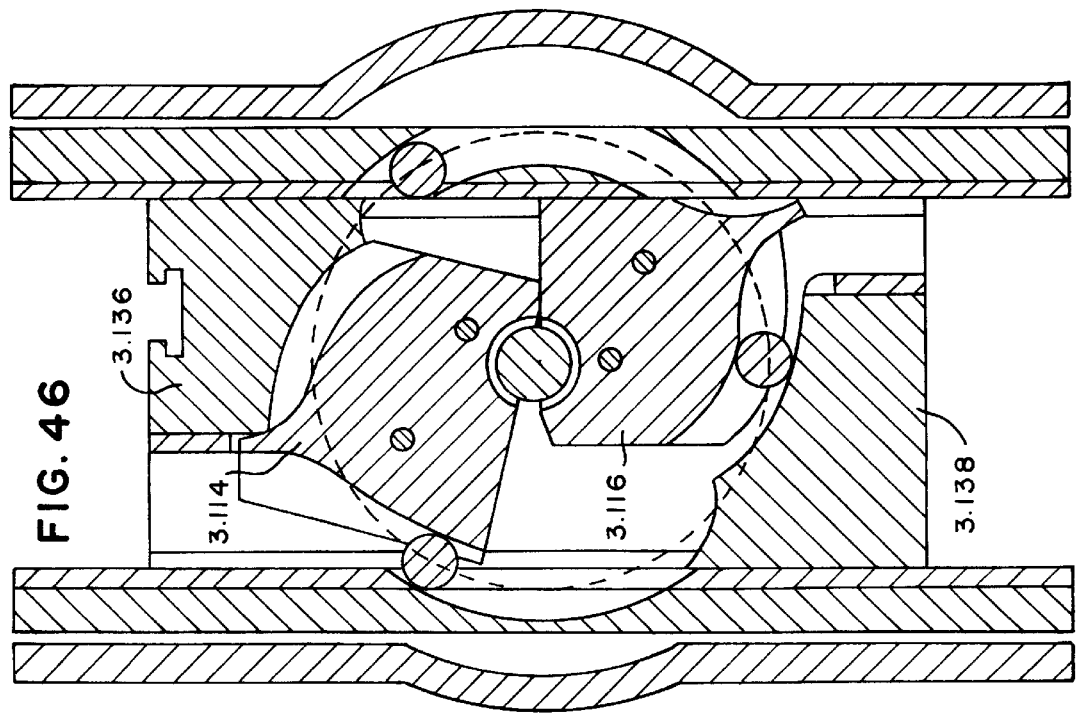

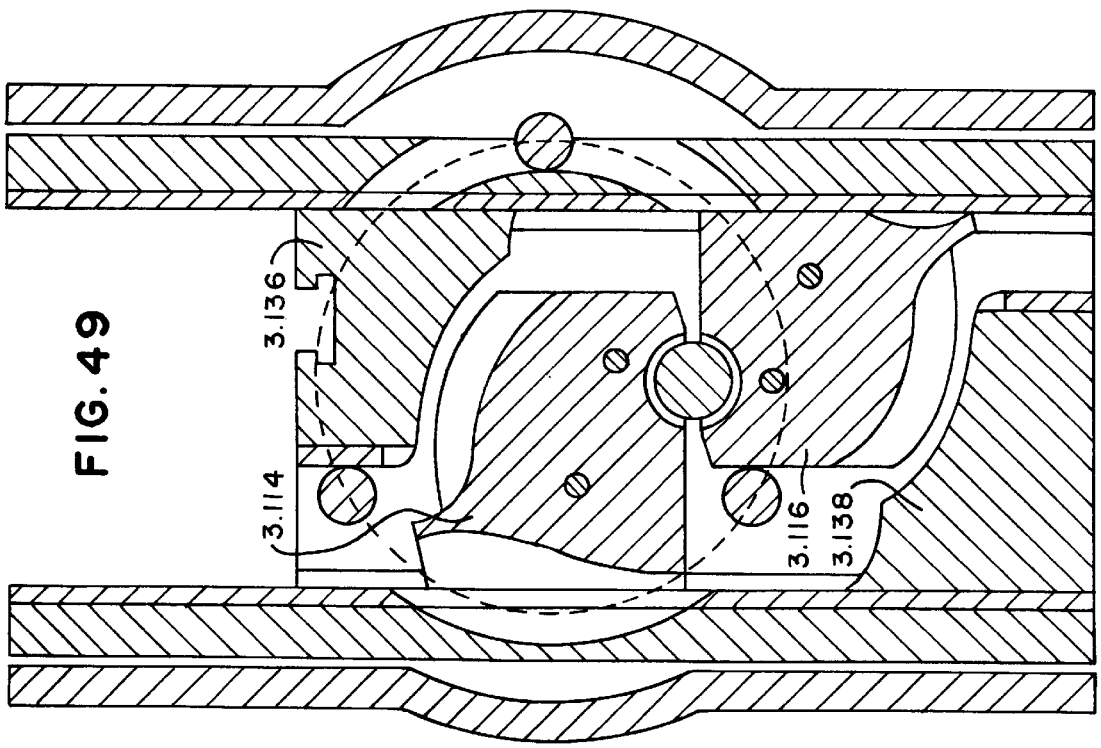
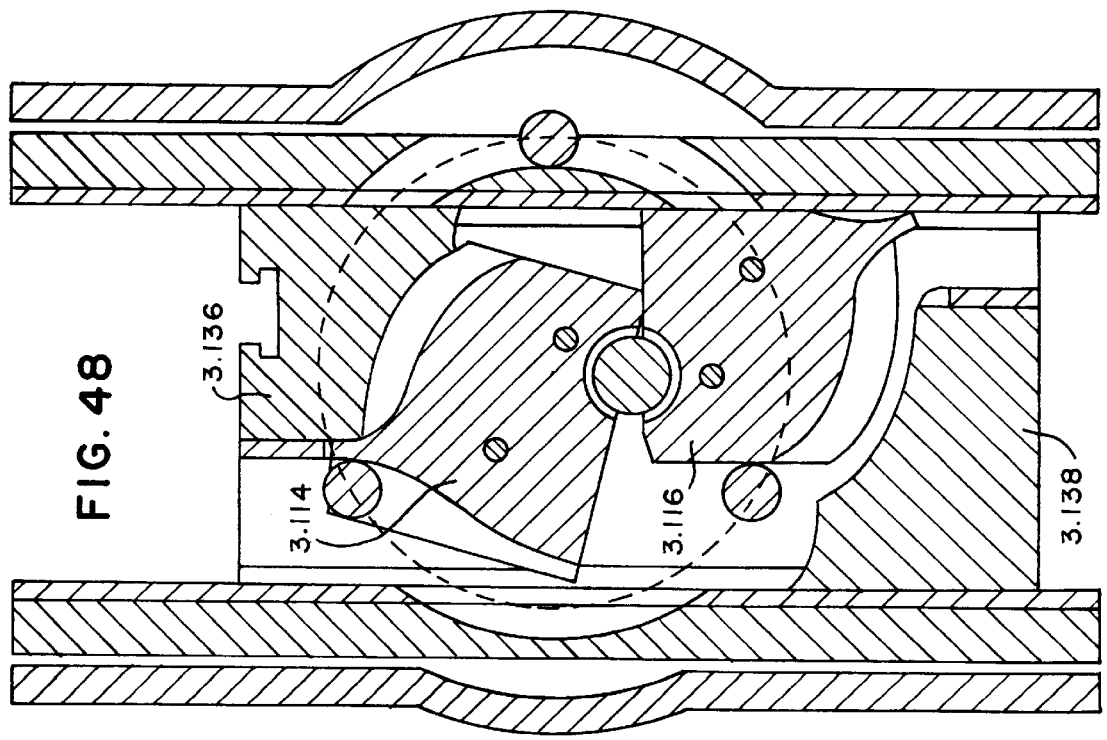

FIG. 59A

3-4 Cam A-Pat

| | A | B | C | D | E | F | G | H | I | J | K | L | M | N |
|---|---|---|---|---|---|---|---|---|---|---|---|---|---|---|
| 1 | Cam A Calculations | | | | | | | | | | | | | |
| 2 | | | | | | | | | | | | | | |
| 3 | | | | | | | | | | | | | | |
| 4 | Cam A - X and Y | | Roller | | | | | | | | | | | |
| 5 | Coordinates | | Circle | | | | | | Degrees of | | | Increment | | Sum |
| 6 | - Inches | | RPM | | | | | | roller circle | | | (In) | | of the |
|   | X | Y-(Yn) | | | | | | | rotation | | | -inches | | Increments |
| 7 | -2.1213 | 2.1213 | 0.0136 | | | | | | 45.0000 | | | 0.0000 | | 0.0000 |
| 8 | -2.0268 | 1.8263 | 2.3488 | | | | Amplitude | 16.5000 | 47.5000 | | | 0.3856 | | 0.3856 |
| 9 | -1.9284 | 1.7213 | 4.7359 | | | | | | 50.0000 | | | 0.1912 | | 0.5768 |
| 10 | -1.8263 | 1.6759 | 7.1107 | | | | Vertical | 0.3500 | 52.5000 | | | 0.1274 | | 0.7042 |
| 11 | -1.7207 | 1.6569 | 9.3993 | | | | Translation | | 55.0000 | | | 0.0964 | | 0.8005 |
| 12 | -1.6119 | 1.6511 | 11.5213 | | | | | | 57.5000 | | | 0.0786 | | 0.8791 |
| 13 | -1.5000 | 1.6513 | 13.3929 | | | | Phase | -0.0200 | 60.0000 | | | 0.0676 | | 0.9467 |
| 14 | -1.3852 | 1.6536 | 14.9312 | | | | Shift | | 62.5000 | | | 0.0607 | | 1.0074 |
| 15 | -1.2679 | 1.6551 | 16.0585 | | | | | | 65.0000 | | | 0.0564 | | 1.0638 |
| 16 | -1.1481 | 1.6537 | 16.7080 | | | | Horizontal | 1.5000 | 67.5000 | | | 0.0542 | | 1.1180 |
| 17 | -1.0261 | 1.6473 | 16.8279 | | | | Stretching | | 70.0000 | | | 0.0538 | | 1.1718 |
| 18 | -0.9021 | 1.6341 | 16.3864 | | | | | | 72.5000 | | | 0.0553 | | 1.2271 |
| 19 | -0.7765 | 1.6118 | 15.3746 | | | | | | 75.0000 | | | 0.0589 | | 1.2860 |
| 20 | -0.6493 | 1.5773 | 13.8094 | | | | | | 77.5000 | | | 0.0656 | | 1.3516 |
| 21 | -0.5209 | 1.5257 | 11.7341 | | | | | | 80.0000 | | | 0.0772 | | 1.4287 |
| 22 | -0.3916 | 1.4474 | 9.2173 | | | | | | 82.5000 | | | 0.0983 | | 1.5270 |
| 23 | -0.2615 | 1.3190 | 6.3505 | | | | | | 85.0000 | | | 0.1426 | | 1.6696 |
| 24 | -0.1309 | 1.0484 | 3.2437 | | | | | | 87.5000 | | | 0.2792 | | 1.9488 |
| 25 | 0.0000 | 0.8125 | 0.0200 | | | | | | 90.0000 | | | 0.2387 | | 2.1875 |
| 26 | | | | | | | | | | | Sum: | 2.1875 | | |

FIG. 59B

3-4 Cam A-Pat

| | Increment Time (t) - sec | | Cam Velocity (Vy) - in/sec | | Roller Circle Coordinates - inches | | | Vertical Translation | | Amplitude | | Phase Shift | | Horizontal Stretching |
|---|---|---|---|---|---|---|---|---|---|---|---|---|---|---|
| O | P | Q | R | S | T | U | V | W | X | Y | Z | AA | AB | AC |
| | | | | | X | Y (Cn) | | | | | | | | |
| | 0.0000 | | 2.1875 | | -2.1213 | 2.1213 | | 0.3500 | | 16.5000 | | -0.0200 | | 1.5000 |
| | 0.1763 | | 2.1875 | | -2.0268 | 2.2118 | | 0.3500 | | 16.5000 | | -0.0200 | | 1.5000 |
| | 0.0874 | | 2.1875 | | -1.9284 | 2.2981 | | 0.3500 | | 16.5000 | | -0.0200 | | 1.5000 |
| | 0.0582 | | 2.1875 | | -1.8263 | 2.3801 | | 0.3500 | | 16.5000 | | -0.0200 | | 1.5000 |
| | 0.0440 | | 2.1875 | | -1.7207 | 2.4575 | | 0.3500 | | 16.5000 | | -0.0200 | | 1.5000 |
| | 0.0359 | | 2.1875 | | -1.6119 | 2.5302 | | 0.3500 | | 16.5000 | | -0.0200 | | 1.5000 |
| | 0.0309 | | 2.1875 | | -1.5000 | 2.5981 | | 0.3500 | | 16.5000 | | -0.0200 | | 1.5000 |
| | 0.0277 | | 2.1875 | | -1.3852 | 2.6610 | | 0.3500 | | 16.5000 | | -0.0200 | | 1.5000 |
| | 0.0258 | | 2.1875 | | -1.2679 | 2.7189 | | 0.3500 | | 16.5000 | | -0.0200 | | 1.5000 |
| | 0.0248 | | 2.1875 | | -1.1481 | 2.7716 | | 0.3500 | | 16.5000 | | -0.0200 | | 1.5000 |
| | 0.0246 | | 2.1875 | | -1.0261 | 2.8191 | | 0.3500 | | 16.5000 | | -0.0200 | | 1.5000 |
| | 0.0253 | | 2.1875 | | -0.9021 | 2.8612 | | 0.3500 | | 16.5000 | | -0.0200 | | 1.5000 |
| | 0.0269 | | 2.1875 | | -0.7765 | 2.8978 | | 0.3500 | | 16.5000 | | -0.0200 | | 1.5000 |
| | 0.0300 | | 2.1875 | | -0.6493 | 2.9289 | | 0.3500 | | 16.5000 | | -0.0200 | | 1.5000 |
| | 0.0353 | | 2.1875 | | -0.5209 | 2.9544 | | 0.3500 | | 16.5000 | | -0.0200 | | 1.5000 |
| | 0.0449 | | 2.1875 | | -0.3916 | 2.9743 | | 0.3500 | | 16.5000 | | -0.0200 | | 1.5000 |
| | 0.0652 | | 2.1875 | | -0.2615 | 2.9886 | | 0.3500 | | 16.5000 | | -0.0200 | | 1.5000 |
| | 0.1276 | | 2.1875 | | -0.1309 | 2.9971 | | 0.3500 | | 16.5000 | | -0.0200 | | 1.5000 |
| | 0.1091 | | 2.1875 | | 0.0000 | 3.0000 | | 0.3500 | | 16.5000 | | -0.0200 | | 1.5000 |
| Sum: | 1.0000 | | | | | | | | | | | | | |

FIG 59C

3-4 Cam A-Pat

|    | A | B | C | D |
|----|---|---|---|---|
| 30 | Return Side Cam B | | | |
| 31 | X and Y Coordinates | | | |
| 32 | X | Y | | Degrees |
| 33 | 2.1213 | -2.1213 | | 45.0000 |
| 34 | 2.0268 | -2.5974 | | 47.5000 |
| 35 | 1.9284 | -2.8749 | | 50.0000 |
| 36 | 1.8263 | -3.0842 | | 52.5000 |
| 37 | 1.7207 | -3.2580 | | 55.0000 |
| 38 | 1.6119 | -3.4093 | | 57.5000 |
| 39 | 1.5000 | -3.5448 | | 60.0000 |
| 40 | 1.3852 | -3.6684 | | 62.5000 |
| 41 | 1.2679 | -3.7827 | | 65.0000 |
| 42 | 1.1481 | -3.8896 | | 67.5000 |
| 43 | 1.0261 | -3.9909 | | 70.0000 |
| 44 | 0.9021 | -4.0882 | | 72.5000 |
| 45 | 0.7765 | -4.1837 | | 75.0000 |
| 46 | 0.6493 | -4.2804 | | 77.5000 |
| 47 | 0.5209 | -4.3832 | | 80.0000 |
| 48 | 0.3916 | -4.5013 | | 82.5000 |
| 49 | 0.2615 | -4.6582 | | 85.0000 |
| 50 | 0.1309 | -4.9459 | | 87.5000 |
| 51 | 0.0000 | -5.1875 | | 90.0000 |
| 56 | Exit Side Return Cam B | | | |
| 57 | X and Y Coordinates | | | |
| 58 | X | Y | | Degrees |
| 59 | -2.1213 | -2.1213 | | 45.0000 |
| 60 | -2.2118 | -2.4123 | | 42.5000 |
| 61 | -2.2981 | -2.5052 | | 40.0000 |
| 62 | -2.3801 | -2.5304 | | 37.5000 |
| 63 | -2.4575 | -2.5212 | | 35.0000 |
| 64 | -2.5302 | -2.4910 | | 32.5000 |
| 65 | -2.5981 | -2.4467 | | 30.0000 |
| 66 | -2.6610 | -2.3926 | | 27.5000 |
| 67 | -2.7189 | -2.3316 | | 25.0000 |
| 68 | -2.7716 | -2.2660 | | 22.5000 |
| 69 | -2.8191 | -2.1979 | | 20.0000 |
| 70 | -2.8612 | -2.1292 | | 17.5000 |
| 71 | -2.8978 | -2.0624 | | 15.0000 |
| 72 | -2.9289 | -2.0009 | | 12.5000 |
| 73 | -2.9544 | -1.9497 | | 10.0000 |
| 74 | -2.9743 | -1.9186 | | 7.5000 |
| 75 | -2.9886 | -1.9311 | | 5.0000 |
| 76 | -2.9971 | -2.0796 | | 2.5000 |
| 77 | -3.0000 | -2.1875 | | 0.0000 |

FIG. 60A

3-4 Cam A-Pat

Cam A Calculations

Cam A - X and Y Coordinates

Roller Circle RPM

| | A | B | C | D | E | F | G |
|---|---|---|---|---|---|---|---|
| | X | Y | | | | | |
| 7 | =3*-COS(RADIANS(I7)) | =3*SIN(RADIANS(I7)) | | =W7+(-Y7*SIN(T7*AC7-AA7)) | Amplitude | | 16.5 |
| 8 | =3*-COS(RADIANS(I8)) | =U8-L8-N7 | | =W8+(-Y8*SIN(T8*AC8-AA8)) | Vertical Translation | | 0.04 |
| 9 | =3*-COS(RADIANS(I9)) | =U9-L9-N8 | | =W9+(-Y9*SIN(T9*AC9-AA9)) | | | |
| 10 | =3*-COS(RADIANS(I10)) | =U10-L10-N9 | | =W10+(-Y10*SIN(T10*AC10-AA10)) | Phase Shift | | -0.02 |
| 11 | =3*-COS(RADIANS(I11)) | =U11-L11-N10 | | =W11+(-Y11*SIN(T11*AC11-AA11)) | | | |
| 12 | =3*-COS(RADIANS(I12)) | =U12-L12-N11 | | =W12+(-Y12*SIN(T12*AC12-AA12)) | Horizontal Stretching | | 1.5 |
| 13 | =3*-COS(RADIANS(I13)) | =U13-L13-N12 | | =W13+(-Y13*SIN(T13*AC13-AA13)) | | | |
| 14 | =3*-COS(RADIANS(I14)) | =U14-L14-N13 | | =W14+(-Y14*SIN(T14*AC14-AA14)) | | | |
| 15 | =3*-COS(RADIANS(I15)) | =U15-L15-N14 | | =W15+(-Y15*SIN(T15*AC15-AA15)) | | | |
| 16 | =3*-COS(RADIANS(I16)) | =U16-L16-N15 | | =W16+(-Y16*SIN(T16*AC16-AA16)) | | | |
| 17 | =3*-COS(RADIANS(I17)) | =U17-L17-N16 | | =W17+(-Y17*SIN(T17*AC17-AA17)) | | | |
| 18 | =3*-COS(RADIANS(I18)) | =U18-L18-N17 | | =W18+(-Y18*SIN(T18*AC18-AA18)) | | | |
| 19 | =3*-COS(RADIANS(I19)) | =U19-L19-N18 | | =W19+(-Y19*SIN(T19*AC19-AA19)) | | | |
| 20 | =3*-COS(RADIANS(I20)) | =U20-L20-N19 | | =W20+(-Y20*SIN(T20*AC20-AA20)) | | | |
| 21 | =3*-COS(RADIANS(I21)) | =U21-L21-N20 | | =W21+(-Y21*SIN(T21*AC21-AA21)) | | | |
| 22 | =3*-COS(RADIANS(I22)) | =U22-L22-N21 | | =W22+(-Y22*SIN(T22*AC22-AA22)) | | | |
| 23 | =3*-COS(RADIANS(I23)) | =U23-L23-N22 | | =W23+(-Y23*SIN(T23*AC23-AA23)) | | | |
| 24 | =3*-COS(RADIANS(I24)) | =U24-L24-N23 | | =W24+(-Y24*SIN(T24*AC24-AA24)) | | | |
| 25 | =3*-COS(RADIANS(I25)) | =-3-2.1875 | | =W25+(-Y25*SIN(T25*AC25-AA25)) | | | |

FIG. 60B

3-4 Cam A-Pat

| | I | J | K | L | M | N | O | P |
|---|---|---|---|---|---|---|---|---|
| 1 | | | | | | | | |
| 2 | | | | | | | | |
| 3 | | | | | | | | |
| 4 | | | | | | | | |
| 5 | Degrees of Roller Circle Rotation | | | Increment | | Sum of the Increments | | Increment Time |
| 6 | | | | | | | | |
| 7 | 45 | | | =P7*R7 | | =SUM(L7) | | 0 |
| 8 | =I7+2.5 | | | =P8*R8 | | =SUM(L7:L8) | | =(60*0.0069)/D8 |
| 9 | =I8+2.5 | | | =P9*R9 | | =SUM(L7:L9) | | =(60*0.0069)/D9 |
| 10 | =I9+2.5 | | | =P10*R10 | | =SUM(L7:L10) | | =(60*0.0069)/D10 |
| 11 | =I10+2.5 | | | =P11*R11 | | =SUM(L7:L11) | | =(60*0.0069)/D11 |
| 12 | =I11+2.5 | | | =P12*R12 | | =SUM(L7:L12) | | =(60*0.0069)/D12 |
| 13 | =I12+2.5 | | | =P13*R13 | | =SUM(L7:L13) | | =(60*0.0069)/D13 |
| 14 | =I13+2.5 | | | =P14*R14 | | =SUM(L7:L14) | | =(60*0.0069)/D14 |
| 15 | =I14+2.5 | | | =P15*R15 | | =SUM(L7:L15) | | =(60*0.0069)/D15 |
| 16 | =I15+2.5 | | | =P16*R16 | | =SUM(L7:L16) | | =(60*0.0069)/D16 |
| 17 | =I16+2.5 | | | =P17*R17 | | =SUM(L7:L17) | | =(60*0.0069)/D17 |
| 18 | =I17+2.5 | | | =P18*R18 | | =SUM(L7:L18) | | =(60*0.0069)/D18 |
| 19 | =I18+2.5 | | | =P19*R19 | | =SUM(L7:L19) | | =(60*0.0069)/D19 |
| 20 | =I19+2.5 | | | =P20*R20 | | =SUM(L7:L20) | | =(60*0.0069)/D20 |
| 21 | =I20+2.5 | | | =P21*R21 | | =SUM(L7:L21) | | =(60*0.0069)/D21 |
| 22 | =I21+2.5 | | | =P22*R22 | | =SUM(L7:L22) | | =(60*0.0069)/D22 |
| 23 | =I22+2.5 | | | =P23*R23 | | =SUM(L7:L23) | | =(60*0.0069)/D23 |
| 24 | =I23+2.5 | | | =P24*R24 | | =SUM(L7:L24) | | =(60*0.0069)/D24 |
| 25 | =I24+2.5 | | | =U25-(B25+(N24)) | | =SUM(L7:L25) | | =L25/2.1875 |
| 26 | | | Sum: | =SUM(L7:L25) | | | Sum: | =SUM(P7:P25) |

FIG. 60C

3-4 Cam A-Pat

| | Q | R | S | T | U | V | W | X |
|---|---|---|---|---|---|---|---|---|
| 1 | | | | | | | | |
| 2 | | | | | | | | |
| 3 | | | | | | | | |
| 4 | | | | | | | | |
| 5 | | | Cam Velocity (inches/sec.) | Roller Circle Coordinates | | | Vertical Translation | |
| 6 | | | | X | Y | | | |
| 7 | | | =2.1875/1 | =3*(-COS(RADIANS(I7))) | =3*SIN(RADIANS(I7)) | | =G9 | |
| 8 | | | =2.1875/1 | =3*(-COS(RADIANS(I8))) | =3*SIN(RADIANS(I8)) | | =W7 | |
| 9 | | | =2.1875/1 | =3*(-COS(RADIANS(I9))) | =3*SIN(RADIANS(I9)) | | =W8 | |
| 10 | | | =2.1875/1 | =3*(-COS(RADIANS(I10))) | =3*SIN(RADIANS(I10)) | | =W9 | |
| 11 | | | =2.1875/1 | =3*(-COS(RADIANS(I11))) | =3*SIN(RADIANS(I11)) | | =W10 | |
| 12 | | | =2.1875/1 | =3*(-COS(RADIANS(I12))) | =3*SIN(RADIANS(I12)) | | =W11 | |
| 13 | | | =2.1875/1 | =3*(-COS(RADIANS(I13))) | =3*SIN(RADIANS(I13)) | | =W12 | |
| 14 | | | =2.1875/1 | =3*(-COS(RADIANS(I14))) | =3*SIN(RADIANS(I14)) | | =W13 | |
| 15 | | | =2.1875/1 | =3*(-COS(RADIANS(I15))) | =3*SIN(RADIANS(I15)) | | =W14 | |
| 16 | | | =2.1875/1 | =3*(-COS(RADIANS(I16))) | =3*SIN(RADIANS(I16)) | | =W15 | |
| 17 | | | =2.1875/1 | =3*(-COS(RADIANS(I17))) | =3*SIN(RADIANS(I17)) | | =W16 | |
| 18 | | | =2.1875/1 | =3*(-COS(RADIANS(I18))) | =3*SIN(RADIANS(I18)) | | =W17 | |
| 19 | | | =2.1875/1 | =3*(-COS(RADIANS(I19))) | =3*SIN(RADIANS(I19)) | | =W18 | |
| 20 | | | =2.1875/1 | =3*(-COS(RADIANS(I20))) | =3*SIN(RADIANS(I20)) | | =W19 | |
| 21 | | | =2.1875/1 | =3*(-COS(RADIANS(I21))) | =3*SIN(RADIANS(I21)) | | =W20 | |
| 22 | | | =2.1875/1 | =3*(-COS(RADIANS(I22))) | =3*SIN(RADIANS(I22)) | | =W21 | |
| 23 | | | =2.1875/1 | =3*(-COS(RADIANS(I23))) | =3*SIN(RADIANS(I23)) | | =W22 | |
| 24 | | | =2.1875/1 | =3*(-COS(RADIANS(I24))) | =3*SIN(RADIANS(I24)) | | =W23 | |
| 25 | | | =2.1875/1 | =3*(-COS(RADIANS(I25))) | =3*SIN(RADIANS(I25)) | | =W24 | |
| 26 | | | | | | | | |

FIG. 60D

3-4 Cam A-Pat

| | Y | Z | AA | AB | AC |
|---|---|---|---|---|---|
| 1 | | | | | |
| 2 | | | | | |
| 3 | | | | | |
| 4 | | | | | |
| 5 | | | | | |
| 6 | Amplitude | | Phase Shift | | Horizontal Stretching |
| 7 | =G7 | | =G12 | | =G15 |
| 8 | =Y7 | | =AA7 | | =AC7 |
| 9 | =Y8 | | =AA8 | | =AC8 |
| 10 | =Y9 | | =AA9 | | =AC9 |
| 11 | =Y10 | | =AA10 | | =AC10 |
| 12 | =Y11 | | =AA11 | | =AC11 |
| 13 | =Y12 | | =AA12 | | =AC12 |
| 14 | =Y13 | | =AA13 | | =AC13 |
| 15 | =Y14 | | =AA14 | | =AC14 |
| 16 | =Y15 | | =AA15 | | =AC15 |
| 17 | =Y16 | | =AA16 | | =AC16 |
| 18 | =Y17 | | =AA17 | | =AC17 |
| 19 | =Y18 | | =AA18 | | =AC18 |
| 20 | =Y19 | | =AA19 | | =AC19 |
| 21 | =Y20 | | =AA20 | | =AC20 |
| 22 | =Y21 | | =AA21 | | =AC21 |
| 23 | =Y22 | | =AA22 | | =AC22 |
| 24 | =Y23 | | =AA23 | | =AC23 |
| 25 | =Y24 | | =AA24 | | =AC24 |
| 26 | | | | | |

FIG. 60E  3-4 Cam A-Pat

| | A | B | C | D |
|---|---|---|---|---|
| 30 | \multicolumn{2}{c}{Return Side Cam B} | | |
| 32 | X Coordinate | Y Coordinate | | Degrees |
| 33 | =3*COS(RADIANS(D33)) | =3*(-SIN(RADIANS(D33)))-N7 | | 45 |
| 34 | =3*COS(RADIANS(D34)) | =3*(-SIN(RADIANS(D34)))-N8 | | =D33+2.5 |
| 35 | =3*COS(RADIANS(D35)) | =3*(-SIN(RADIANS(D35)))-N9 | | =D34+2.5 |
| 36 | =3*COS(RADIANS(D36)) | =3*(-SIN(RADIANS(D36)))-N10 | | =D35+2.5 |
| 37 | =3*COS(RADIANS(D37)) | =3*(-SIN(RADIANS(D37)))-N11 | | =D36+2.5 |
| 38 | =3*COS(RADIANS(D38)) | =3*(-SIN(RADIANS(D38)))-N12 | | =D37+2.5 |
| 39 | =3*COS(RADIANS(D39)) | =3*(-SIN(RADIANS(D39)))-N13 | | =D38+2.5 |
| 40 | =3*COS(RADIANS(D40)) | =3*(-SIN(RADIANS(D40)))-N14 | | =D39+2.5 |
| 41 | =3*COS(RADIANS(D41)) | =3*(-SIN(RADIANS(D41)))-N15 | | =D40+2.5 |
| 42 | =3*COS(RADIANS(D42)) | =3*(-SIN(RADIANS(D42)))-N16 | | =D41+2.5 |
| 43 | =3*COS(RADIANS(D43)) | =3*(-SIN(RADIANS(D43)))-N17 | | =D42+2.5 |
| 44 | =3*COS(RADIANS(D44)) | =3*(-SIN(RADIANS(D44)))-N18 | | =D43+2.5 |
| 45 | =3*COS(RADIANS(D45)) | =3*(-SIN(RADIANS(D45)))-N19 | | =D44+2.5 |
| 46 | =3*COS(RADIANS(D46)) | =3*(-SIN(RADIANS(D46)))-N20 | | =D45+2.5 |
| 47 | =3*COS(RADIANS(D47)) | =3*(-SIN(RADIANS(D47)))-N21 | | =D46+2.5 |
| 48 | =3*COS(RADIANS(D48)) | =3*(-SIN(RADIANS(D48)))-N22 | | =D47+2.5 |
| 49 | =3*COS(RADIANS(D49)) | =3*(-SIN(RADIANS(D49)))-N23 | | =D48+2.5 |
| 50 | =3*COS(RADIANS(D50)) | =3*(-SIN(RADIANS(D50)))-N24 | | =D49+2.5 |
| 51 | =3*COS(RADIANS(D51)) | =3*(-SIN(RADIANS(D51)))-N25 | | =D50+2.5 |
| 56 | \multicolumn{2}{c}{Exit Side Return Cam B} | | |
| 58 | X Coordinate | Y Coordinate | | Degrees |
| 59 | =3*(-COS(RADIANS(D59))) | =3*(-SIN(RADIANS(D59)))-N7 | | 45 |
| 60 | =3*(-COS(RADIANS(D60))) | =3*(-SIN(RADIANS(D60)))-N8 | | =D59-2.5 |
| 61 | =3*(-COS(RADIANS(D61))) | =3*(-SIN(RADIANS(D61)))-N9 | | =D60-2.5 |
| 62 | =3*(-COS(RADIANS(D62))) | =3*(-SIN(RADIANS(D62)))-N10 | | =D61-2.5 |
| 63 | =3*(-COS(RADIANS(D63))) | =3*(-SIN(RADIANS(D63)))-N11 | | =D62-2.5 |
| 64 | =3*(-COS(RADIANS(D64))) | =3*(-SIN(RADIANS(D64)))-N12 | | =D63-2.5 |
| 65 | =3*(-COS(RADIANS(D65))) | =3*(-SIN(RADIANS(D65)))-N13 | | =D64-2.5 |
| 66 | =3*(-COS(RADIANS(D66))) | =3*(-SIN(RADIANS(D66)))-N14 | | =D65-2.5 |
| 67 | =3*(-COS(RADIANS(D67))) | =3*(-SIN(RADIANS(D67)))-N15 | | =D66-2.5 |
| 68 | =3*(-COS(RADIANS(D68))) | =3*(-SIN(RADIANS(D68)))-N16 | | =D67-2.5 |
| 69 | =3*(-COS(RADIANS(D69))) | =3*(-SIN(RADIANS(D69)))-N17 | | =D68-2.5 |
| 70 | =3*(-COS(RADIANS(D70))) | =3*(-SIN(RADIANS(D70)))-N18 | | =D69-2.5 |
| 71 | =3*(-COS(RADIANS(D71))) | =3*(-SIN(RADIANS(D71)))-N19 | | =D70-2.5 |
| 72 | =3*(-COS(RADIANS(D72))) | =3*(-SIN(RADIANS(D72)))-N20 | | =D71-2.5 |
| 73 | =3*(-COS(RADIANS(D73))) | =3*(-SIN(RADIANS(D73)))-N21 | | =D72-2.5 |
| 74 | =3*(-COS(RADIANS(D74))) | =3*(-SIN(RADIANS(D74)))-N22 | | =D73-2.5 |
| 75 | =3*(-COS(RADIANS(D75))) | =3*(-SIN(RADIANS(D75)))-N23 | | =D74-2.5 |
| 76 | =3*(-COS(RADIANS(D76))) | =3*(-SIN(RADIANS(D76)))-N24 | | =D75-2.5 |
| 77 | =3*(-COS(RADIANS(D77))) | =3*(-SIN(RADIANS(D77)))-N25 | | =D76-2.5 |

FIG. 61A 3-4 Cam A-Pat

Cell: A7
Note: Since Cos is always negative in Quadrant II;
X=3*(-cos(45))

Cell: B7
Note: This is the start position which must be fixed. The roller radius and the number of rollers dictate where this point lies (see drawing)

Cell: P7
Note: This number is fixed at zero because this is in fact the start point. The cam is not moving at this point.
For example: The time in cell P8 (0.1763) is the time the cam takes to move from position 1 (start position) to position 2 (see drawing), so the time in cell P7 is actually the time the cam takes to move from position 1 to position 1, which is obviously zero.

Cell: R7
Note: The velocity is distance divided by time. In this case we are using 2.1875 for the distance the cam moves (stroke) and the time is 1 second (cycle time).

Cell: T7
Note: Since Cos is always negative in Quadrant II;
X=3*(-cos(45))

Cell: B25
Note: This end point of the cam must be fixed because the point must be at Y 3.00 inches after the cam has moved 2.1875 inches (stroke). This will have moved the roller circle 45 degrees. As a result, when the cam is in the start position, the stroke (2.1875) must be subtracted from 3.00 inches.

Cell: L25
Note: This increment is calculated differently because the y-coordinate of the cam (the end point) is a known (fixed) value.

Cell: P25
Note: This increment time is calculated differently because the y-coordinate of the cam (the end point) is a known (fixed) value.

FIG. 61B

3-4 Cam A-Pat

Cell: B33
Note: Since Sin is always negative in Quadrant IV;
  Y=3*(-sin(45))
  The sum of the previous increments must be subtracted from this number (see demonstration).

Cell: A59
Note: Cosine is always negative in Quadrant II

Cell: B59
Note: Since Sin is always negative in Quadrant III;
  Y=3*(-sin(45))
  The sum of the previous increments must be subtracted from this number (see demonstration).

FIG. 62A

3-4 Cam B-Pat

Cam B Calculations

| | A | B | C | D | E | F | G | H | I | J | K | L | M | N | O | P |
|---|---|---|---|---|---|---|---|---|---|---|---|---|---|---|---|---|
| 1 | | | | | | | | | | | | | | | | |
| 2 | Cam B - X & Y | | Cam Y- | | Roller | | | | | | | | | | | |
| 3 | Coordinates | | Coordinates | | Circle | | Amplitude | 20.0000 | | Degrees of | | | | Sum | | Increment |
| 4 | - Inches | | before stroke | | RPM | | Vertical | 0.0000 | | roller circle | | | | of the | | Time |
| 5 | X | Y | is added | | | | Translation | | | rotation | | Increment | | Increments | | |
| 6 | | | | | | | Phase Shift | 0.0000 | | | | | | | | |
| 7 | -2.1213 | -2.1213 | 0.0662 | | 0.0408 | | Horizontal Stretching | 1.4800 | | 45.0000 | | 0.5537 | | 2.1875 | | 0.2531 |
| 8 | -2.0268 | -2.7656 | -0.5781 | | 2.8299 | | | | | 47.5000 | | 0.3200 | | 1.6338 | | 0.1463 |
| 9 | -1.9284 | -3.1719 | -0.9844 | | 5.6733 | | | | | 50.0000 | | 0.1596 | | 1.3138 | | 0.0730 |
| 10 | -1.8263 | -3.4134 | -1.2259 | | 8.4951 | | | | | 52.5000 | | 0.1066 | | 1.1541 | | 0.0487 |
| 11 | -1.7207 | -3.5974 | -1.4099 | | 11.2087 | | | | | 55.0000 | | 0.0808 | | 1.0475 | | 0.0369 |
| 12 | -1.6119 | -3.7509 | -1.5634 | | 13.7201 | | | | | 57.5000 | | 0.0660 | | 0.9667 | | 0.0302 |
| 13 | -1.5000 | -3.8849 | -1.6974 | | 15.9313 | | | | | 60.0000 | | 0.0568 | | 0.9007 | | 0.0260 |
| 14 | -1.3852 | -4.0047 | -1.8172 | | 17.7457 | | | | | 62.5000 | | 0.0510 | | 0.8439 | | 0.0233 |
| 15 | -1.2679 | -4.1136 | -1.9261 | | 19.0732 | | | | | 65.0000 | | 0.0475 | | 0.7928 | | 0.0217 |
| 16 | -1.1481 | -4.2138 | -2.0263 | | 19.8356 | | | | | 67.5000 | | 0.0457 | | 0.7454 | | 0.0209 |
| 17 | -1.0261 | -4.3069 | -2.1194 | | 19.9727 | | | | | 70.0000 | | 0.0453 | | 0.6997 | | 0.0207 |
| 18 | -0.9021 | -4.3943 | -2.2068 | | 19.4472 | | | | | 72.5000 | | 0.0466 | | 0.6544 | | 0.0213 |
| 19 | -0.7765 | -4.4775 | -2.2900 | | 18.2484 | | | | | 75.0000 | | 0.0496 | | 0.6078 | | 0.0227 |
| 20 | -0.6493 | -4.5582 | -2.3707 | | 16.3952 | | | | | 77.5000 | | 0.0552 | | 0.5582 | | 0.0253 |
| 21 | -0.5209 | -4.6390 | -2.4515 | | 13.9370 | | | | | 80.0000 | | 0.0650 | | 0.5029 | | 0.0297 |
| 22 | -0.3916 | -4.7239 | -2.5364 | | 10.9527 | | | | | 82.5000 | | 0.0827 | | 0.4379 | | 0.0378 |
| 23 | -0.2615 | -4.8208 | -2.6333 | | 7.5477 | | | | | 85.0000 | | 0.1200 | | 0.3553 | | 0.0549 |
| 24 | -0.1309 | -4.9494 | -2.7619 | | 3.8492 | | | | | 87.5000 | | 0.2353 | | 0.2353 | | 0.1076 |
| 25 | 0.0000 | -5.1875 | -3.0000 | | 0.0000 | | | | | 90.0000 | | 0.0000 | | 0.0000 | | 0.0000 |
| 26 | | | | | | | | | | | Sum: | 2.1875 | | | Sum: | 1.0000 |

FIG. 62B

3-4 Cam B-Pat

| | Cam Velocity | Roller Circle X & Y Coordinates | | Vertical Translation | Amplitude | Phase Shift | Horizontal Stretching |
|---|---|---|---|---|---|---|---|
| | | X | Y | | | | |
| 7 | 2.1875 | -2.1213 | -2.1213 | 0.0000 | 20.0000 | 0.0000 | 1.4800 |
| 8 | 2.1875 | -2.0268 | -2.2118 | 0.0000 | 20.0000 | 0.0000 | 1.4800 |
| 9 | 2.1875 | -1.9284 | -2.2981 | 0.0000 | 20.0000 | 0.0000 | 1.4800 |
| 10 | 2.1875 | -1.8263 | -2.3801 | 0.0000 | 20.0000 | 0.0000 | 1.4800 |
| 11 | 2.1875 | -1.7207 | -2.4575 | 0.0000 | 20.0000 | 0.0000 | 1.4800 |
| 12 | 2.1875 | -1.6119 | -2.5302 | 0.0000 | 20.0000 | 0.0000 | 1.4800 |
| 13 | 2.1875 | -1.5000 | -2.5981 | 0.0000 | 20.0000 | 0.0000 | 1.4800 |
| 14 | 2.1875 | -1.3852 | -2.6610 | 0.0000 | 20.0000 | 0.0000 | 1.4800 |
| 15 | 2.1875 | -1.2679 | -2.7189 | 0.0000 | 20.0000 | 0.0000 | 1.4800 |
| 16 | 2.1875 | -1.1481 | -2.7716 | 0.0000 | 20.0000 | 0.0000 | 1.4800 |
| 17 | 2.1875 | -1.0261 | -2.8191 | 0.0000 | 20.0000 | 0.0000 | 1.4800 |
| 18 | 2.1875 | -0.9021 | -2.8612 | 0.0000 | 20.0000 | 0.0000 | 1.4800 |
| 19 | 2.1875 | -0.7765 | -2.8978 | 0.0000 | 20.0000 | 0.0000 | 1.4800 |
| 20 | 2.1875 | -0.6493 | -2.9289 | 0.0000 | 20.0000 | 0.0000 | 1.4800 |
| 21 | 2.1875 | -0.5209 | -2.9544 | 0.0000 | 20.0000 | 0.0000 | 1.4800 |
| 22 | 2.1875 | -0.3916 | -2.9743 | 0.0000 | 20.0000 | 0.0000 | 1.4800 |
| 23 | 2.1875 | -0.2615 | -2.9886 | 0.0000 | 20.0000 | 0.0000 | 1.4800 |
| 24 | 2.1875 | -0.1309 | -2.9971 | 0.0000 | 20.0000 | 0.0000 | 1.4800 |
| 25 | 2.1875 | 0.0000 | -3.0000 | 0.0000 | 20.0000 | 0.0000 | 1.4800 |

FIG 62C

3-4 Cam B-Pat

|  | A | B | C | D |
|---|---|---|---|---|
| 30 | Return Side Cam A | | | |
| 31 | X and Y Coordinates | | | |
| 32 | X | Y | | Degrees |
| 33 | -2.1213 | 2.1213 | | 45.0000 |
| 34 | -2.2118 | 1.4730 | | 42.5000 |
| 35 | -2.2981 | 1.0546 | | 40.0000 |
| 36 | -2.3801 | 0.7929 | | 37.5000 |
| 37 | -2.4575 | 0.5808 | | 35.0000 |
| 38 | -2.5302 | 0.3911 | | 32.5000 |
| 39 | -2.5981 | 0.2132 | | 30.0000 |
| 40 | -2.6610 | 0.0416 | | 27.5000 |
| 41 | -2.7189 | -0.1268 | | 25.0000 |
| 42 | -2.7716 | -0.2941 | | 22.5000 |
| 43 | -2.8191 | -0.4617 | | 20.0000 |
| 44 | -2.8612 | -0.6310 | | 17.5000 |
| 45 | -2.8978 | -0.8033 | | 15.0000 |
| 46 | -2.9289 | -0.9800 | | 12.5000 |
| 47 | -2.9544 | -1.1636 | | 10.0000 |
| 48 | -2.9743 | -1.3580 | | 7.5000 |
| 49 | -2.9886 | -1.5708 | | 5.0000 |
| 50 | -2.9971 | -1.8214 | | 2.5000 |
| 51 | -3.0000 | -2.1875 | | 0.0000 |
| 56 | Exit Side Return Cam A | | | |
| 57 | X and Y Coordinates | | | |
| 58 | X | Y | | Degrees |
| 59 | 2.1213 | 2.1213 | | 45.0000 |
| 60 | 2.0268 | 1.6581 | | 47.5000 |
| 61 | 1.9284 | 1.4244 | | 50.0000 |
| 62 | 1.8263 | 1.3467 | | 52.5000 |
| 63 | 1.7207 | 1.3175 | | 55.0000 |
| 64 | 1.6119 | 1.3094 | | 57.5000 |
| 65 | 1.5000 | 1.3113 | | 60.0000 |
| 66 | 1.3852 | 1.3174 | | 62.5000 |
| 67 | 1.2679 | 1.3243 | | 65.0000 |
| 68 | 1.1481 | 1.3295 | | 67.5000 |
| 69 | 1.0261 | 1.3313 | | 70.0000 |
| 70 | 0.9021 | 1.3280 | | 72.5000 |
| 71 | 0.7765 | 1.3181 | | 75.0000 |
| 72 | 0.6493 | 1.2996 | | 77.5000 |
| 73 | 0.5209 | 1.2698 | | 80.0000 |
| 74 | 0.3916 | 1.2248 | | 82.5000 |
| 75 | 0.2615 | 1.1563 | | 85.0000 |
| 76 | 0.1309 | 1.0449 | | 87.5000 |
| 77 | 0.0000 | 0.8125 | | 90.0000 |

FIG. 63A

3-4 Cam B-Pat

| | A | B | C | D | E | F |
|---|---|---|---|---|---|---|
| 1 | Cam B Calculations | | | | | |
| 2 | | | | | | |
| 3 | | | | | | |
| 4 | Cam B - X and Y Coordinates | | Cam Y - Coordinates before stroke is added | | Roller Circle RPM | |
| 5 | | | | | | |
| 6 | X | Y | | | | |
| 7 | =3*(-COS(RADIANS(J7))) | =C7-2.1875 | =3*(-SIN(RADIANS(J7)))+2.1875 | | =X7-Z7*SIN(AD7*A7+AB7) | |
| 8 | =3*(-COS(RADIANS(J8))) | =C8-2.1875 | =(L8+U8+N9) | | =X8-Z8*SIN(AD8*A8+AB8) | |
| 9 | =3*(-COS(RADIANS(J9))) | =C9-2.1875 | =(L9+U9+N10)) | | =X9-Z9*SIN(AD9*A9+AB9) | |
| 10 | =3*(-COS(RADIANS(J10))) | =C10-2.1875 | =(L10+U10+N11) | | =X10-Z10*SIN(AD10*A10+AB10) | |
| 11 | =3*(-COS(RADIANS(J11))) | =C11-2.1875 | =(L11+U11+N12) | | =X11-Z11*SIN(AD11*A11+AB11) | |
| 12 | =3*(-COS(RADIANS(J12))) | =C12-2.1875 | =(L12+U12+N13) | | =X12-Z12*SIN(AD12*A12+AB12) | |
| 13 | =3*(-COS(RADIANS(J13))) | =C13-2.1875 | =(L13+U13+N14) | | =X13-Z13*SIN(AD13*A13+AB13) | |
| 14 | =3*(-COS(RADIANS(J14))) | =C14-2.1875 | =(L14+U14+N15) | | =X14-Z14*SIN(AD14*A14+AB14) | |
| 15 | =3*(-COS(RADIANS(J15))) | =C15-2.1875 | =(L15+U15+N16) | | =X15-Z15*SIN(AD15*A15+AB15) | |
| 16 | =3*(-COS(RADIANS(J16))) | =C16-2.1875 | =(L16+U16+N17) | | =X16-Z16*SIN(AD16*A16+AB16) | |
| 17 | =3*(-COS(RADIANS(J17))) | =C17-2.1875 | =(L17+U17+N18) | | =X17-Z17*SIN(AD17*A17+AB17) | |
| 18 | =3*(-COS(RADIANS(J18))) | =C18-2.1875 | =(L18+U18+N19) | | =X18-Z18*SIN(AD18*A18+AB18) | |
| 19 | =3*(-COS(RADIANS(J19))) | =C19-2.1875 | =(L19+U19+N20) | | =X19-Z19*SIN(AD19*A19+AB19) | |
| 20 | =3*(-COS(RADIANS(J20))) | =C20-2.1875 | =(L20+U20+N21) | | =X20-Z20*SIN(AD20*A20+AB20) | |
| 21 | =3*(-COS(RADIANS(J21))) | =C21-2.1875 | =(L21+U21+N22) | | =X21-Z21*SIN(AD21*A21+AB21) | |
| 22 | =3*(-COS(RADIANS(J22))) | =C22-2.1875 | =(L22+U22+N23) | | =X22-Z22*SIN(AD22*A22+AB22) | |
| 23 | =3*(-COS(RADIANS(J23))) | =C23-2.1875 | =(L23+U23+N24) | | =X23-Z23*SIN(AD23*A23+AB23) | |
| 24 | =3*(-COS(RADIANS(J24))) | =C24-2.1875 | =(L24+U24+N25) | | =X24-Z24*SIN(AD24*A24+AB24) | |
| 25 | =3*(-COS(RADIANS(J25))) | =C25-2.1875 | =3*(-SIN(RADIANS(J25))) | | =X25-Z25*SIN(AD25*A25+AB25) | |
| 26 | | | | | | |

FIG. 63B

3-4 Cam B-Pat

| | G | H | I | J | K | L | M | N |
|---|---|---|---|---|---|---|---|---|
| 1 | | | | | | | | |
| 2 | | | | | | | | |
| 3 | | | | | | | | |
| 4 | | | | | | | | |
| 5 | | | | Degrees of roller circle rotation | | Increment | | Sum of the Increments |
| 6 | | | | | | | | |
| 7 | Amplitude | 20.0000 | | 45 | | =C7-(U7+N8) | | =SUM(L7:L25) |
| 8 | | | | =J7+2.5 | | =R8*P8 | | =SUM(L8:L25) |
| 9 | Vertical Translation | 0.0000 | | =J8+2.5 | | =R9*P9 | | =SUM(L9:L25) |
| 10 | | | | =J9+2.5 | | =R10*P10 | | =SUM(L10:L25) |
| 11 | | | | =J10+2.5 | | =R11*P11 | | =SUM(L11:L25) |
| 12 | Phase Shift | 0.0000 | | =J11+2.5 | | =R12*P12 | | =SUM(L12:L25) |
| 13 | | | | =J12+2.5 | | =R13*P13 | | =SUM(L13:L25) |
| 14 | | | | =J13+2.5 | | =R14*P14 | | =SUM(L14:L25) |
| 15 | Horizontal Stretching | 1.4800 | | =J14+2.5 | | =R15*P15 | | =SUM(L15:L25) |
| 16 | | | | =J15+2.5 | | =R16*P16 | | =SUM(L16:L25) |
| 17 | | | | =J16+2.5 | | =R17*P17 | | =SUM(L17:L25) |
| 18 | | | | =J17+2.5 | | =R18*P18 | | =SUM(L18:L25) |
| 19 | | | | =J18+2.5 | | =R19*P19 | | =SUM(L19:L25) |
| 20 | | | | =J19+2.5 | | =R20*P20 | | =SUM(L20:L25) |
| 21 | | | | =J20+2.5 | | =R21*P21 | | =SUM(L21:L25) |
| 22 | | | | =J21+2.5 | | =R22*P22 | | =SUM(L22:L25) |
| 23 | | | | =J22+2.5 | | =R23*P23 | | =SUM(L23:L25) |
| 24 | | | | =J23+2.5 | | =R24*P24 | | =SUM(L24:L25) |
| 25 | | | | =J24+2.5 | | =R25*P25 | | =SUM(L25) |
| 26 | | | | | Sum: | =SUM(L7:L25) | | |

FIG. 63C

3-4 Cam B-Pat

| | O | P | Q | R | S | T | U | V |
|---|---|---|---|---|---|---|---|---|
| 1 | | | | | | | | |
| 2 | | | | | | | | |
| 3 | | | | | | | | |
| 4 | | | | | | | | |
| 5 | | | | | Cam Velocity | | Roller Circle X and Y Coordinates | |
| 6 | | Increment Time | | | | | X | Y |
| 7 | | =L7/2.1875 | | | =2.1875/1 | | =3*(-COS(RADIANS(J7))) | =3*(-SIN(RADIANS(J7))) |
| 8 | | =(60*0.0069)/E8 | | | =2.1875/1 | | =3*(-COS(RADIANS(J8))) | =3*(-SIN(RADIANS(J8))) |
| 9 | | =(60*0.0069)/E9 | | | =2.1875/1 | | =3*(-COS(RADIANS(J9))) | =3*(-SIN(RADIANS(J9))) |
| 10 | | =(60*0.0069)/E10 | | | =2.1875/1 | | =3*(-COS(RADIANS(J10))) | =3*(-SIN(RADIANS(J10))) |
| 11 | | =(60*0.0069)/E11 | | | =2.1875/1 | | =3*(-COS(RADIANS(J11))) | =3*(-SIN(RADIANS(J11))) |
| 12 | | =(60*0.0069)/E12 | | | =2.1875/1 | | =3*(-COS(RADIANS(J12))) | =3*(-SIN(RADIANS(J12))) |
| 13 | | =(60*0.0069)/E13 | | | =2.1875/1 | | =3*(-COS(RADIANS(J13))) | =3*(-SIN(RADIANS(J13))) |
| 14 | | =(60*0.0069)/E14 | | | =2.1875/1 | | =3*(-COS(RADIANS(J14))) | =3*(-SIN(RADIANS(J14))) |
| 15 | | =(60*0.0069)/E15 | | | =2.1875/1 | | =3*(-COS(RADIANS(J15))) | =3*(-SIN(RADIANS(J15))) |
| 16 | | =(60*0.0069)/E16 | | | =2.1875/1 | | =3*(-COS(RADIANS(J16))) | =3*(-SIN(RADIANS(J16))) |
| 17 | | =(60*0.0069)/E17 | | | =2.1875/1 | | =3*(-COS(RADIANS(J17))) | =3*(-SIN(RADIANS(J17))) |
| 18 | | =(60*0.0069)/E18 | | | =2.1875/1 | | =3*(-COS(RADIANS(J18))) | =3*(-SIN(RADIANS(J18))) |
| 19 | | =(60*0.0069)/E19 | | | =2.1875/1 | | =3*(-COS(RADIANS(J19))) | =3*(-SIN(RADIANS(J19))) |
| 20 | | =(60*0.0069)/E20 | | | =2.1875/1 | | =3*(-COS(RADIANS(J20))) | =3*(-SIN(RADIANS(J20))) |
| 21 | | =(60*0.0069)/E21 | | | =2.1875/1 | | =3*(-COS(RADIANS(J21))) | =3*(-SIN(RADIANS(J21))) |
| 22 | | =(60*0.0069)/E22 | | | =2.1875/1 | | =3*(-COS(RADIANS(J22))) | =3*(-SIN(RADIANS(J22))) |
| 23 | | =(60*0.0069)/E23 | | | =2.1875/1 | | =3*(-COS(RADIANS(J23))) | =3*(-SIN(RADIANS(J23))) |
| 24 | | =(60*0.0069)/E24 | | | =2.1875/1 | | =3*(-COS(RADIANS(J24))) | =3*(-SIN(RADIANS(J24))) |
| 25 | | 0 | | | | | =3*(-COS(RADIANS(J25))) | =3*(-SIN(RADIANS(J25))) |
| 26 | Sum: | =SUM(P7:P25) | | | | | | |

FIG. 63D

3-4 Cam B-Pat

| | W | X | Y | Z | AA | AB | AC | AD |
|---|---|---|---|---|---|---|---|---|
| 1 | | | | | | | | |
| 2 | | | | | | | | |
| 3 | | | | | | | | |
| 4 | | | | | | | | |
| 5 | | | | | | | | |
| 6 | | Vertical Translation | | Amplitude | | Phase Shift | | Horizontal Stretching |
| 7 | | =H9 | | =H7 | | =H12 | | =H15 |
| 8 | | =X7 | | =Z7 | | =AB7 | | =AD7 |
| 9 | | =X8 | | =Z8 | | =AB8 | | =AD8 |
| 10 | | =X9 | | =Z9 | | =AB9 | | =AD9 |
| 11 | | =X10 | | =Z10 | | =AB10 | | =AD10 |
| 12 | | =X11 | | =Z11 | | =AB11 | | =AD11 |
| 13 | | =X12 | | =Z12 | | =AB12 | | =AD12 |
| 14 | | =X13 | | =Z13 | | =AB13 | | =AD13 |
| 15 | | =X14 | | =Z14 | | =AB14 | | =AD14 |
| 16 | | =X15 | | =Z15 | | =AB15 | | =AD15 |
| 17 | | =X16 | | =Z16 | | =AB16 | | =AD16 |
| 18 | | =X17 | | =Z17 | | =AB17 | | =AD17 |
| 19 | | =X18 | | =Z18 | | =AB18 | | =AD18 |
| 20 | | =X19 | | =Z19 | | =AB19 | | =AD19 |
| 21 | | =X20 | | =Z20 | | =AB20 | | =AD20 |
| 22 | | =X21 | | =Z21 | | =AB21 | | =AD21 |
| 23 | | =X22 | | =Z22 | | =AB22 | | =AD22 |
| 24 | | =X23 | | =Z23 | | =AB23 | | =AD23 |
| 25 | | =X24 | | =Z24 | | =AB24 | | =AD24 |
| 26 | | | | | | | | |

FIG. 63E   3-4 Cam B-Pat

| | A | B | C | D |
|---|---|---|---|---|
| 30 | \multicolumn{2}{} Return Side Cam A | | |
| 32 | X Coordinate | Y Coordinate | | Degrees |
| 33 | =3*(-COS(RADIANS(D33))) | =3*SIN(RADIANS(D33))+N7-2.1875 | | 45 |
| 34 | =3*(-COS(RADIANS(D34))) | =3*SIN(RADIANS(D34))+N8-2.1875 | | =D33-2.5 |
| 35 | =3*(-COS(RADIANS(D35))) | =3*SIN(RADIANS(D35))+N9-2.1875 | | =D34-2.5 |
| 36 | =3*(-COS(RADIANS(D36))) | =3*SIN(RADIANS(D36))+N10-2.1875 | | =D35-2.5 |
| 37 | =3*(-COS(RADIANS(D37))) | =3*SIN(RADIANS(D37))+N11-2.1875 | | =D36-2.5 |
| 38 | =3*(-COS(RADIANS(D38))) | =3*SIN(RADIANS(D38))+N12-2.1875 | | =D37-2.5 |
| 39 | =3*(-COS(RADIANS(D39))) | =3*SIN(RADIANS(D39))+N13-2.1875 | | =D38-2.5 |
| 40 | =3*(-COS(RADIANS(D40))) | =3*SIN(RADIANS(D40))+N14-2.1875 | | =D39-2.5 |
| 41 | =3*(-COS(RADIANS(D41))) | =3*SIN(RADIANS(D41))+N15-2.1875 | | =D40-2.5 |
| 42 | =3*(-COS(RADIANS(D42))) | =3*SIN(RADIANS(D42))+N16-2.1875 | | =D41-2.5 |
| 43 | =3*(-COS(RADIANS(D43))) | =3*SIN(RADIANS(D43))+N17-2.1875 | | =D42-2.5 |
| 44 | =3*(-COS(RADIANS(D44))) | =3*SIN(RADIANS(D44))+N18-2.1875 | | =D43-2.5 |
| 45 | =3*(-COS(RADIANS(D45))) | =3*SIN(RADIANS(D45))+N19-2.1875 | | =D44-2.5 |
| 46 | =3*(-COS(RADIANS(D46))) | =3*SIN(RADIANS(D46))+N20-2.1875 | | =D45-2.5 |
| 47 | =3*(-COS(RADIANS(D47))) | =3*SIN(RADIANS(D47))+N21-2.1875 | | =D46-2.5 |
| 48 | =3*(-COS(RADIANS(D48))) | =3*SIN(RADIANS(D48))+N22-2.1875 | | =D47-2.5 |
| 49 | =3*(-COS(RADIANS(D49))) | =3*SIN(RADIANS(D49))+N23-2.1875 | | =D48-2.5 |
| 50 | =3*(-COS(RADIANS(D50))) | =3*SIN(RADIANS(D50))+N24-2.1875 | | =D49-2.5 |
| 51 | =3*(-COS(RADIANS(D51))) | =3*SIN(RADIANS(D51))+N25-2.1875 | | =D50-2.5 |
| 56 | Exit Side Return Cam A | | | |
| 58 | X Coordinate | Y Coordinate | | Degrees |
| 59 | =3*COS(RADIANS(D59)) | =(3*SIN(RADIANS(D59))+N7-2.1875) | | 45 |
| 60 | =3*COS(RADIANS(D60)) | =(3*SIN(RADIANS(D60))+N8-2.1875) | | =D59+2.5 |
| 61 | =3*COS(RADIANS(D61)) | =(3*SIN(RADIANS(D61))+N9-2.1875) | | =D60+2.5 |
| 62 | =3*COS(RADIANS(D62)) | =(3*SIN(RADIANS(D62))+N10-2.1875) | | =D61+2.5 |
| 63 | =3*COS(RADIANS(D63)) | =(3*SIN(RADIANS(D63))+N11-2.1875) | | =D62+2.5 |
| 64 | =3*COS(RADIANS(D64)) | =(3*SIN(RADIANS(D64))+N12-2.1875) | | =D63+2.5 |
| 65 | =3*COS(RADIANS(D65)) | =(3*SIN(RADIANS(D65))+N13-2.1875) | | =D64+2.5 |
| 66 | =3*COS(RADIANS(D66)) | =(3*SIN(RADIANS(D66))+N14-2.1875) | | =D65+2.5 |
| 67 | =3*COS(RADIANS(D67)) | =(3*SIN(RADIANS(D67))+N15-2.1875) | | =D66+2.5 |
| 68 | =3*COS(RADIANS(D68)) | =(3*SIN(RADIANS(D68))+N16-2.1875) | | =D67+2.5 |
| 69 | =3*COS(RADIANS(D69)) | =(3*SIN(RADIANS(D69))+N17-2.1875) | | =D68+2.5 |
| 70 | =3*COS(RADIANS(D70)) | =(3*SIN(RADIANS(D70))+N18-2.1875) | | =D69+2.5 |
| 71 | =3*COS(RADIANS(D71)) | =(3*SIN(RADIANS(D71))+N19-2.1875) | | =D70+2.5 |
| 72 | =3*COS(RADIANS(D72)) | =(3*SIN(RADIANS(D72))+N20-2.1875) | | =D71+2.5 |
| 73 | =3*COS(RADIANS(D73)) | =(3*SIN(RADIANS(D73))+N21-2.1875) | | =D72+2.5 |
| 74 | =3*COS(RADIANS(D74)) | =(3*SIN(RADIANS(D74))+N22-2.1875) | | =D73+2.5 |
| 75 | =3*COS(RADIANS(D75)) | =(3*SIN(RADIANS(D75))+N23-2.1875) | | =D74+2.5 |
| 76 | =3*COS(RADIANS(D76)) | =(3*SIN(RADIANS(D76))+N24-2.1875) | | =D75+2.5 |
| 77 | =3*COS(RADIANS(D77)) | =(3*SIN(RADIANS(D77))+N25-2.1875) | | =D76+2.5 |

FIG. 64A 3-4 Cam B-Pat

Cell: A7
Note: Since Cos is always negative in Quadrant III.

Cell: B7
Note: The values in this column (B7:B25) are the y-coordinates of Cam B in relation to Cam A. The stroke (2.1875) has been added to each value which was calculated in C7-C25.

Cell: C7
Note: The values in this column (C7-C25) are the y-coordinates of the cam. In order to get the values into the correct position in relation to Cam A, the stroke (2.1875) must be added. These values can be found in B7-B25. — Sine is also negative in Quadrant III. The value in this cell (C7) is the end point of the cam which must be fixed due to the number of rollers and the radius of the roller circle.

Cell: L7
Note: This increment is calculated differently because the y-coordinate of the cam (the end point) is a known (fixed) value.

Cell: P7
Note: This increment time is calculated differently because the y-coordinate of the cam (the end point) is a known (fixed) value.

Cell: R7
Note: The velocity is distance divided by time. In this case we are using 2.1875 for the distance the cam moves (stroke) and the time is 1 second (cycle time)

Cell: C25
Note: This value is the start point of the cam which must be fixed due to the number of rollers and the radius of the roller circle.

Cell: P25
Note: This number is fixed at zero because this in fact the start point. The cam is not moving at this point.
For example: The time in cell P24 (0.1076) is the time the cam takes to move from position 1 (start position) to position 2 (see drawing), so the time in cell P25 is actually the time the cam takes to move from position 1 to position 1, which is obviously zero.

FIG. 64B

3-4 Cam B-Pat

Cell: A33
Note: Cosine is always negative in Quadrant II

Cell: B33
Note: The sum of the previous increments must be added to this number. The stroke must be subtracted from this number. (See demonstration)

Cell: B59
Note: The sum of the previous increments must be added to this number. The stroke (2.1875) must be subtracted. (See demonstration)

ent of the present invention.

LINEAR MOTION TO ROTARY MOTION CONVERTER

BACKGROUND OF THE INVENTION

1. Field of the Invention

The present invention relates, in general, to apparatus for converting one form of motion into another, and in particular, to an apparatus for converting reciprocating linear motion into controlled rotary motion.

2. Information Disclosure Statement

It is often desired in machinery used in manufacturing and the like to have a rotating turntable that indexes a workpiece between certain pre-determined positions. Well-known solutions for this problem include geared solutions and reciprocating pistons radially attached to a turntable. However, in the prior art, it has not heretofore been possible to cause the angular velocity of the rotating turntable to have a precisely selected and arbitrary behavior. Prior art solutions typically have high-velocity accelerations of the turntable from rest and equally speedy decelerations of the turntable as it reaches a predetermined index position, or else require elaborate mechanisms to attempt to make the turntable velocity have the desired profile.

It is therefore desirable to have a linear motion to rotary motion converter that allows the velocity profile of a rotating turntable to be precisely controlled as the turntable moves from one index position to another. It is further desirable that such a converter be easily adaptable between various desired velocity profiles and varying numbers of index positions.

A preliminary patentability search in Class 74, subclasses 813, 815, 822, 817, 820 and 823, and class 269, subclasses 66, 63 and 55, produced the following patents, some of which may be relevant to the present invention: Ida et al., U.S. Pat. No. 4,428,256, issued Jan. 31, 1984; Hagen, U.S. Pat. No. 4,377,953, issued Mar. 29 1983; Thompson, U.S. Pat. No. 3,085,452, issued Apr. 16, 1963; Sweeney, U.S. Pat. No. 3,120,134, issued Feb. 4, 1964; and Swahnberg, U.S. Pat. No. 2,021,030, issued Nov. 11, 1935.

None of these references, either singly or in combination, disclose or suggest the present invention.

BRIEF SUMMARY OF THE INVENTION

The present invention is a linear motion to rotary motion converter. A moving cam carrier reciprocates with respect to a rotating turntable having a plurality of fingers, preferably roller bearings, secured to and extending from the turntable parallel to the axis of rotation of the turntable and radially spaced from the axis. The cam carrier has two movable cams and also has two retaining members that are attached to the cam carrier and respectively spaced from the movable cams so as to define channels, between the respective pairs of movable cams and retaining members, through which the roller bearing fingers of the turntable are constrained to move. The curvature and shape of the channels determines the velocity profile of the turntable as the cam carrier reciprocates. The invention also has lock positions at either end of the reciprocating cam carrier's movement in which the turntable is locked from rotation in either direction.

It is an object of the present invention to provide a linear motion to rotary motion converter that allow the velocity profile of a rotating turntable to be almost arbitrarily pre-defined and controlled, allowing the acceleration and deceleration of the turntable to be more satisfactory than heretofore possible with the prior art. It is a further object of the present invention to provide embodiments having selected pluralities of index positions for the turntable, and to have means for locking the turntable from rotation at each of the index positions.

BRIEF DESCRIPTION OF THE SEVERAL VIEWS OF THE DRAWING

FIG. 1 is a perspective view of the cam carrier of the first embodiment of the present invention with the cams removed.

FIG. 2 is a top view of the first cam of the first embodiment of the present invention.

FIG. 3 is a bottom view of the first cam of the first embodiment of the present invention.

FIG. 4 is a top view of the second cam of the first embodiment of the present invention.

FIG. 5 is a bottom view of the second cam of the first embodiment of the present invention.

FIG. 6 is a bottom view of the turntable of the first embodiment of the present invention.

FIG. 7 is a top plan view of the cam carrier of the first embodiment of the present invention.

FIG. 12 is a top sectional view of the first embodiment of the present invention, similar to FIG. 11, but with the cam carrier reciprocated upwardly and the turntable rotated slightly counterclockwise from the view shown in FIG. 11.

FIG. 13 is a top sectional view of the first embodiment of the present invention, similar to FIG. 12, but with the cam carrier reciprocated further upwardly and the turntable rotated 30° counterclockwise from the view shown in FIG. 11, as the turntable enters the second lock position.

FIG. 16 is a transverse side sectional view of the second embodiment of the present invention with the two movable cams removed for clarity, taken substantially along the line 16—16 shown in FIG. 17.

FIG. 19 is a perspective view of the turntable of the second embodiment of the present invention.

FIG. 20 is a vertical sectional view of a portion of the second embodiment of the present invention, taken substantially along the line 20—20 shown in FIG. 28, showing a stop ledge on a movable cam with a roller thereover.

FIG. 21 is a vertical sectional view of a portion of the second embodiment of the present invention, taken substantially along the line 21—21 shown in FIG. 30 but with the stop ledge not removed as in FIG. 30, showing the meshing notch in a lock wear plate and mating meshing notch in a movable cam.

FIG. 22 is a vertical sectional view of the second embodiment of the present invention showing the cam pivot post about which the two movable cams partially orbit, taken substantially along the line 22—22 shown in FIG. 24, also showing the securement of one of the movable cams by the cam pivot post.

FIG. 23 is a vertical sectional view of the cam carrier of the second embodiment of the present invention, taken substantially along the line 23—23 shown in FIG. 17 but with the movable cam in place, showing the spring means.

FIG. 24 is a top sectional view of a portion of the second embodiment of the present invention with the turntable at 0° of rotation and just beginning to leave the first lock position.

FIG. 25 is a top sectional view of a portion of the second embodiment of the present invention with the turntable at 10° of rotation.

FIG. 26 is a top sectional view of a portion of the second embodiment of the present invention with the turntable at 20° of rotation.

FIG. 27 is a top sectional view of a portion of the second embodiment of the present invention with the turntable at 30° of rotation.

FIG. 28 is a top sectional view of a portion of the second embodiment of the present invention with the turntable at 40° of rotation.

FIG. 29 is a top sectional view of a portion of the second embodiment of the present invention with the turntable at 45° of rotation and just beginning to enter the second lock position.

FIG. 30 is a top sectional view of a portion of the second embodiment of the present invention with the turntable at 45° of rotation and in the second lock position.

FIG. 31 is a top sectional view of a portion of the second embodiment of the present invention with the turntable at 45° of rotation and just beginning to leave the second lock position.

FIG. 40 is a top sectional view of the third embodiment of the present invention with the turntable at 30° of rotation.

FIG. 41 is a top sectional view of the third embodiment of the present invention with the turntable at 45° of rotation.

FIG. 42 is a top sectional view of the third embodiment of the present invention with the turntable at 60° of rotation and just beginning to enter the second lock position.

FIG. 43 is a top sectional view of the third embodiment of the present invention with the turntable at 60° of rotation and in the second lock position.

FIG. 44 is a top sectional view of the third embodiment of the present invention with the turntable at 60° of rotation and just beginning to leave the second lock position.

FIG. 45 is a top sectional view of the third embodiment of the present invention with the turntable at 75° of rotation.

FIG. 46 is a top sectional view of the third embodiment of the present invention with the turntable at 90° of rotation.

FIG. 47 is a top sectional view of the third embodiment of the present invention with the turntable at 105° of rotation.

FIG. 48 is a top sectional view of the third embodiment of the present invention with the turntable at 120° of rotation and just beginning to enter the first lock position.

FIG. 49 is a top sectional view of the third embodiment of the present invention with the turntable at 120° of rotation and in the first lock position.

FIGS. 59A, 59B, and 59C together make up a first spreadsheet showing, for the second embodiment and using the acceleration profile of FIG. 56, the calculation of the roller path for the first channel, of the return path for the second movable cam, and of the exit path for the second movable cam.

FIGS. 60A, 60B, 60C, 60D, and 60E together show the spreadsheet formulas for the first spreadsheet shown in FIGS. 59A, 59B, and 59C.

FIGS. 61A and 61B together show the spreadsheet notes for the first spreadsheet shown in FIGS. 59A, 59B, and 59C.

FIGS. 62A, 60B, and 62C together make up a second spreadsheet showing, for the second embodiment and using the acceleration profile of FIG. 57, the calculation of the roller path for the first channel, of the return path for the second movable cam, and of the exit path for the second movable cam.

FIGS. 63A, 63B, 63C, 63D, and 63E together show the spreadsheet formulas for the second spreadsheet shown in FIGS. 62A, 60B, and 62C.

FIGS. 64A and 64B together show the spreadsheet notes for the second spreadsheet shown in FIGS. 62A, 60B, and 62C.

DETAILED DESCRIPTION OF THE INVENTION

Figure 8:
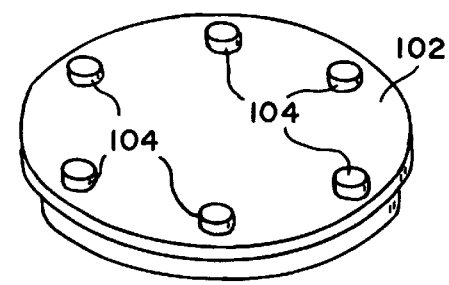
FIG. 8 is a perspective view of the turntable, shown inverted, of the first embodiment of the present invention.
Figure 9:
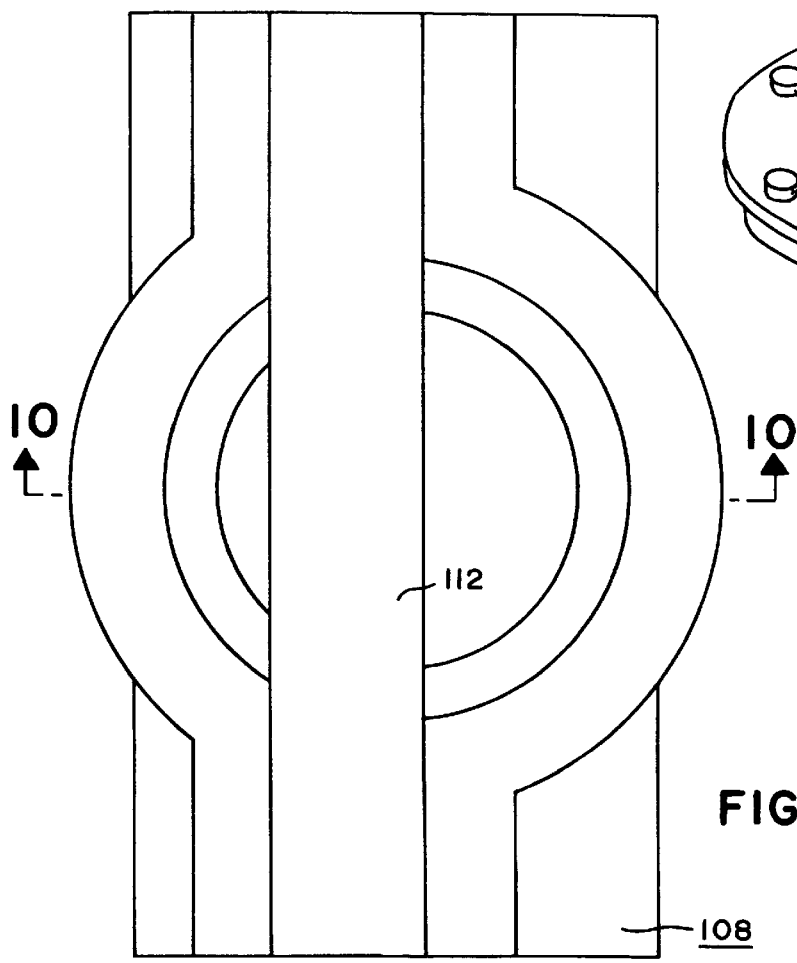
FIG. 9 is a top plan view of the base of the first embodiment of the present invention.
Figure 10:
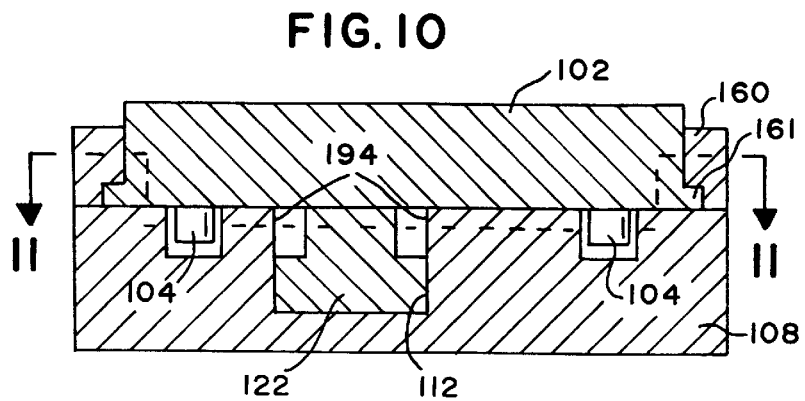
FIG. 10 is a lateral transverse sectional view of the first embodiment of the present invention, taken substantially along the line 10—10 shown in FIG. 9.

Referring to FIGS. 1–13, a first preferred embodiment 100 of the linear to rotary converter of the present invention is shown. As will be understood after the explanation that follows, all of the various embodiments of the invention are similar. The first preferred embodiment is an early version of the invention, and the second and third embodiments are later and improved versions. Although the turntable, hereinafter described, of the first embodiment is shown rotating in the counter-clockwise direction, it shall be understood that the turntable of the first embodiment can be caused to rotate in the clockwise direction as shown for the second and third embodiments simply by making the cam channels of the first embodiment be mirror images of those shown in the figures.

The first preferred embodiment 100 includes a turntable 102 having a plurality of fingers 104 extending from turntable 102 and radially spaced from the turntable's axis of rotation 106 and parallel thereto. As described in greater detail regarding the second and third embodiments, fingers 104 are preferably well-known cylindrical roller bearings ("rollers") having an axial stud (not shown for the first embodiment) extending from one end, with the stud passing through a hole in turntable 102 and being secured to the turntable by a nut. These rollers interact with cam surfaces of the invention, in a manner hereinafter described, and the use of roller bearings for fingers 104 reduces friction as the roller fingers contact the cams. Because all of the preferred embodiments preferably use roller bearings for the fingers 104, the term "rollers" will be used hereinafter to refer to the fingers 104. The rollers may either be referred to in aggregate as "rollers 104" or individually as one of rollers 104$a$, 104$b$, 104$c$, 104$d$, 104$e$, or 104$f$ in sequence around the turntable.

Turntable 102 is mounted for rotation upon a base 108, and the converter 100 further includes a cam carrier 110 mounted within base 108 for reciprocating linear motion with respect to turntable 102, as, for example, within a cam carrier channel 112 within base 108.

A pair of movable cams, namely, first and second movable cams 114 and 116, are mounted to cam carrier 110 for movement with respect to cam carrier 110. Preferably, cams 114 and 116 respectively have semicircular notches 118 and 120 that allow cams 114 and 116 to be received against a cam pivot post 122 for partial orbital motion thereabout. Both of cams 114 and 116 each have a pair of posts 124, 126 extending downwardly from the undersurface of the cams and being received into arcuate guide channels 128, 130 within cam carrier 110 for causing cams 114, 116 to remain closely received against cam pivot post 122 as the cams partially orbit post 122. Guide channels 130 each have a compression spring 132 therewithin, preferably with channels 130 having a blind bore for receiving the spring 132 at ends 134 of channels 130, with each spring 132 acting against its respective post 126 within guide channels 130 and serving as biasing means for urging cams 114 and 116 in a direction opposite the direction of rotation of turntable 102 for reasons hereinafter explained in detail.

Cam carrier 110 further has first and second retaining members 136 and 138, respectively, extending upwardly therefrom, preferably held thereto by well-known bolts or screws or the like. When first movable cam 114 is received against cam pivot post 122, first retaining member 136 is spaced from first movable cam 114 so as to define a first channel 140 therebetween for guiding the plurality of rollers 104 therethrough as the cam carrier is reciprocated, in a manner hereinafter described. Similarly, when second movable cam 116 is received against cam pivot post 122, second retaining member 138 is spaced from second movable cam 116 so as to define a second channel 142 therebetween for guiding the plurality of rollers 104 therethrough as the cam carrier is reciprocated.

In a manner hereinafter described, a desired velocity profile for the turntable 102 is converted into a predetermined path (see, e.g., path 2.144 of the second embodiment shown in dotted outline in FIG. 24) for the rollers 104 in the reciprocatively moving frame of reference of the cam carrier 110, and that path passes down the center of first and second channels 140, 142, with first and second channels 140, 142 being set to have a radius width of rollers 104 on each side of the center of the channel, for a total width each of channels 140, 142 of a diameter of rollers 104 so as to constrain the movement of rollers 104 within the channel to follow the predetermined path as the rollers 104 rollingly contact the surfaces of first movable cam 114 and first retaining member 136 within first channel 140 and as rollers 104 rollingly contact the surfaces of second movable cam 116 and second retaining member 138 within second channel 142. The rollers 104 are spaced at equal angles about the axis of rotation of turntable 102, and the number of rollers 104 is chosen to be half the number of desired index (stopping) positions for turntable 102.

For an even number of rollers 104, the axis of the cam pivot post 122 will be offset from the axis of rotation of turntable 102 a distance transverse to the direction of reciprocation of cam carrier 110, and the cam surface shapes of the first movable cam and first retaining member will be respectively different from the cam surface shapes of the second movable cam and the second retaining member. For an odd number of rollers, the axis of the cam pivot post will pass through the axis of rotation of the turntable and the cam surface shapes of the first movable cam and first retaining member will respectively be substantially the same as the cam surface shapes of the second movable cam and the second retaining member. However, as shown in the third embodiment of the present invention and as described hereinafter, the cam carrier channel 112, through which the cam carrier reciprocates, may be made wider than necessary so as to accommodate cam carriers for both even and odd numbers of rollers 104 with a single base, in which case the leading side ("return side") of one of the pairs of movable cams and retaining members may be extended transversely laterally to extend to the full width of the actual cam carrier channel.

The cam carrier 110 of converter 100 is preferably reciprocated by reciprocation means 146, such a well-known hydraulic or pneumatic cylinder 148 fixedly mounted with respect to base 108 and having a piston 150 operably joined to cam carrier 110. The reciprocation velocity of reciprocation means 146 is typically constant and equal and opposite in sign for the inward and outward stroke of piston 150, and this velocity must be known in order to calculate the required shape of the predetermined path of the rollers 104 that will yield the desired turntable rotation velocity profile. However, non-constant and/or asymmetric reciprocation velocities could be adapted for the present invention provided that the non-constant and/or asymmetric reciprocation velocity was used to modify the generation of the cam shapes, and a simple scaling of the piston stroke velocity will similarly scale the rotation velocity profile curve as a function of time (but not its shape).

If desired, converter 100 may include switches 152 and 154 at either end of the cam carrier channel 112 and respectively having actuation plungers 156 and 158 for actuation by cam carrier 110 at the limits of its travel, so as to provide an indication, such as, for example, an electrical or pneumatic indication, that cam carrier 110 is in one of its "lock positions" as hereinafter described.

Turntable 102 may be held to base 108 by a retaining ring 160 that is preferably bolted to base 108 so as to entrap a lip 161 of turntable 102, and the interior of the invention is filled with lubricating fluid or oil to provide lubrication for the moving parts. Appropriate well-known seals and gaskets, not shown, seal the fluid within the invention. Moving parts preferably have well-known replaceable wear plates, not shown with the first embodiment, and a well-known bearing, also not shown, mounts the turntable 102 for rotation with respect to base 108.

As explained more fully hereinafter in the detailed description of the second embodiment, the predetermined path of the rollers 104 in the moving frame of reference of the cam carrier 110 has a number of portions.

A first driving portion of the predetermined path of the rollers passes along the center of first channel 140, and first channel 140 follows the shape of this first driving portion of the predetermined path, with first movable cam 114 having a first driving cam surface 162 facing first retaining member 136 and exposed to the first channel 140, and with first movable cam 114 further having a first return cam surface 164, remote from the first driving cam surface 162 and not exposed to the first channel 140, and along which the rollers 104 pass while on a first return portion of the predetermined path. Similarly, a second driving portion of the predetermined path of the rollers passes along the center of second channel 142, and second channel 142 follows the shape of this second driving portion of the predetermined path, with second movable cam 116 having a second driving cam surface 166 facing second retaining member 138 and exposed to the second channel 142, and with second movable cam 116 further having a second return cam surface 168 remote from the second driving cam surface 166 and not exposed to the second channel 142.

Figure 11:
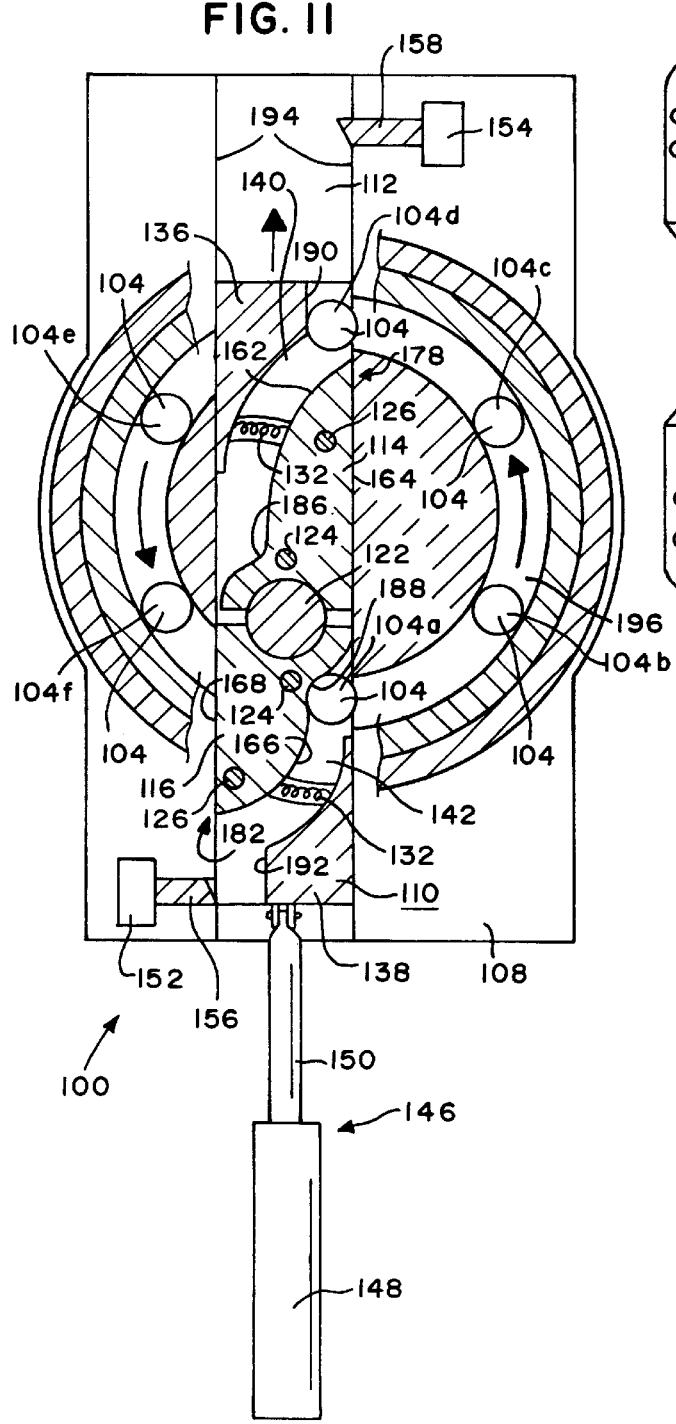
FIG. 11 is a top sectional and diagrammatic view of the first embodiment of the present invention, taken substantially along the line 11—11 shown in FIG. 10 and with the turntable at 0° of rotation as it leaves the first lock position.
Figure 14:
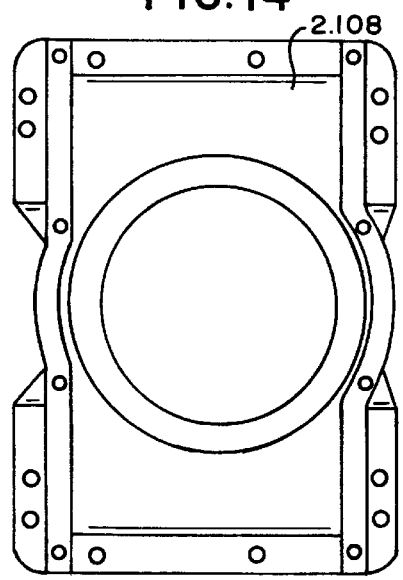
FIG. 14 is a bottom view of the base of the second and third embodiments of the present invention.
Figure 15:
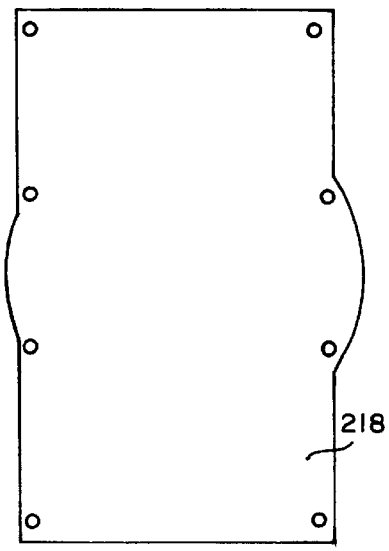
FIG. 15 is a bottom view of the base bottom cover plate of the second and third embodiments of the present invention.
Figure 17:
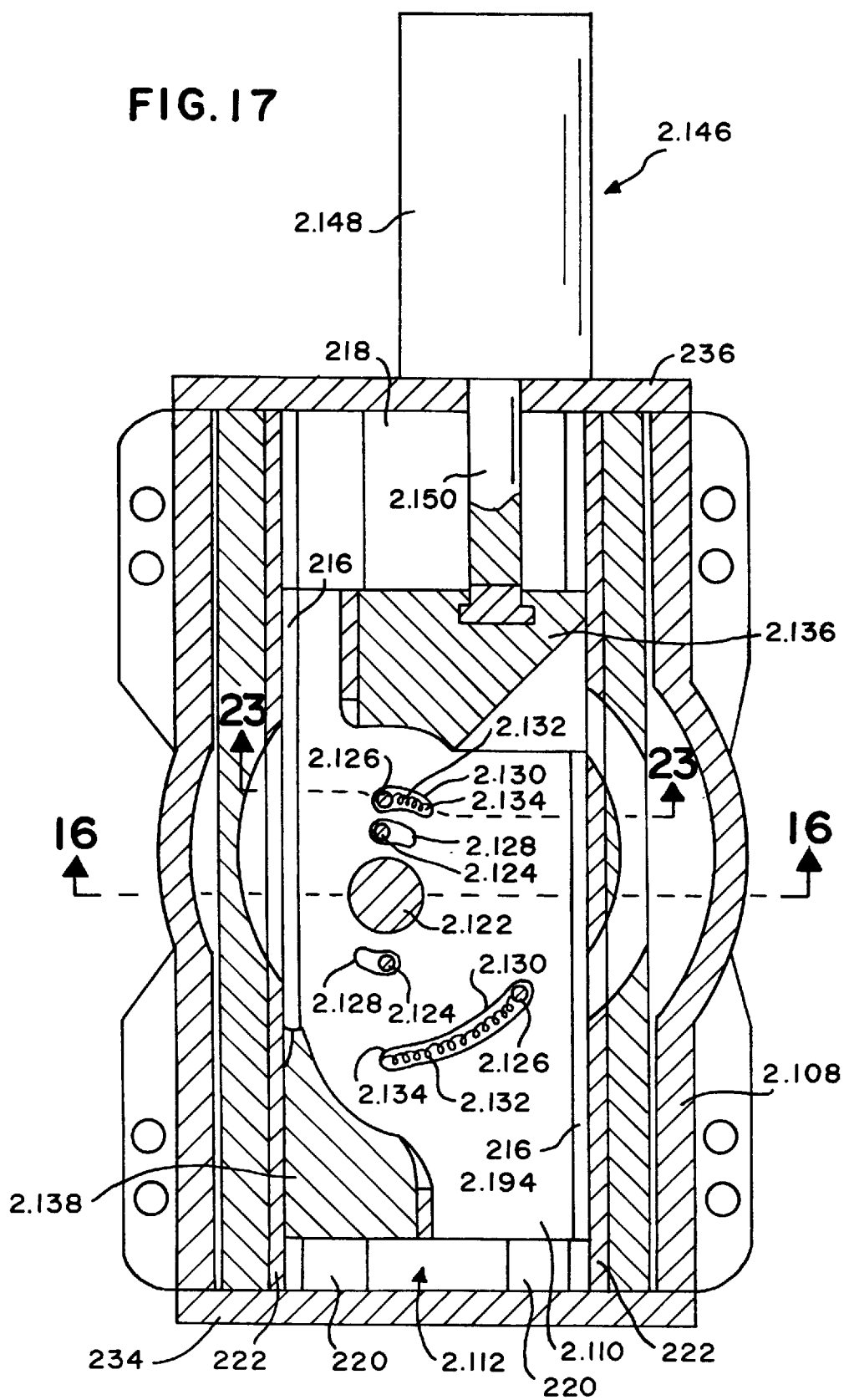
FIG. 17 is a top sectional view of the second embodiment of the present invention with the two movable cams and the roller turntable removed for clarity, taken substantially along the line 17—17 shown in FIG. 16.
Figure 18:
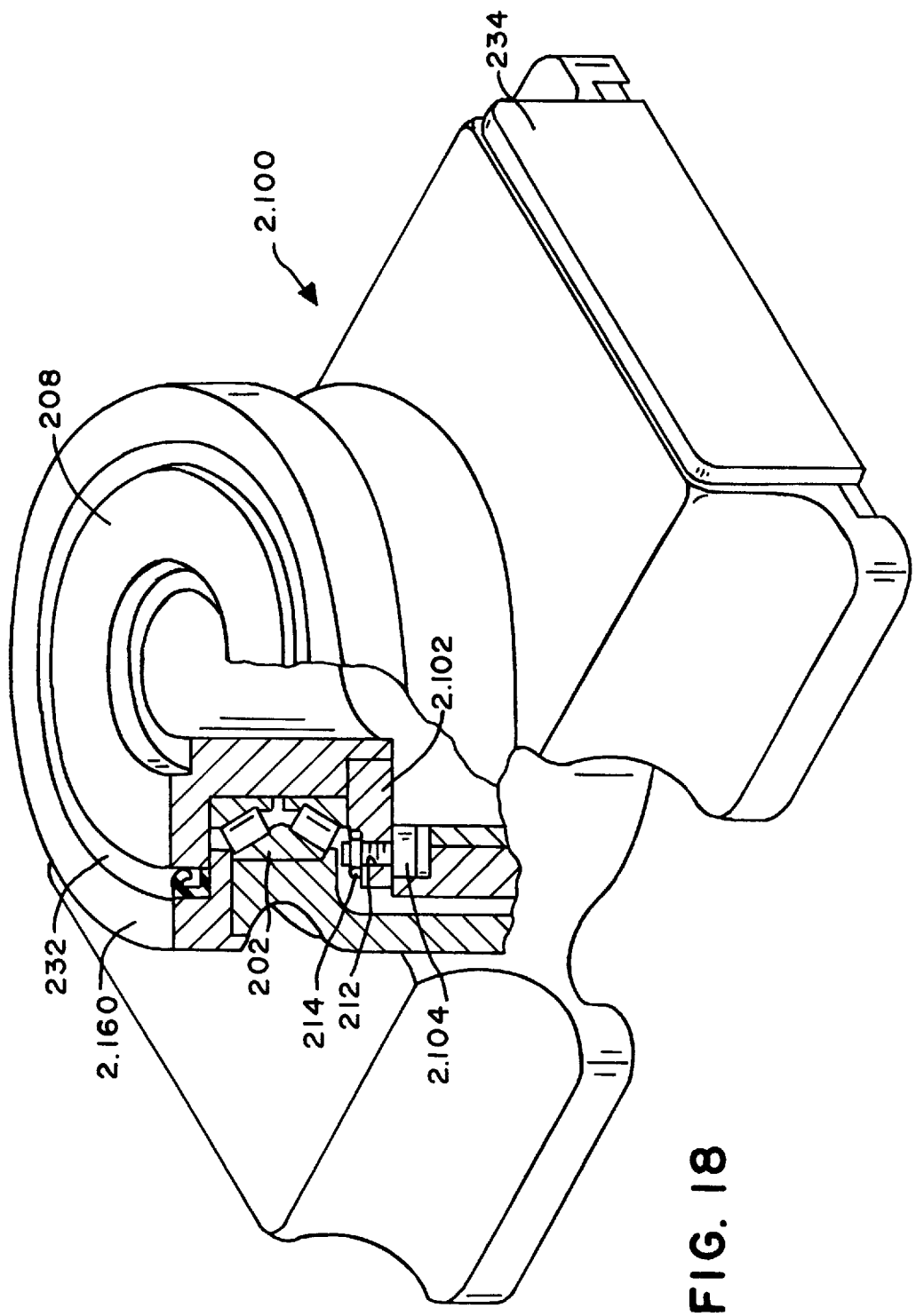
FIG. 18 is a perspective view of the second and third embodiments of the present invention and showing a section of a portion of the invention.
Figure 36:
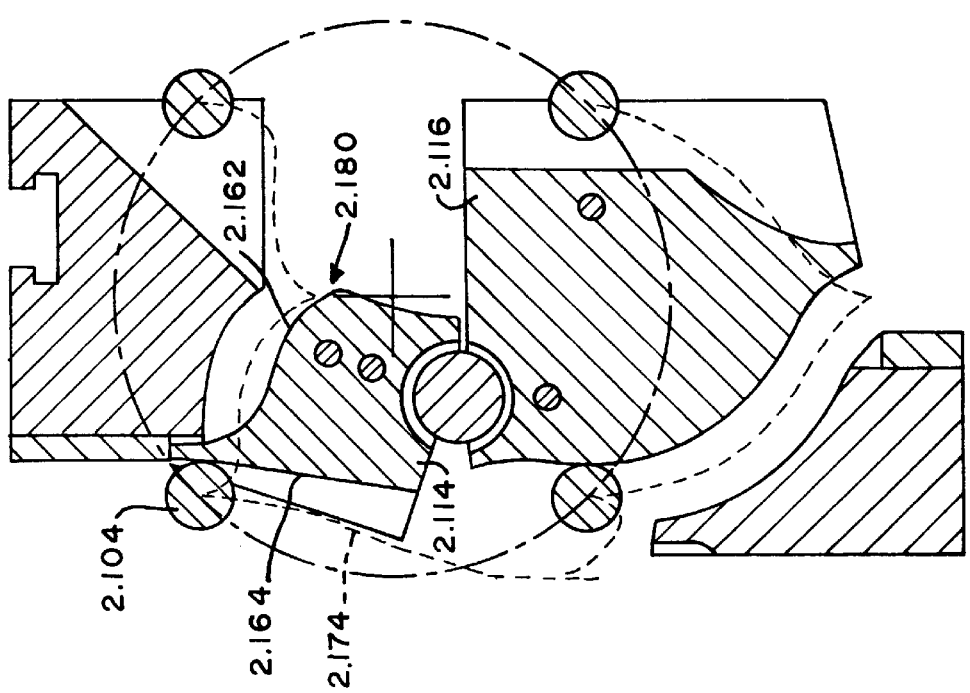
FIG. 36 is a top sectional view of a portion of the second embodiment of the present invention with the turntable at 90° of rotation and just beginning to enter the first lock position.

Likewise, first movable cam 114 is movable from a first driving position 178 shown in FIGS. 11, 12, and 13, in which first channel 140 is open for guiding rollers 104 therethrough, to a first return position, not shown for the first embodiment (but similar to first return position 2.180 shown for the second embodiment in FIG. 36 and similar to second return position 184 of second movable cam 116 discussed below), in which one of the rollers 104 contacts first return cam surface 164 of first movable cam 114 as the roller 104 passes along the first return portion of the predetermined path. Similarly, second movable cam 116 is movable from a second driving position 182 shown in FIGS. 11 and 13, in which second channel 142 is open for guiding rollers 104 therethrough, to a second return position 184 shown in FIG. 12 in which one of the rollers 104 (e.g., roller 104f) contacts second return cam surface 168 of second movable cam 116 as the roller passes along the second return portion of the predetermined path.

Additionally, first and second movable cams 114 and 116 respectively have first and second substantially flat portions 186 and 188 adjacent the trailing edges of their respective first and second driving cam surfaces 162 and 166, with first and second flat portions 186, 188 being tangentially parallel to the direction of reciprocation. Similarly, first and second retaining members 136, 138 respectively have first and second substantially flat first and second lock surfaces 190, 192 parallel to the direction of reciprocation of cam carrier 110 and respectively adjacent first and second channels 140, 142.

Now that the structure of the first embodiment has been described, the operation of the first embodiment can now be explained. All of the embodiments operate similarly, and the operation of the invention will be explained in even greater detail when the second and third embodiments are described.

Referring to FIGS. 11–14, the cam carrier 110 is initially at one end of its travel in a first "lock position". In this first "lock position", one roller 104, e.g., roller 104a, rests against first substantially flat portion 188 of second movable cam 116 and another roller 104, e.g., roller 104d, rests against first substantially flat lock surface 190 of first retaining member 136. Both of movable cams 114 and 116 are urged clockwise (i.e., against the direction of turntable rotation) by biasing springs 132 so that first and second channels 140, 142 are open. Because movable cams 114 and 116 are constrained within channel 112 by walls 194 of channel 112, the turntable is "locked" and is prevented from rotation in the counterclockwise direction by the resting of roller 104d against first lock surface 190 and is prevented from rotation in the clockwise direction by the resting of roller 104a against flat portion 188 of second movable cam 116.

In FIG. 12, the cam carrier 110 has been reciprocated slightly, moving the roller 104d, which previously rested against first lock surface 190, into first channel 140 and engagement with first driving cam surface 162 of first movable cam 114, and moving the roller 104a out of channel 112 and into circular path 196 within base 108. Because the turntable does not reciprocate with respect to base 108 and only rotates with respect thereto, no forces exert on the rollers while they are within circular path 196 within base 108 and exterior to channel 112. Also seen in FIG. 12 is that roller 104f is now contacting the second return cam surface 168 of second movable cam 116, acting in opposition to biasing spring 132 so as to cause second movable cam 116 to move into its second return position 184 and partially orbit the cam pivot post 122 as roller 104f begins to pass the tip 200 of second cam 116. As the turntable 102 rotates from the position shown in FIG. 12 into the position shown in FIG. 13, roller 104f moves past the tip 200 of second cam 116 and no longer contacts second cam 116, thereby allowing movable cam 116 to move back to its first driving position 182 under the biasing urging of biasing spring 132 of second cam 116.

In FIG. 13, the cam carrier 110 has reciprocated to the other extreme of its stroke and the turntable has rotated from one index position to another, i.e., has rotated 30°. Now, roller 104d is resting against first flat portion 186 of first cam 114, roller 104f is resting against second lock surface 192, and the turntable is prevented from rotation in either direction.

As the cycle proceeds, the cam carrier 110 will reciprocate in the reverse direction, roller 104f will move into second channel 142 and engage second driving cam surface 166 of second movable cam 116, while roller 104c will cause first movable cam 114 to partially orbit about cam pivot post 122 from the first driving position 178 into its first return position (not shown).

Referring to FIGS. 14–37, the second preferred embodiment 2.100 of the present invention can now be explained. Identifying reference designators for this second embodiment are marked similarly to the first embodiment, except with the prefix "2.". It shall be understood that many aspects of all of the embodiments are substantially the same, and only the differences will be treated in detail, it being understood that similar structural features of the embodiments perform similar functions.

Like the first embodiment, the second embodiment has a base 2.108 upon which a turntable 2.102 is mounted for rotation. Preferably a well-known double-taper roller bearing should be used to mount turntable 2.102 for rotation, using a bearing 202 such as that manufactured by the Timken Company as Timken type TDO, a double cup bearing having a double cup with two single cones housing a plurality of circular bearing elements 204. Fixedly secured to turntable 2.102, as by screws or bolts 206, is an output shaft 208 for connecting to a workpiece so that, as turntable 2.102 indexes through its positions, the workpiece will similarly rotate.

Turntable 2.102 has a plurality of fingers 2.104 extending from turntable 2.102 and radially spaced from the turntable's axis of rotation 2.106 and parallel thereto, with fingers 2.104 preferably being well-known roller bearings ("rollers") having an axial stud 210 extending from one end, with stud 210 passing through a hole 212 in turntable 2.102 and being secured to turntable 2.102 by a nut 214. The rollers may hereinafter be referred to in the aggregate as "rollers 2.104" or individually as rollers 2.104a, 2.104b, 2.104c, or 2.104d in sequence around the turntable. Unlike the first embodiment 100, hereinbefore discussed, which had six rollers, the second embodiment has four rollers 2.104, so that the turntable 2.102 indexes 45° (half the turntable rotation angle between successive rollers) with each stroke direction of the reciprocating cam carrier 2.110, or 90° (the full turntable rotation angle between successive rollers) for a full-cycle forward and back stroke of the reciprocating cam carrier 2.110.

As before, second embodiment 2.100 has a reciprocating cam carrier 2.110 mounted within a cam carrier channel 2.112 within base 2.108. Cam carrier 2.112 preferably has wear plates 216 secured to the sides of cam carrier 2.110. Sealingly secured to the underside of base 2.108 is a base bottom plate 218, with bottom plate 218 having a plurality of wear plates 220 affixed to the topside of bottom plate 218 upon which cam carrier 2.110 reciprocatingly slides. The wear plates 216 of cam carrier 2.110 slide against similar wear plates 222 secured to the sides 2.194 of cam carrier channel 2.112.

A pair of movable cams, namely, first and second movable cams 2.114 and 2.116, respectively, are mounted to cam carrier 2.110 for movement with respect thereto. Cams 2.114 and 2.116 have semicircular notches 2.118 and 2.120, respectively, that allow cams 2.114 and 2.116 to be received against a cam pivot post 2.122 for partial orbital motion thereabout. Preferably, as shown in FIG. 16, FIG. 22 and FIG. 24, cam pivot post 2.122 has a radially-extending lip 224 remote from cam carrier 2.110, with lip 224 being received into semicircular notches 226 and 228 of first and second movable cams 2.114 and 2.116, respectively, so as to retain the movable cams 2.114 and 2.116 from rising from cam carrier 2.110, and cam pivot post 2.122 is preferably secured to cam carrier 2.110 by a screw or bolt 230 passing therethrough. Both of cams 2.114 and 2.116 each have a pair of posts 2.124 and 2.126 extending downwardly from the undersurface of the cams and being received into arcuate guide channels 2.128, 2.130 within cam carrier 2.110 for causing cams 2.114, 2.116 to remain closely received against cam pivot post 2.122 as the cams partially orbit post 2.122. Guide channels 2.130 each have a compression spring 2.132 therewithin, preferably with channels 2.130 having a blind bore for receiving the spring 2.132 at ends 2.134 of channels 2.130, with each spring 2.132 acting against its respective post 2.126 within guide channels 2.130 and serving as biasing means for urging cams 2.114 and 2.116 in a direction opposite the direction of rotation of turntable 2.102 and respectively into first and second driving positions 2.178 and 2.182 hereinafter described and as shown, e.g., in FIG. 25.

Cam carrier 2.110 further has first and second retaining members 2.136 and 2.138, respectively, extending upwardly therefrom, preferably held thereto by well-known bolts or screws or the like. When first movable cam 2.114 is received against cam pivot post 2.122, first retaining member 2.136 is spaced from first movable cam 2.114 so as to define a first channel 2.140 therebetween for guiding the plurality of rollers 2.104 therethrough as the cam carrier 2.110 is reciprocated. Similarly, when second movable cam 2.116 is received against cam pivot post 2.122, second retaining member 2.138 is spaced from second movable cam 2.116 so as to define a second channel 2.142 therebetween for guiding the plurality of rollers 2.104 therethrough as the cam carrier is reciprocated.

In a manner hereinafter described, a desired velocity profile for the turntable 2.102 is converted into a predetermined path 2.144 for the rollers 2.104 in the reciprocatingly moving frame of reference of the cam carrier 2.110, and path 2.144 passes down the center of first and second channels 2.140, 2.142 with first and second channels 2.140, 2.142 being set to have a radius width of rollers 2.104 on each side of the center of the channel, for a total width each of channels 2.140, 2.142 of a diameter of rollers 2.104 so as to constrain the movement of rollers 2.104 within the channels to follow predetermined path 2.144 as the rollers rollingly contact the surfaces of first movable cam 2.114 and first retaining member 2.136 within first channel 2.140 and as rollers 2.104 rollingly contact the surfaces of second movable cam 2.116 and second retaining member 2.138 within second channel 2.142. The four rollers 2.104 are spaced at equal 90° angles about the axis of rotation of turntable 2.102, and, because four rollers are present in the second embodiment 2.100, there are eight index (stopping) positions, one every 45°, for turntable 2.102.

Because there are an even number of rollers 2.104, the axis of cam pivot post 2.122 is offset from the axis of rotation of turntable 2.102 a distance transverse to the direction of reciprocation of cam carrier 2.110, and the cam surface shapes of the first movable cam 2.114 and first retaining member 2.136 are respectively different from the cam surface shapes of the second movable cam 2.116 and second retaining member 2.138.

The cam carrier 2.110 of converter 2.100 is preferably reciprocated by reciprocation means 2.146, such as a well-known hydraulic or pneumatic cylinder 2.148 fixedly mounted with respect to base 2.108 and having a piston 2.150 operably joined to cam carrier 2.110. Although not shown, it shall be understood that converter 2.100 could have switches at either end of the cam carrier channel 2.112 extending transversely into the cam carrier channel as in the first embodiment or at the ends of the channel and extending longitudinally into the channel for contact with the reciprocating cam carrier 2.110 so as to provide an indication, such as, for example, an electrical or pneumatic indication, that cam carrier 2.110 is in one of its lock positions, hereinafter described.

Turntable 2.102 is preferably held to base 2.108 by a retaining ring 2.160 that entraps roller bearing 202, and the interior of body 2.108 is preferably filled with lubricating fluid or oil to provide lubrication for the moving parts within the invention. Various seals, such as ring seal 232 around output shaft 208, and cover plates such as end plates 234, 236 and bottom plate 218, seal the lubricating fluid within the body 2.108 of the invention.

Path 2.144 of rollers 2.104 in the reciprocating frame of reference of cam carrier 2.110 has a number of portions. A first driving portion 2.170 of path 2.144 passes along the center of first channel 2.140 (see FIG. 24), and first channel 2.140 follows the shape of first driving portion 2.170 of path 2.144, with first movable cam 2.114 having a first driving cam surface 2.162 facing first retaining member 2.136 and exposed to the first channel 2.140, and with first movable cam 2.114 further having a first return cam surface 2.164 (see FIG. 36), remote from the first driving cam surface 2.162 and not exposed to the first channel 2.140, along which rollers 2.104 pass while on a first return portion 2.174 of path 2.144 and when first movable cam 2.114 is in second return position 2.180.

Similarly, a second driving portion 2.172 of path 2.144 (see FIG. 33) passes along the center of second channel 2.142, and second channel 2.142 follows the shape of this second driving portion 2.172 of path 2.144, with second movable cam 2.116 having a second driving cam surface 2.166 facing second retaining member 2.138 and exposed to the second channel 2.142, and with second movable cam 2.116 further having a second return cam surface 2.168 (see FIG. 27) remote from second driving cam surface 2.166 and not exposed to the second channel 2.142.

First movable cam 2.114 is movable from a first driving position 2.178 shown, e.g., in FIGS. 24 and 25, in which first channel 2.140 is open for guiding rollers 2.104 therethrough, to a first return position 2.180 (see FIG. 36) in which one of the rollers 2.104 contacts first return cam surface 2.164 of first movable cam 2.114 as the roller 2.104 passes along the first return portion 2.180 of the predetermined path 2.144. Similarly, second movable cam 2.116 is movable from a second driving position 2.182 shown, e.g., in FIGS. 31–33, in which second channel 2.142 is open for guiding rollers 2.104 therethrough, to a second return position 2.184 (see, e.g., FIGS. 28–29), in which one of the rollers 2.104 contacts second return cam surface 2.168 of second movable cam 2.116 as the roller passes along the second return portion 2.176 of predetermined path 2.144.

Additionally, first and second movable cams 2.114 and 2.116 respectively have first and second respectively flat portions 2.186 and 2.188 (see FIGS. 30 and 37) adjacent the trailing edges of their respective first and second driving cam surfaces 2.162 and 2.166, with first and second flat portions 2.186 and 2.188 being tangentially parallel to the direction of reciprocation of cam carrier 2.110. Similarly, first and second retaining members 2.136, 2.138 have substantially flat first and second lock surfaces 2.190, 2.192 (see FIGS. 30 and 37) parallel to the direction of reciprocation of cam carrier 2.110 and respectively adjacent first and second channels 2.140, 2.142. Preferably, first and second lock surfaces 2.190 and 2.192 are on first and second lock wear plates 2.238 and 2.240 respectively secured to first and second retaining members 2.136 and 2.138 as by screws or bolts, not shown.

Additionally, path 2.144 has a first exit path portion 2.242, following first driving path portion 2.170, that is traversed by one roller 2.104 while another roller 2.104 exits second lock surface 2.192 (see FIGS. 31–33) and passes into second channel 2.142. Similarly, path 2.144 has a second exit path portion 2.244, after second driving path portion 2.172, that is traversed by one roller 2.104 while another roller 2.104 exits first lock surface 2.190 (see FIGS. 25 and 26) and passes into first channel 2.140.

First and second movable cams 2.114, 2.116 each have a return stop ledge below the rollers 2.104, adjacent the top surface of cam carrier 2.110, and extending perpendicular to their respective driving cam surface into their respective channels 2.140 or 2.142. These ledges have been removed from the views shown in FIGS. 24–37 for clarity. Both return stop ledges are similar and act to limit the orbital travel of the movable cams by contacting the face of their respective retaining member 2.136, 2.138 when the cams enter their respective return positions 2.180 and 2.184, and a description of the return stop ledge for second movable cam 2.116 will suffice for both.

Figure 37:
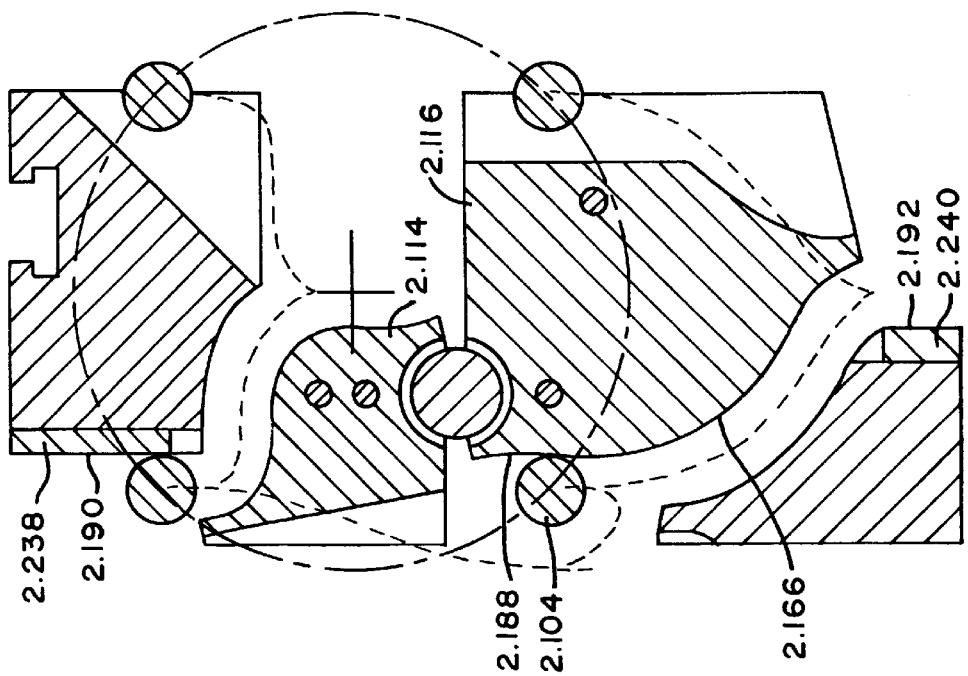
FIG. 37 is a top sectional view of a portion of the second embodiment of the present invention with the turntable at 90° of rotation in the first lock position.
Figure 38:
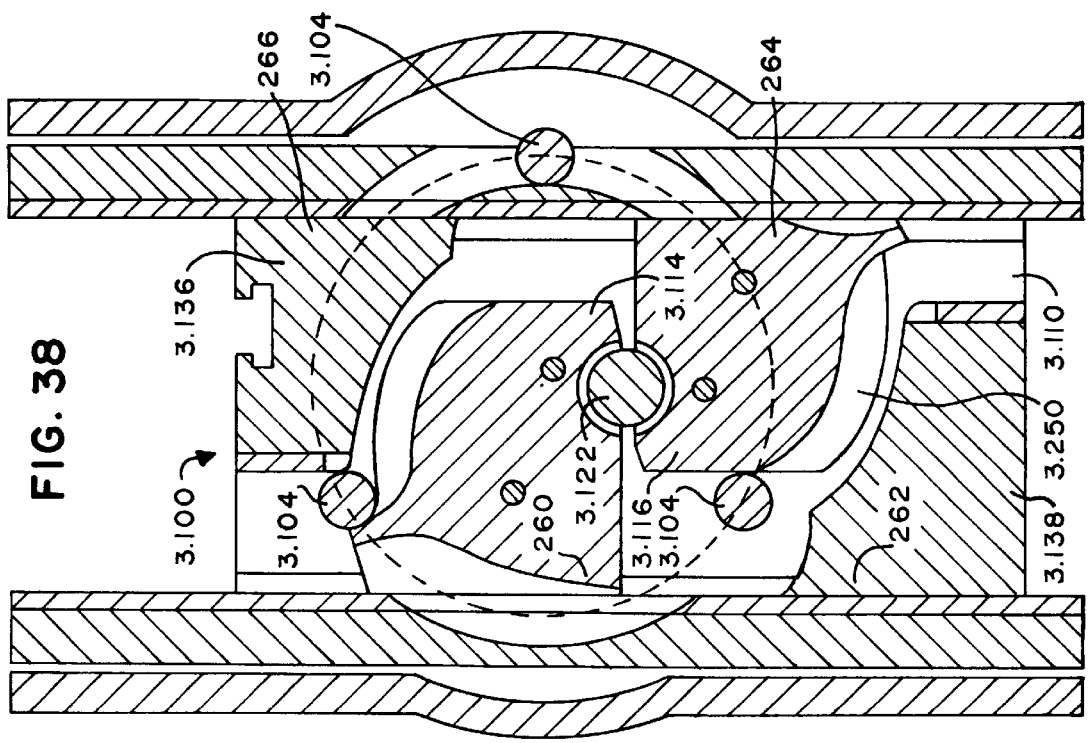
FIG. 38 is a top sectional view of the third embodiment of the present invention with the turntable at 0° of rotation and just beginning to leave the first lock position.

Referring to FIGS. 21, 29, and 30, second movable cam 2.116 has a return stop ledge 2.242 somewhat similar in shape to return stop ledge 3.242 of the third embodiment as shown in FIG. 38, but removed from FIGS. 24–37 for clarity. Return stop ledge 2.242 extends into channel 2.142 below the rollers 2.104 and contacts retaining member 2.138 when the movable cam 2.116 is in the return position shown in FIG. 29, having a top plan profile that substantially matches the exposed portion of channel 2.142 in FIG. 29, thereby limiting the orbital travel of the second movable cam so as to ensure smooth transition of the roller 2.104 from the return portion path 2.176 onto the lock surface 2.192.

Likewise, first and second movable cams 2.114, 2.116 each have a driving stop ledge below the rollers 2.104, adjacent the top surface of cam carrier 2.110, and extending perpendicular to their respective driving cam surface into their respective channels 2.140 or 2.142. Both driving stop ledges 2.252 and 2.254 are similar and act to limit the orbital travel of the movable cams by contacting the cam carrier channel side wear plates 222 when the movable cams enter their respective driving positions 2.178 and 2.182, and a description of the driving stop ledge for second movable cam 2.116 will suffice for both.

Referring to FIGS. 20, 24, and 28, second movable cam 2.116 has a driving stop ledge 2.254. Driving stop ledge 2.254 extends outwardly from second return cam surface 2.168 below the rollers 2.104 and contacts the cam carrier channel side wear plate 222 (see, e.g., FIGS. 17 or 23) when the movable cam 2.116 is in the driving position shown in FIG. 24, thereby limiting the orbital travel of the second movable cam.

Retaining member 2.136 has a cutaway portion 246 (see FIGS. 33 and 23) placing the upper surface in that portion of retaining member 2.136 below the rollers 2.104 as they travel on first exit path portion 2.242 of path 2.144.

Similarly, second retaining member 2.138 has a cutaway portion 248 shown in FIG. 30 for allowing reciprocating overtravel of cam carrier 2.110 in the lock position without a roller 2.104 hitting retaining member 2.138.

Both of movable cams 2.114 and 2.116 each have similar meshing notches on their respective tips 2.198 and 2.200 that matingly mesh with their respective retaining members 2.136 and 2.138 when the movable cams are in their respective return positions 2.180 and 2.184, and a description of the meshing notches for second movable cam 2.116 will suffice for both.

Referring to FIGS. 21 and 27–30, tip 2.200 of second movable cam 2.116 has a notched portion 2.256 and wear plate 2.240 has a meshingly mating notched portion 2.258 so that the tip 2.200 of cam 2.116 can pass over wear plate 2.240 and mesh therewith so as to provide a smooth path for a roller 2.104 onto the lock surface 2.192. It should be noted that the height of notch portion 2.258 is about midway up the roller contacting surface so that both tip 2.200 and lock surface 2.192 can be simultaneously contacted by roller 2.104, and it should be further noted that the removed portion of the notches are somewhat triangular in cross section through a horizontal plane.

Now that the structure of the second embodiment has been described, the operation of second embodiment 2.100 can briefly be explained with reference to FIGS. 24–37, which together show one full cycle of reciprocation of the cam carrier. It shall be understood that the operation is similar to the operation of the first embodiment, heretofore described.

Figure 32:
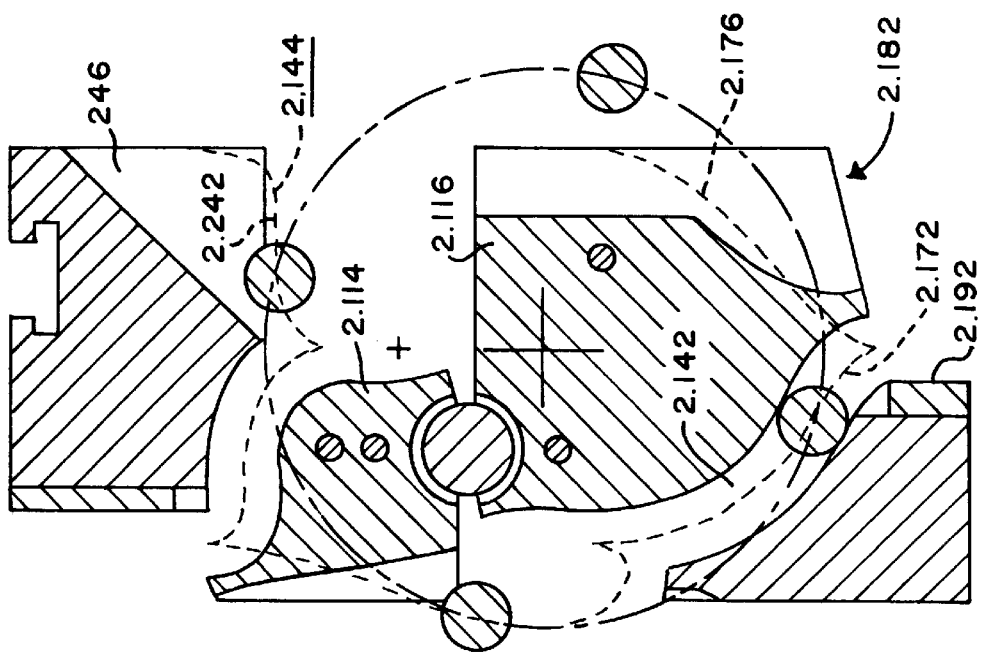
FIG. 32 is a top sectional view of a portion of the second embodiment of the present invention with the turntable at 55° of rotation.
Figure 33:
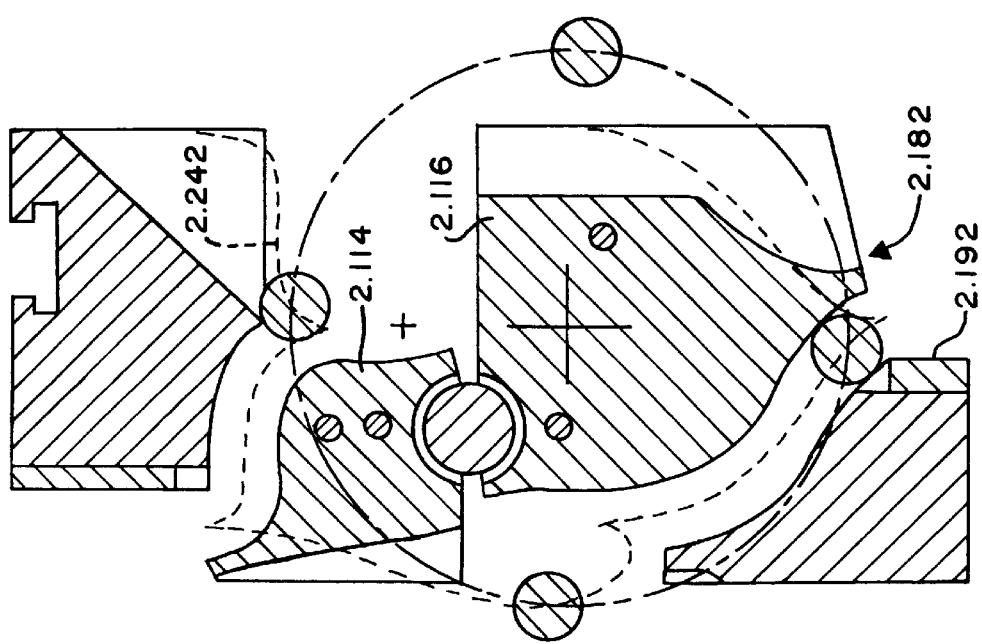
FIG. 33 is a top sectional view of a portion of the second embodiment of the present invention with the turntable at 65° of rotation.
Figure 35:
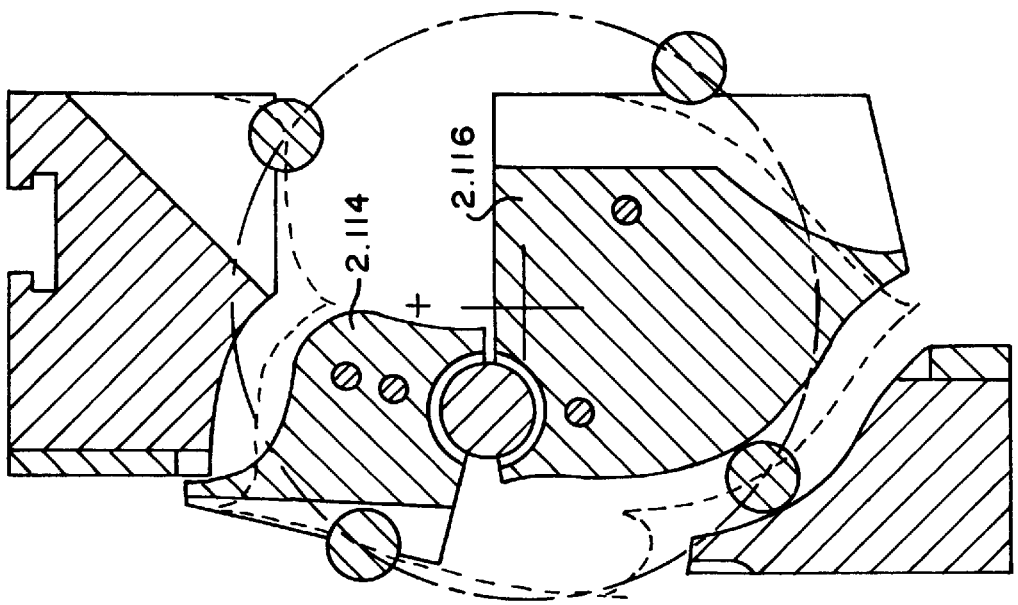
FIG. 35 is a top sectional view of a portion of the second embodiment of the present invention with the turntable at 85° of rotation.
Figure 34:
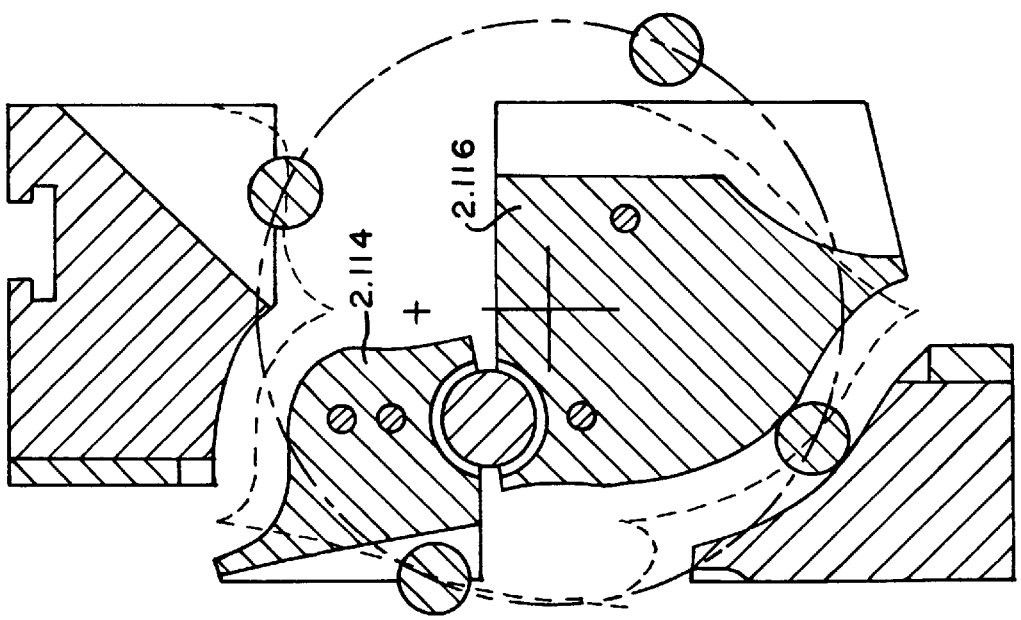
FIG. 34 is a top sectional view of a portion of the second embodiment of the present invention with the turntable at 75° of rotation.

In FIG. 24, the turntable is at 0° of rotation and just beginning to leave the first lock position. In FIG. 25, the cam carrier has reciprocated slightly upward and the turntable is at 10° of rotation. In FIG. 26, the turntable is at 20° of rotation and the second movable cam 2.116 is beginning to move into its second return position. In FIG. 27, the turntable is at 30° of rotation and the second movable cam 2.116 is almost fully into its second return position. In FIG. 28, the turntable is at 40° of rotation, the second movable cam is fully into its second return position. In FIG. 29, the turntable is at 45° of rotation and just beginning to enter the second lock position. In FIG. 30, the turntable is at 45° of rotation and in the second lock position, and the second movable cam 2.116 has returned to its first driving position because the roller 2.104 resting on lock surface 2.192 has passed the tip 2.200 of second movable cam 2.116 and the biasing spring means has returned the cam to its first driving position. In FIG. 31, the turntable is at 45° of rotation and just beginning to leave the second lock position and the cam carrier is beginning to reciprocate downward. In FIG. 32, the turntable is at 55° of rotation. In FIG. 33, the turntable is at 65° of rotation. In FIG. 34, the turntable is at 75° of rotation. In FIG. 35, the turntable is at 85° of rotation. In FIG. 36, the turntable is at 90° of rotation and just beginning to enter the first lock position. In FIG. 37, the turntable is at 90° of rotation in the first lock position. Because of symmetry, the cycle then repeats with FIG. 24.

The third embodiment of the present invention shown in FIGS. 38–49 can now be described. The second and third embodiments are very similar and the only substantial difference between the two is the cam carrier and its mounted cams and the turntable, and only differences between the two embodiments will be described in detail. The body and bottom plate of the third embodiment is the same as that shown in FIGS. 14, 15, and 18, and the other drawing figures for the second embodiment are equally as useful in understanding the third embodiment, with the understanding that the cam shapes are different for the third embodiment because the number of rollers is different. Identifying reference designators for this third embodiment are marked similarly to the first and second embodiments, except with the prefix "3.".

Because the third embodiment 3.100 has an odd number of rollers, namely, three rollers 3.104, the cam pivot post 3.122 passes through the turntable's axis of rotation and the cam surfaces for first and second cams 3.114 and 3.116 are substantially the same and the surfaces for first and second retaining members 3.136 and 3.138 are also substantially the same. However, to permit use of a common base shown in FIGS. 14 and 18 for odd and even number of rollers, the channel within which cam carrier 3.110 reciprocates is made wider than necessary for the third embodiment 3.100 so as to accommodate the offset cam pivot post 2.122 as discussed hereinabove concerning the second embodiment that had an even number of rollers. Accordingly, the left sides 260, 262 of first movable cam 3.114 and second retaining member 3.138 are extended transverse to the direction of reciprocation, as compared to the right sides 264, 266 of second movable cam 3.116 and first retaining member 3.136, so as to meet the left side of the cam carrier channel.

It should also be noted that the transverse width of the first and second cams increases as the number of rollers decreases because the chord distance between adjacent rollers increases as the number of rollers decreases.

Conversely, as the number of rollers increases, the chord distance between adjacent rollers decreases. Because of the substantial and non-zero diameter of the rollers, and because neither of the movable cams can be any wider than the chord distance between adjacent rollers, it shall be understood that, for a given radius of the turntable, the width of the movable cams decreases as the number of rollers increases, eventually to the point that a solution is impractical or impossible for an increased number of rollers as long as the turntable radius is held constant. For such larger number of rollers, it is necessary to increase the turntable radius so as to permit sufficiently wide movable cams to enable a practical solution to the cam shape design problem, discussed hereinbelow.

Figure 39:
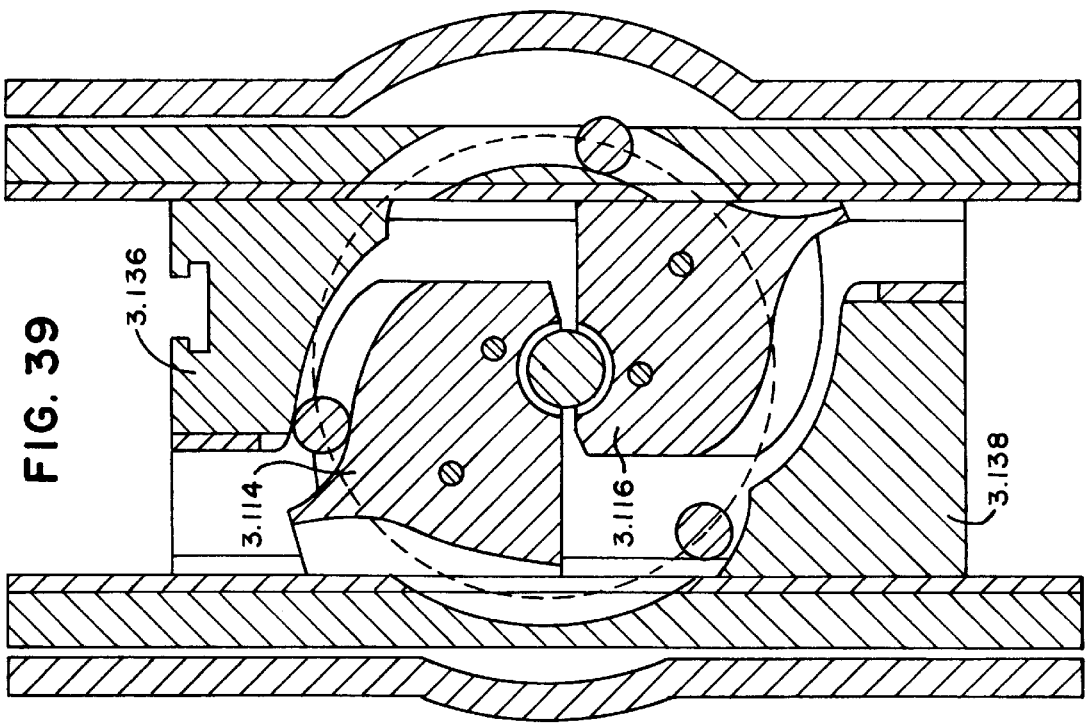
FIG. 39 is a top sectional view of the third embodiment of the present invention with the turntable at 15° of rotation.

In FIG. 38, the turntable is at 0° of rotation and just beginning to leave the first lock position. In FIG. 39, cam carrier has reciprocated slightly upward and the turntable is at 15° of rotation. In FIG. 40, the turntable is at 30° of rotation. In FIG. 41, the turntable is at 45° of rotation and the second movable cam is beginning to move into its second return position. In FIG. 42, the turntable is at 60° of rotation and just beginning to enter the second lock position. In FIG. 43, the turntable is at 60° of rotation and in the second lock position, and the second movable cam 3.116 has returned to its first driving position because the roller 3.104 resting on lock surface 3.192 has passed the tip 3.200 of second movable cam 3.116 and the biasing spring means has returned the cam to its first driving position. In FIG. 44, the turntable is at 60° of rotation and just beginning to leave the second lock position and the cam carrier is beginning to reciprocate downward. In FIG. 45, the turntable is at 75° of rotation. In FIG. 46, the turntable is at 90° of rotation. In FIG. 47, the turntable is at 105° of rotation. In FIG. 48, the turntable is at 120° of rotation and just beginning to enter the first lock position. In FIG. 49, the turntable is at 120° of rotation and in the first lock position. Because of symmetry, the cycle then repeats with FIG. 38.

Now that the operation of various embodiments the present invention has been explained, the derivation of the shapes of the surfaces for the movable cams and the retaining members can be explained using the three-inch (7.62 cm) radius four-roller second embodiment 2.100 of the present invention as an example as shown in FIGS. 24–37.

Figure 50:
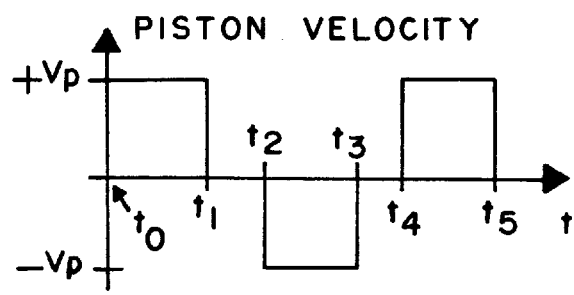
FIG. 50 shows a graph of the reciprocating piston's velocity.

The reciprocating piston 2.150 that reciprocates the cam carrier is assumed to have a constant velocity $v_p$ in either direction, and is assumed, for the present discussion, to have a velocity of 2.1875 inches/second (5.55625 cm/second) as shown in FIG. 50, yielding a stroke of 2.1875 inches (5.55625 cm) in a one second period. If desired, the piston may also pause at each end of its strokes, as shown in FIG. 50 between $t_1$ and $t_2$ and also between $t_3$ and $t_4$.

Using the turntable position shown in FIG. 24 as a starting point at 0° of rotation, roller 2.104c is at an angle of −45°. Using a Cartesian coordinate system having the Y direction be the direction of reciprocation of the cam carrier 2.110 and having the X direction be transverse to the direction of reciprocation, there are two coordinate systems of the present invention, one of which moves with respect to the other. In the stationary coordinate system $(x_t, y_t)$ of the rotating turntable, with the center of the coordinate system being at the stationary axis of rotation of the turntable, roller 2.104c is seen to have coordinates of:

$$x_t = r \cos \Phi = 3 \cos (135°) = -2.1213$$

$$y_t = r \sin \Phi = 3 \sin (135°) = 2.1213$$

In order to determine the required preferred path 2.144 of the rollers 2.104 in the moving coordinate system of the reciprocating turntable so that the cam surface shapes can be determined, several steps are necessary.

First, a trial desired velocity profile curve $v_t$ of the turntable's rotation in revolutions per minute ("RPM") must be specified for both directions of reciprocation of the cam carrier 2.110, with the desired velocity profile curve having a maximum RPM and a desired shape. Then the X and Y coordinates $(x_t, y_t)$ of the roller at periodic, closely-spaced points in the rotation of the turntable such as, for example, at every 2.5° of rotation, are computed using the trigonometric formulas given above, for various angles $\Phi$.

The translation of these X and Y coordinates into the moving frame of reference of the reciprocating turntable must then be made. Because the cam carrier 2.110 does not move in the X direction with respect to the turntable, the X values in the turntable coordinate system pass unchanged to the cam carrier coordinate system. The incremental time $t_{\Delta 1}$ ("increment time" in seconds) that it takes for the turntable to rotate an angle $\Phi$ is given by:

$$t_{\Delta 1} = \frac{60 \text{ sec/min}}{360°} * \frac{\Phi}{v_t}$$

where $v_t$ is the piecewise constant instantaneous velocity (in RPM) of the turntable, obtained from the trial desired velocity profile curve, and $\Phi$ is the angle of rotation, here chosen to be 2.5°, so that the equation becomes:

$$t_{\Delta 1} = \frac{60 * 2.5}{360} * \frac{1}{v_t}$$

During the time $t_{\Delta 1}$ that the turntable rotates 2.5°, the cam carrier 2.110 will move at a constant velocity $v_p$ of 2.1875 inches/second (5.55625 cm/second), causing the cam carrier to move an incremental distance ("increment") of $y_{\Delta 1}$, where:

$$y_{\Delta 1} = v_p * t_{\Delta 1}$$

The solution for this incremental change is added to the initial starting $y_t$ to produce the next point in the series, and the process is iterated using a new value of turntable velocity $v_t$ for the new point in order to move to the next point in the series. It should be noted that, because the solution is an incremental one, the Y coordinate in the moving frame of reference is the resulting sum of all prior Y increments from the starting point.

Once the trial solution is obtained and plotted for the cam surfaces, the solution can be examined and, if unsatisfactory, the trial velocity profile curve can be modified and the process iterated using the revised curve.

Often, the desired motion of the turntable is specified in terms of its velocity $v_t(t)$ in RPM as a function of time. Many times this desired velocity curve can be given a mathematical representation. The present method, as described herein and as shown implemented on the spreadsheets included in the drawing figures, allows an almost arbitrary velocity curve to be specified, the values of the RPM curve entered at various points, and a resulting cam shape to be computed.

As an example of the versatility of the present method, the velocity profile $v_t$ of the turntable is shown as a modified sinusoidal function of the roller's X position $x_t$. A desired trial velocity curve is chosen as:

$$v_t(x_t) = V_0 + A \sin (kx_t - \alpha)$$

where the various constant parameters of the equation, allowing scaling and shifting of the velocity curve, are:

$V_0$ Vertical translation constant or shift of the velocity curve

A Amplitude of the added sine wave k Horizontal stretching or scaling factor

α Phase shift

Preferably, a desired trial velocity curve is stretched and shifted so that it is zero at the endpoints, i.e., the two lock positions, and the amplitude is adjusted to give a desired maximum RPM value for the turntable.

Figure 58:
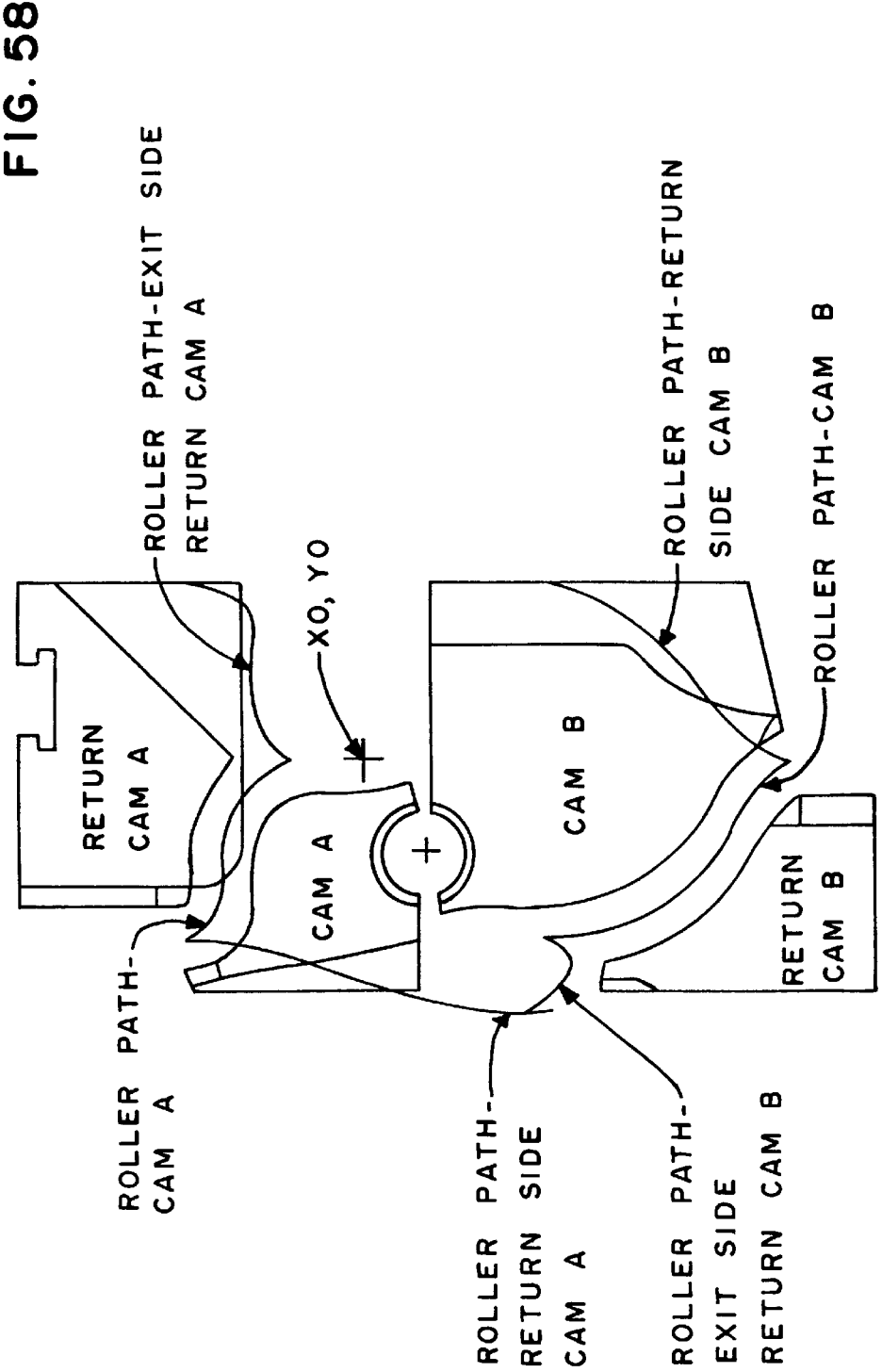
FIG. 58 shows the nomenclature used on the first and second spreadsheets of FIGS. 59A–59C, FIGS. 60A–60E, FIGS. 61A–61B, FIGS. 62A–62C, FIGS. 63A–63E, and FIGS. 64A–64B.

Table 1 gives the "Rosetta Stone" translation between the names and reference numerals used herein for the second embodiment and the names used in the first and second spreadsheets described in FIGS. 59A–59C, FIGS. 60A–60E, FIGS. 61A–61B, FIGS. 62A–62C, FIGS. 63A–63E, and FIGS. 64A–64B and the diagram shown also in FIG. 58.

TABLE 1

| Ref. Num. | Spreadsheet Description | Second Embodiment Name |
|---|---|---|
| 2.114 | Cam A | First Movable Cam |
| 2.116 | Cam B | Second Movable Cam |
| 2.136 | Return Cam A | First Retaining Member |

TABLE 1-continued

| Ref. Num. | Spreadsheet Description | Second Embodiment Name |
|---|---|---|
| 2.138 | Return Cam B | Second Retaining Member |
| 2.242 | Roller Path - Exit Side Return Cam A | First Exit Path Portion |
| 2.170 | Roller Path - Cam A | First Driving Path Portion |
| 2.174 | Roller Path - Return Side Cam A | First Return Path Portion |
| 2.244 | Roller Path - Exit Side Return Cam B | Second Exit Path Portion |
| 2.172 | Roller Path - Cam B | Second Driving Path Portion |
| 2.176 | Roller Path - Return Side Cam B | Second Return Path Portion |

Figure 56:
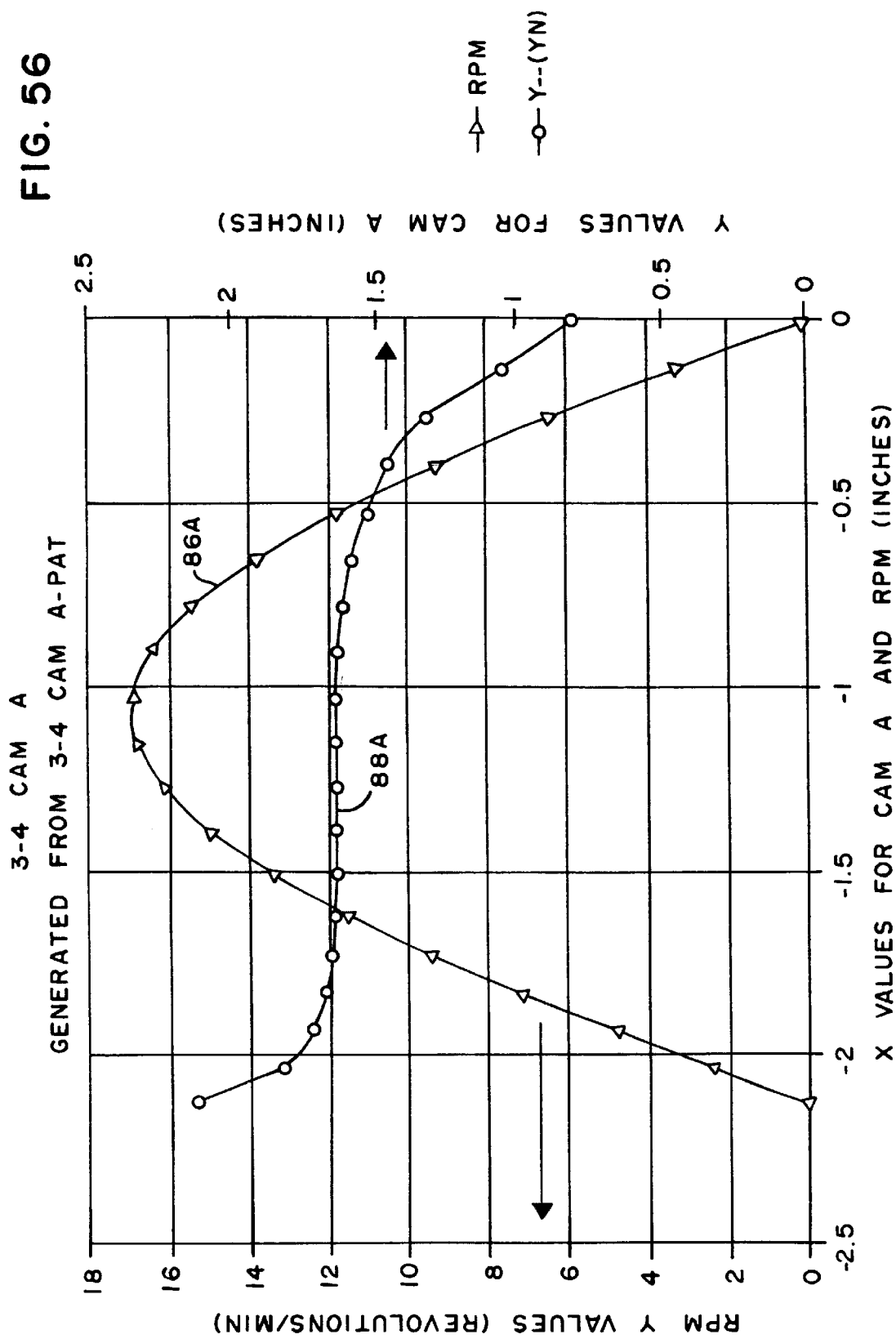
FIG. 56 shows a graph of a desired turntable velocity profile superimposed upon the graph of the resulting solution for the first channel of the second embodiment of the present invention.

The first spreadsheet ("3–4 Cam A—Pat") is shown in FIGS. 59A–59C, FIGS. 60A–60E, and FIGS. 61A–61B. FIGS. 59A, 59B, and 59C together show the input and output data plotted in FIG. 56. Curve 86A of FIG. 56 shows the desired turntable velocity $v_t$ profile 86A superimposed upon the graph of the resulting solution 88A for the first driving path portion 2.170. The first spreadsheet shows, in the columns entitled "Cam A—X and Y Coordinates", the calculated points for first driving path portion 2.170 that are plotted as curve 88A. The parameters used for the first spreadsheet calculations were an amplitude A of 16.5; a vertical translation constant (shift) of the RPM curve of 0.35; a phase shift α of –0.02; and a horizontal stretching or scaling factor k of 1.5. FIGS. 60A–60E show the spreadsheet formulas behind the spreadsheet cells of FIGS. 59A–59C, and FIGS. 61A–61B show various documentation notes about the first spreadsheet.

The first spreadsheet calculates three curve paths, namely, the curve path for first driving path portion 2.170 ("Roller Path—Cam A") and shows the results in the columns entitled "Cam A—X and Y Coordinates"; the curve path for second exit path portion 2.244 ("Roller Path—Exit Side Return Cam B") and shows the results in the columns entitled "Exit Side Return Cam B"; and the curve path for second return path portion 2.176 ("Roller Path—Return Side Cam B") and shows the results in the columns entitled "Return Side Cam B".

Figure 57:
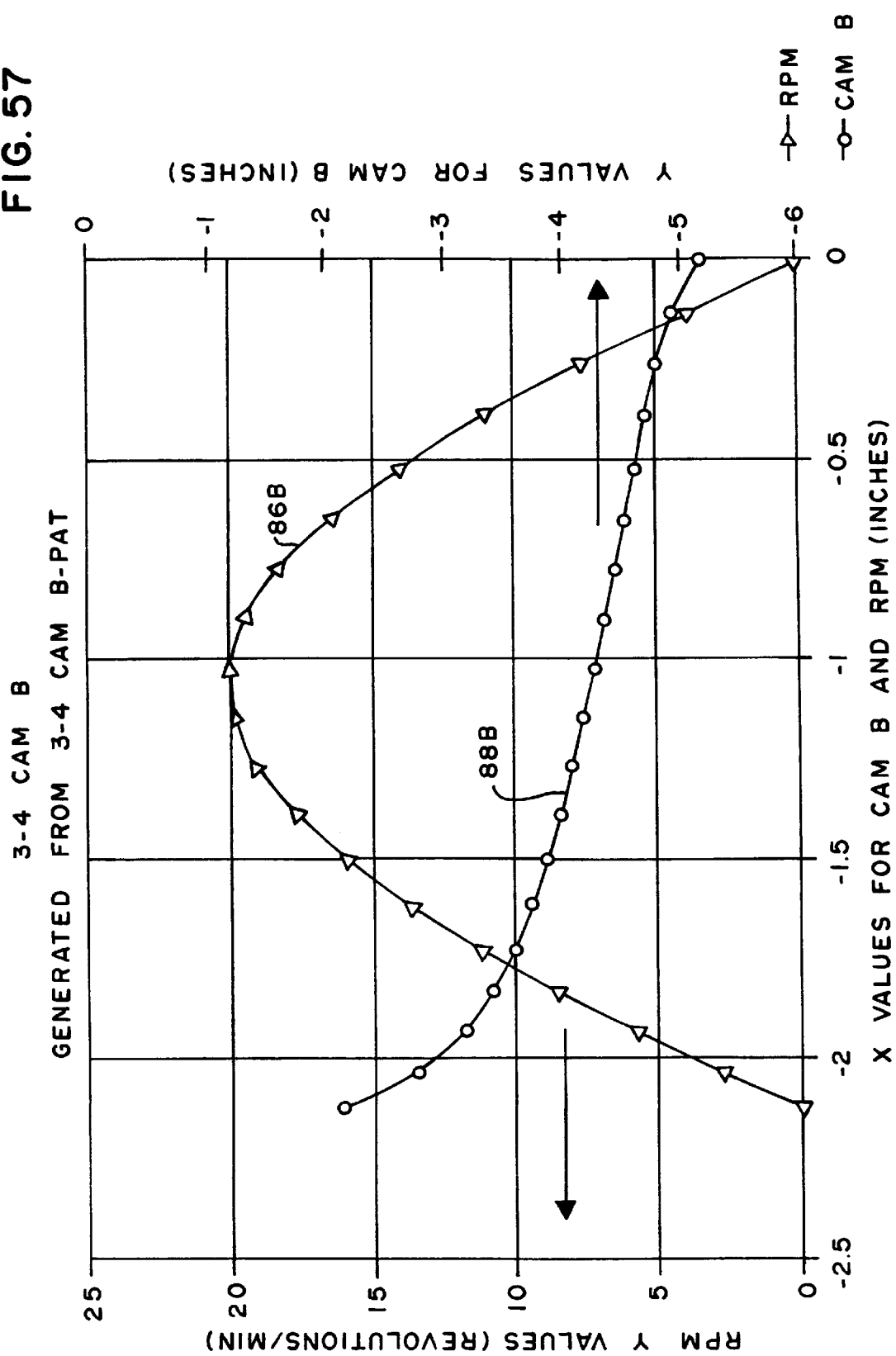
FIG. 57 shows a graph of a desired turntable profile superimposed upon the graph of the solution for the second channel of the second embodiment of the present invention.

Similarly, the second spreadsheet ("3–4 Cam B—Pat") is shown in FIGS. 62A–62C, FIGS. 63A–63E, and FIGS. 64A–64B. FIGS. 62A, 62B, and 62C together show the input and output data plotted in FIG. 57. Curve 86B of FIG. 57 shows the desired turntable velocity $v_t$ profile 86B superimposed upon the graph of the resulting solution 88B for the second driving path portion 2.172. The second spreadsheet shows, in the columns entitled "Cam B—X and Y Coordinates", the calculated points for second driving path portion 2.172 that are plotted as curve 88B. The parameters used for the second spreadsheet calculations were an amplitude A of 20.0; a vertical translation constant (shift) of the RPM curve of 0.0; a phase shift α of 0.0; and a horizontal stretching or scaling factor k of 1.48, demonstrating that the velocity profiles do not necessarily have to be the same for the two cam carrier reciprocation directions. FIGS. 63A–63E show the spreadsheet formulas behind the spreadsheet cells of FIGS. 62A–62C, and FIGS. 64A–64B show various documentation notes about the second spreadsheet.

The second spreadsheet calculates three curve paths, namely, the curve path for second driving path portion 2.172 ("Roller Path—Cam B") and shows the results in the columns entitled "Cam B—X and Y Coordinates"; the curve path for first exit path portion 2.242 ("Roller Path—Exit Side Return Cam A") and shows the results in the columns entitled "Exit Side Return Cam A"; and the curve path for first return path portion 2.174 ("Roller Path—Return Side Cam A") and shows the results in the columns entitled "Return Side Cam A".

FIGS. 51–55 show graphs of a succession of possible turntable velocity RPM profiles 90A, 90B, 90C, 90D, and 90E and the resulting solutions 92A, 92B, 92C, 92D, and 92E for the first channel of the second embodiment obtained by plugging the RPM values for the RPM profiles into the spreadsheets hereinbefore discussed. For all of FIGS. 51–55, the stroke velocity $v_p$ of the reciprocating piston was set to be 2.1875 inches/second (5.55625 cm/second) for a stroke time of one second, and the roller radius of rotation was set to be 3.0 inches (7.62 cm). The succession of profiles 90A, 90B, 90C, 90D, and 90E and the resulting solutions 92A, 92B, 92C, 92D, and 92E show the effects on the shape of the roller path as the selected turntable velocity RPM profile curve is altered.

Figure 51:
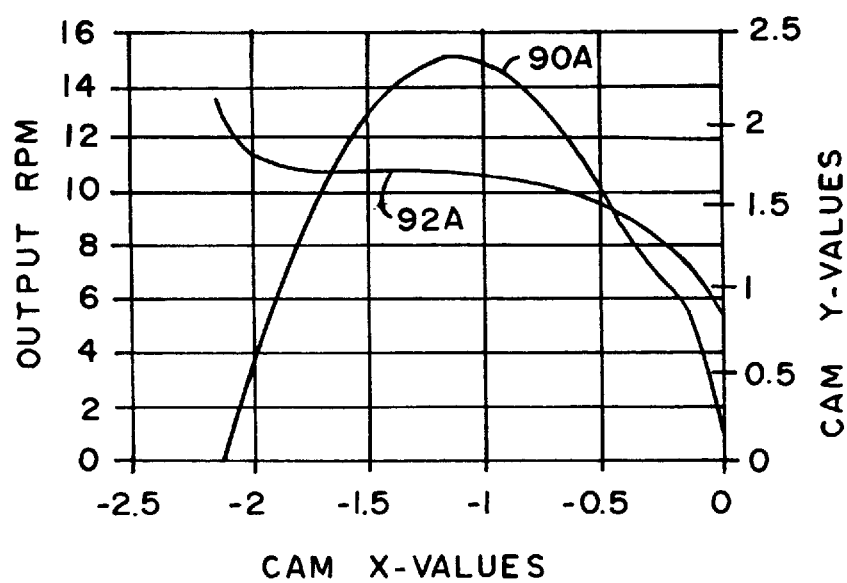
FIG. 51 shows a graph of a first desired turntable velocity profile superimposed upon the graph of the resulting first trial solution for the first channel of the second embodiment of the present invention in which the cam shape is acceptable.

FIG. 51 shows a graph of a first possible turntable velocity profile 90A superimposed upon the graph of the resulting first trial solution 92A for the first channel driving portion 2.170 of the second embodiment of the present invention in which the cam shape is acceptable. The nominal velocity curve parameters used had the peak RPM amplitude A be 15.0 and the phase shift α be 1.0, yielding the resulting RPM profile points shown in Table 2 that plot as profile 90A:

TABLE 2

| Turntable Rotation (degrees) | $v_t$ (RPM) |
|---|---|
| 45.0 | 0.0000 |
| 47.5 | 2.5377 |
| 50.0 | 5.0023 |
| 52.5 | 7.3227 |
| 55.0 | 9.4319 |
| 57.5 | 11.2692 |
| 60.0 | 12.7816 |
| 62.5 | 13.9255 |
| 65.0 | 14.6680 |
| 67.5 | 14.9875 |
| 70.0 | 14.8750 |
| 72.5 | 14.3336 |
| 75.0 | 13.3789 |
| 77.5 | 12.0386 |
| 80.0 | 10.3511 |
| 82.5 | 8.3653 |
| 85.0 | 7.0000 |
| 87.5 | 5.5000 |
| 90.0 | 1.2225 |

Figure 52:
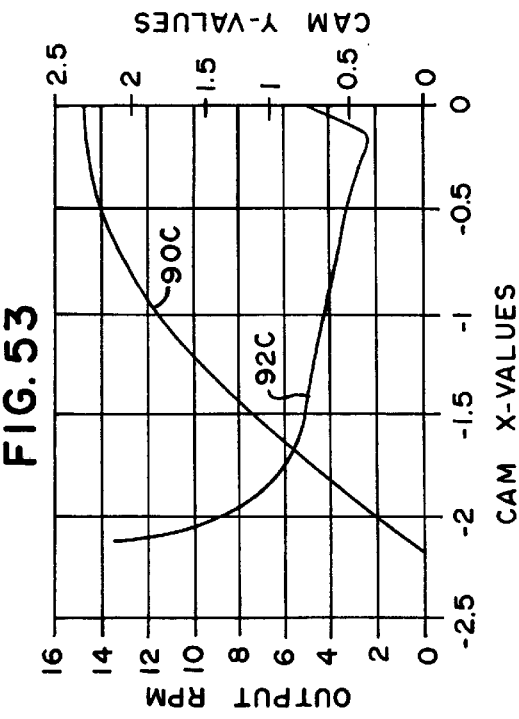
FIG. 52 shows a graph of a second desired turntable velocity profile superimposed upon the graph of the resulting second trial solution for the first channel of the second embodiment of the present invention in which the cam shape is unsatisfactory.

FIG. 52 shows a graph of a second possible turntable velocity profile 90B superimposed upon the graph of the resulting second trial solution 92B for the first channel driving portion 2.170 of the second embodiment of the present invention in which the cam shape is unsatisfactory. The nominal velocity curve parameters used had the peak RPM amplitude A be 15.0 and the phase shift α be 1.1, yielding the resulting RPM profile points shown in Table 3 that plot as profile 90B:

TABLE 3

| Turntable Rotation (degrees) | $v_t$ (RPM) |
|---|---|
| 45.0 | 0.0000 |
| 47.5 | 2.7887 |
| 50.0 | 5.4801 |
| 52.5 | 7.9805 |
| 55.0 | 10.2026 |
| 57.5 | 12.0690 |

TABLE 3-continued

| Turntable Rotation (degrees) | $v_t$ (RPM) |
|---|---|
| 60.0 | 13.5146 |
| 62.5 | 14.4889 |
| 65.0 | 14.9581 |
| 67.5 | 14.9057 |
| 70.0 | 14.3336 |
| 72.5 | 13.2617 |
| 75.0 | 11.7274 |
| 77.5 | 9.7842 |
| 80.0 | 7.4999 |
| 82.5 | 4.9541 |
| 85.0 | 2.2355 |
| 87.5 | −0.5610 |
| 90.0 | −3.3379 |

Figure 53:
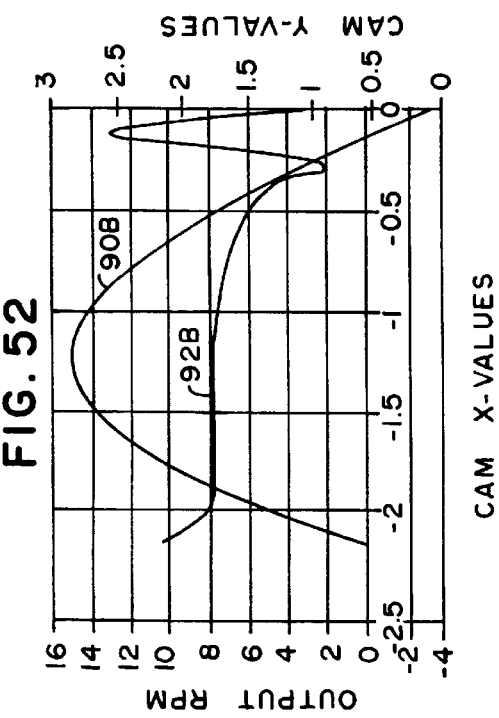
FIG. 53 shows a graph of a third desired turntable velocity profile superimposed upon the graph of the resulting third trial solution for the first channel of the second embodiment of the present invention in which the cam shape is unsatisfactory.

FIG. 53 shows a graph of a third possible turntable velocity profile 90C superimposed upon the graph of the resulting third trial solution 92C for the first channel driving portion 2.170 of the second embodiment of the present invention in which the cam shape is unsatisfactory. The nominal velocity curve parameters used had the peak RPM amplitude A be 15.0 and the phase shift α be 0.5, yielding the resulting RPM profile points shown in Table 4 that plot as profile 90C:

TABLE 4

| Turntable Rotation (degrees) | $v_t$ (RPM) |
|---|---|
| 45.0 | 0.0000 |
| 47.5 | 1.2735 |
| 50.0 | 2.5377 |
| 52.5 | 3.7837 |
| 55.0 | 5.0023 |
| 57.5 | 6.1848 |
| 60.0 | 7.3227 |
| 62.5 | 8.4076 |
| 65.0 | 9.4319 |
| 67.5 | 10.3881 |
| 70.0 | 11.2692 |
| 72.5 | 12.0690 |
| 75.0 | 12.7816 |
| 77.5 | 13.4020 |
| 80.0 | 13.9255 |
| 82.5 | 14.3486 |
| 85.0 | 14.6680 |
| 87.5 | 14.8815 |
| 90.0 | 14.9875 |

Figure 54:
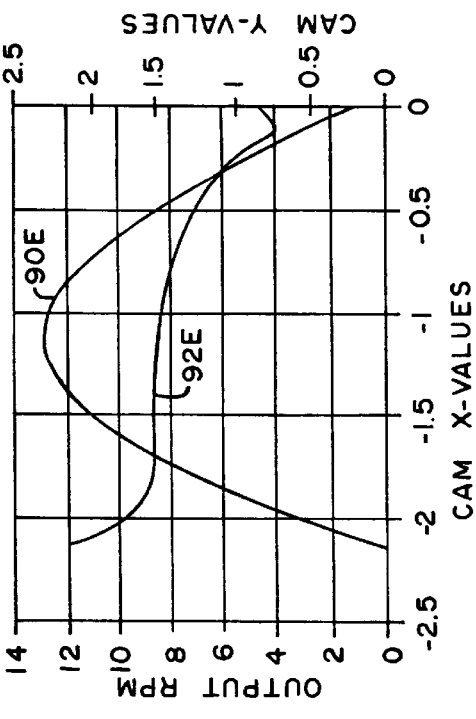
FIG. 54 shows a graph of a fourth desired turntable velocity profile superimposed upon the graph of the resulting fourth trial solution for the first channel of the second embodiment of the present invention in which the cam shape is unsatisfactory.

FIG. 54 shows a graph of a fourth possible turntable velocity profile 90D superimposed upon the graph of the resulting fourth trial solution 92D for the first channel driving portion 2.170 of the second embodiment of the present invention in which the cam shape is unsatisfactory. The nominal velocity curve parameters used had the peak RPM amplitude A be 21.0 and the phase shift α be 1.0, yielding the resulting RPM profile points shown in Table 5 that plot as profile 90D:

TABLE 5

| Turntable Rotation (degrees) | $v_t$ (RPM) |
|---|---|
| 45.0 | 0.0000 |
| 47.5 | 3.5528 |
| 50.0 | 7.0032 |
| 52.5 | 10.2517 |
| 55.0 | 13.2047 |

TABLE 5-continued

| Turntable Rotation (degrees) | $v_t$ (RPM) |
|---|---|
| 57.5 | 15.7769 |
| 60.0 | 17.8943 |
| 62.5 | 19.4957 |
| 65.0 | 20.5352 |
| 67.5 | 20.9825 |
| 70.0 | 20.8250 |
| 72.5 | 20.0670 |
| 75.0 | 18.7305 |
| 77.5 | 16.8540 |
| 80.0 | 14.4916 |
| 82.5 | 11.7114 |
| 85.0 | 8.5935 |
| 87.5 | 5.2279 |
| 90.0 | 1.7115 |

Figure 55:
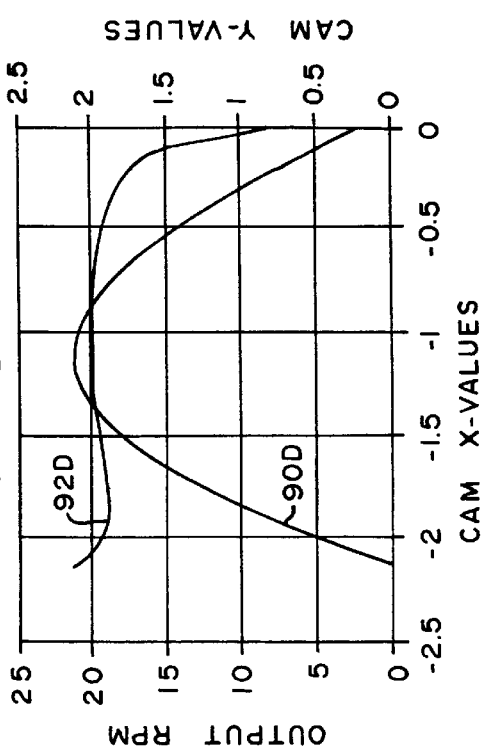
FIG. 55 shows a graph of a fifth desired turntable velocity profile superimposed upon the graph of the resulting fifth trial solution for the first channel of the second embodiment of the present invention in which the cam shape is unsatisfactory.

FIG. 55 shows a graph of a fifth possible turntable velocity profile 90E superimposed upon the graph of the resulting fifth trial solution 92E for the first channel driving portion 2.170 of the second embodiment of the present invention in which the cam shape is unsatisfactory. The nominal velocity curve parameters used had the peak RPM amplitude A be 13.0 and the phase shift α be 1.0, yielding the resulting RPM profile points shown in Table 6 that plot as profile 90E:

TABLE 6

| Turntable Rotation (degrees) | $v_t$ (RPM) |
|---|---|
| 45.0 | 0.0000 |
| 47.5 | 2.1994 |
| 50.0 | 4.3353 |
| 52.5 | 6.3463 |
| 55.0 | 8.1743 |
| 57.5 | 9.7666 |
| 60.0 | 11.0774 |
| 62.5 | 12.0688 |
| 65.0 | 12.7122 |
| 67.5 | 12.9892 |
| 70.0 | 12.8916 |
| 72.5 | 12.4224 |
| 75.0 | 11.5951 |
| 77.5 | 10.4334 |
| 80.0 | 8.9710 |
| 82.5 | 7.2499 |
| 85.0 | 5.3198 |
| 87.5 | 3.2363 |
| 90.0 | 1.0595 |

To use the present invention, the desired number of index positions per revolution of the turntable are chosen and a number of rollers is specified. A turntable velocity profile is specified and the cam shapes are determined in a manner hereinbefore described. A reciprocation means is attached to the cam carrier for reciprocating the carrier, and the turntable is attached to a workpiece, preferably through an output shaft as hereinbefore described. As the cam carrier is reciprocated, the workpiece will indexingly rotate through various positions with a rotation velocity profile as specified.

Although the present invention has been described and illustrated with respect to a preferred embodiment and a preferred use therefor, it is not to be so limited since modifications and changes can be made therein which are within the full intended scope of the invention.

I claim:

1. A linear motion to rotary motion converter, said converter comprising:

a) a turntable mounted for rotation and including a plurality of fingers, each one of said plurality of fingers extending from said turntable and being spaced from said turntable's axis of rotation;

b) a cam carrier mounted for reciprocating linear motion with respect to said turntable;

c) a first movable cam mounted to said cam carrier for movement with respect thereto;

d) a first retaining member fixedly extending from said cam carrier, said first retaining member being spaced from said first movable cam so as to define a first channel therebetween guiding said plurality of fingers therethrough as said cam carrier is linearly moved through a first direction of linear motion;

e) a second movable cam mounted to said cam carrier for movement with respect thereto; and f) a second retaining member fixedly extending from said cam carrier, said second retaining member being spaced from said second movable cam so as to define a second channel therebetween guiding said plurality of fingers therethrough as said cam carrier is linearly moved through a second direction of linear motion.

2. The converter as recited in claim 1 in which each of said fingers is a roller mounted for rolling contact, within said first and second channels, with said first and second movable cam and said first and second retaining members.

3. The converter as recited in claim 1 in which said fingers are constrained by said first and second movable cams and said first and second retaining members to follow a predetermined path in a moving frame of reference defined by said cam carrier, said predetermined path having a first driving portion within said first channel and a second driving portion within said second channel, and said first channel and said second channel are respectively shaped to follow said first driving portion and said second driving portion of said predetermined path, and said predetermined path is selected so as to cause the rotation of said turntable to have a predetermined angular velocity pattern.

4. The converter as recited in claim 3 in which said first movable cam has a first driving cam surface facing said first retaining member and exposed to said first channel and said first movable cam has a first return cam surface remote from said first driving cam surface and not exposed to said first channel; and said second movable cam has a second driving cam surface facing said second retaining member and exposed to said second channel and said second movable cam has a second return cam surface remote from said second driving cam surface and not exposed to said second channel; and said predetermined path has a first return portion and a second return portion; said first movable cam being movable from a first driving position, wherein said first channel is open for guiding one of said fingers therethrough, to a first return position, wherein said first return cam surface of said first movable cam is adjacent to said first return portion of said predetermined path; and said second movable cam being movable from a second driving position, wherein said second channel is open for guiding one of said fingers therethrough, to a second return position, wherein said second return cam surface of said second movable cam is adjacent to said second return portion of said predetermined path.

5. The converter as recited in claim 4 in which said cam carrier includes biasing means for urging said first movable cam to said first driving position and for urging said second movable cam to said second driving position.

6. The converter as recited in claim 4, in which said cam carrier has first and second lock positions at respective ends of its reciprocation, said turntable being locked from rotation in either direction when said cam carrier is in either of said first or said second lock positions; when said cam carrier begins to enter said first lock position, said first movable cam being in its said first return position with one of said fingers being in contact with said first return cam surface; when said cam carrier begins to enter its said second lock position, said second movable cam being in its said second return position with a different one of said fingers being in contact with said second return cam surface; said first retaining member having a first lock surface parallel to the reciprocation of said cam carrier and said second retaining member also having a second lock surface parallel to the reciprocation of said cam carrier; when said cam carrier is in said first lock position, said one of said fingers being in contact with said first lock surface; when said cam carrier is in said second lock position, said one of said fingers being in contact with said second lock surface.

7. A linear motion to rotary motion converter, said converter comprising:

a) a turntable mounted for rotation and including a plurality of rollers, each one of said plurality of rollers extending from said turntable and being spaced from said turntable's axis of rotation;

b) a cam carrier mounted for reciprocating linear motion with respect to said turntable;

c) a first movable cam mounted to said cam carrier for movement with respect thereto;

d) a first retaining member fixedly extending from said cam carrier, said first retaining member being spaced from said first movable cam so as to define a first channel therebetween guiding said plurality of rollers therethrough as said cam carrier is linearly moved through a first direction of linear motion;

e) a second movable cam mounted to said cam carrier for movement with respect thereto; and f) a second retaining member fixedly extending from said cam carrier, said second retaining member being spaced from said second movable cam so as to define a second channel therebetween guiding said plurality of rollers therethrough as said cam carrier is linearly moved through a second direction of linear motion, each said roller being mounted to said turntable for rolling contact, within said first and second channels, with said first and second movable cam and said first and second retaining members; said rollers being constrained by said first and second movable cams and said first and second retaining members to follow a predetermined path in a moving frame of reference defined by said cam carrier, said predetermined path having a first driving portion within said first channel and a second driving portion within said second channel, and said first channel and said second channel being respectively shaped to follow said first driving portion and said second driving portion of said predetermined path, and said predetermined path being selected so as to cause the rotation of said turntable to have a predetermined angular velocity pattern, said first movable cam having a first driving cam surface facing said first retaining member and exposed to said first channel and said first movable cam having a first return cam surface remote from said first driving cam surface and not exposed to said first channel; and said second movable cam has a second driving cam surface facing said second retaining member and exposed to said second channel and said second movable cam having a second return cam surface remote from said second driving cam surface and not exposed to said second channel; and said predetermined path having a first return portion and a second return portion; said first movable cam being movable from a first driving position, wherein said first channel is open for guiding one of said rollerss therethrough, to a first return position, wherein said first return cam surface of said first movable cam is adjacent to said first return portion of said predetermined path; said second movable cam being movable from a second driving position, wherein said second channel is open for guiding one of said rollers therethrough, to a second return position, wherein said second return cam surface of said second movable cam is adjacent to said second return portion of said predetermined path.

8. The converter as recited in claim 7, in which said cam carrier has first and second lock positions at respective ends of its reciprocation, said turntable being locked from rotation in either direction when said cam carrier is in either of said first or said second lock positions; when said cam carrier begins to enter said first lock position, said first movable cam being in its said first return position with one of said rollers being in contact with said first return cam surface; when said cam carrier begins to enter its said second lock position, said second movable cam being in its said second return position with a different one of said rollers being in contact with said second return cam surface; said first retaining member having a first lock surface parallel to the reciprocation of said cam carrier and said second retaining member having a second lock surface parallel to the reciprocation of said cam carrier; when said cam carrier is in said first lock position, said one of said rollers being in contact with said first lock surface; when said cam carrier is in said second lock position, said one of said rollers being in contact with said second lock surface.

9. The converter as recited in claim 8 in which said cam carrier includes biasing means for urging said first movable cam to said first driving position and for urging said second movable cam to said second driving position.

\* \* \* \* \*